(12) United States Patent
Shirley et al.

(10) Patent No.: US 9,052,358 B2
(45) Date of Patent: Jun. 9, 2015

(54) COPULA-BASED SYSTEM AND METHOD FOR MANAGEMENT OF MANUFACTURING TEST AND PRODUCT SPECIFICATION THROUGHOUT THE PRODUCT LIFECYCLE FOR ELECTRONIC SYSTEMS OR INTEGRATED CIRCUITS

(75) Inventors: Carvin Glenn Shirley, Portland, OR (US); W. Robert Daasch, West Linn, OR (US)

(73) Assignee: Portland State University, Portland, OR (US)

( * ) Notice: Subject to any disclaimer, the term of this patent is extended or adjusted under 35 U.S.C. 154(b) by 291 days.

(21) Appl. No.: 13/360,373

(22) Filed: Jan. 27, 2012

(65) Prior Publication Data

US 2013/0197875 A1    Aug. 1, 2013

(51) Int. Cl.
| | |
|---|---|
| G06F 7/60 | (2006.01) |
| G06F 17/10 | (2006.01) |
| G01R 31/317 | (2006.01) |
| G06F 17/50 | (2006.01) |

(52) U.S. Cl.
CPC ...... *G01R 31/31718* (2013.01); *G06F 17/5018* (2013.01); *G06F 17/5036* (2013.01); *G06F 2217/78* (2013.01); *G06F 2217/80* (2013.01)

(58) Field of Classification Search
None
See application file for complete search history.

(56) References Cited

U.S. PATENT DOCUMENTS

| | | | |
|---|---|---|---|
| 2007/0027698 A1* | 2/2007 | Daul et al. | 705/1 |
| 2008/0005707 A1* | 1/2008 | Papanikolaou et al. | 716/4 |
| 2008/0133427 A1 | 6/2008 | Gilkes et al. | |
| 2010/0332208 A1 | 12/2010 | Victory et al. | |

FOREIGN PATENT DOCUMENTS

WO    WO 2009032020    3/2009

OTHER PUBLICATIONS

Bhat et al., A Copula-Based Closed-Form Binary Logit Choice Model for Accomodating Spatial Correlation Across Observational Units, 2008, University of Texas at Austin, pp. 1-41.*
Ahcéne Bounceur et al.,"Estimation of Test Metrics for AMS/RF BIST Using Copulas", 2008, Mixed-Signals, Sensors, and Systems Test Workshop, IEEE 14th International.
The International Search Report and The Written Opinion of the International Searching Authority. Or The Declaration; PCT/US 2013/020567; Apr. 11, 2013.

* cited by examiner

*Primary Examiner* — Omar Fernandez Rivas
*Assistant Examiner* — Bernard E Cothran
(74) *Attorney, Agent, or Firm* — Lumen Patent Firm

(57) ABSTRACT

A method is provided for determining specifications that meet electronic system or integrated circuit product requirements at all stages of the product lifecycle. Early in the product lifecycle design features must be specified. Later in the lifecycle datasheet specifications must be determined and published to customers, and test specifications in manufacturing must be determined. The method includes acquiring data from a test vehicle, fitting the data to a copula-based statistical model using an appropriately programmed computer, and using the statistical model to compute producer- and customer-oriented figures of merit of a product, different from the test vehicle, using the appropriately programmed computer. Different size, fault tolerance schemes, test coverage, end-use (datasheet), and test condition specifications of the product may be modeled. The statistical model is a copula-based and so can take into account dependency among attributes of the product. The copula-based model has features, which enable significant computational efficiencies.

13 Claims, 48 Drawing Sheets

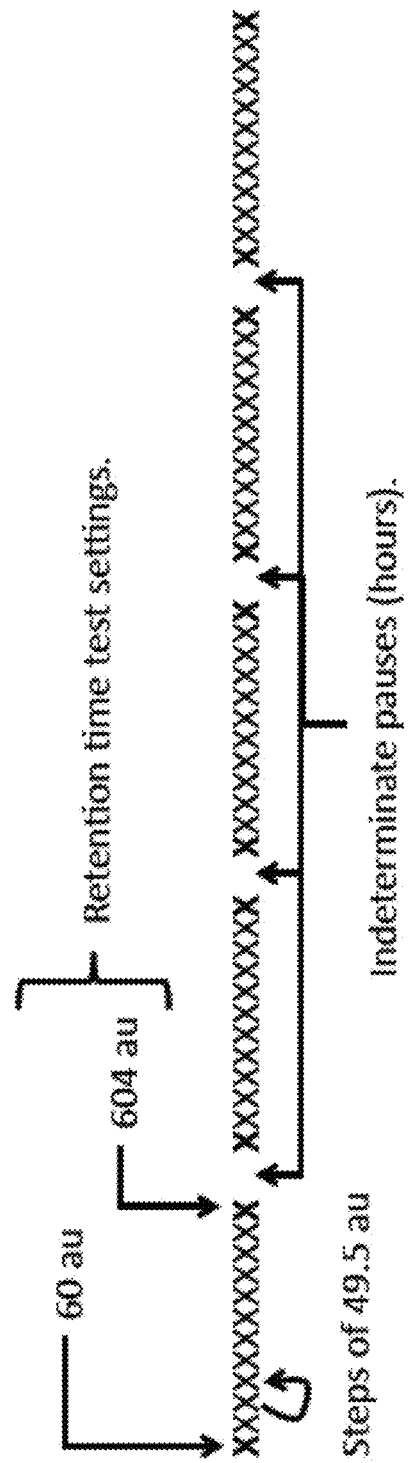

| Identity | | | | | Environmental Condition | | | IRetMin | IRetMax | IRetDelta | Results of Test |
| --- | --- | --- | --- | --- | --- | --- | --- | --- | --- | --- | --- |
| skew | chip | macro | px | py | VP | VDD | temp | | | | LoopGroups |
| 4 | 1 | 0 | 1 | 238 | 0.4 | 0.85 | 125 | 10 | 11 | 1 | 00000000000001 00000000000001 00000000000001 |
| 4 | 1 | 0 | 1 | 238 | 0.4 | 1 | 125 | 10 | 11 | 1 | 00000000000011 00000000000011 00000000000011 |
| 4 | 1 | 0 | 1 | 238 | 0.4 | 1.2 | 125 | 10 | 11 | 1 | 00000000000001 00000000000011 00000000000011 |
| 4 | 1 | 0 | 1 | 238 | 0.45 | 0.85 | 125 | 8 | 9 | 1 | 00000000000111 00000000000111 00000000000111 |
| 4 | 1 | 0 | 1 | 238 | 0.45 | 1 | 125 | 9 | 9 | 0 | 00000000000011 00000000000011 00000000000011 |
| 4 | 1 | 0 | 1 | 238 | 0.45 | 1.2 | 125 | 10 | 11 | 1 | 00000000000011 00000000000011 00000000000011 |
| 4 | 1 | 0 | 16 | 520 | 0.4 | 0.85 | 105 | 4 | 4 | 0 | 00001111111111 00001111111111 00001111111111 |
| 4 | 1 | 0 | 16 | 520 | 0.4 | 0.85 | 115 | 3 | 3 | 0 | 00011111111111 00011111111111 00011111111111 |
| 4 | 1 | 0 | 16 | 520 | 0.4 | 0.85 | 125 | 2 | 2 | 0 | 00111111111111 00111111111111 00111111111111 |
| 4 | 1 | 0 | 16 | 520 | 0.4 | 1 | 105 | 3 | 3 | 0 | 00011111111111 00011111111111 00011111111111 |
| 4 | 1 | 0 | 16 | 520 | 0.4 | 1 | 115 | 2 | 2 | 0 | 00111111111111 00111111111111 00111111111111 |
| 4 | 1 | 0 | 16 | 520 | 0.4 | 1 | 125 | 1 | 1 | 0 | 01111111111111 01111111111111 01111111111111 |
| 4 | 1 | 0 | 16 | 520 | 0.4 | 1.2 | 105 | 2 | 2 | 0 | 00111111111111 00111111111111 00111111111111 |
| 4 | 1 | 0 | 16 | 520 | 0.4 | 1.2 | 115 | 1 | 1 | 0 | 01111111111111 01111111111111 01111111111111 |
| 4 | 1 | 0 | 16 | 520 | 0.4 | 1.2 | 125 | 1 | 1 | 0 | 01111111111111 01111111111111 01111111111111 |
| 4 | 1 | 0 | 16 | 520 | 0.45 | 0.85 | 105 | 3 | 3 | 0 | 00011111111111 00011111111111 00011111111111 |
| 4 | 1 | 0 | 16 | 520 | 0.45 | 0.85 | 115 | 2 | 2 | 0 | 00111111111111 00111111111111 00111111111111 |
| 4 | 1 | 0 | 16 | 520 | 0.45 | 0.85 | 125 | 1 | 1 | 0 | 01111111111111 01111111111111 01111111111111 |
| etc. | etc. | etc. | etc. | etc. | etc. | etc. | etc. | etc. | etc. | etc. | etc. |

Calculator

Skew, Model Parameters

| | Skew | Nominal | |
|---|---|---|---|
| | Beta | 2.00 | Weibull shape parameter |
| | lnAlpha | 11.57 | lnAlpha reference condition: Vpref = .45 Vdref = 1.2 Tref = 125 |
| | Q | 0.60513 | Activation energy (eV) |
| | a | -5.79 | Vp coefficient (/Volt) |
| | b | -1.55 | Vdd coefficient (/Volt) |
| | c | 1.14 | Wedge copula parameter |

Memory Architecture

| | | | |
|---|---|---|---|
| N | 1048576 | | Array size (bits) |
| n_t | 0 | | Bad bits tolerated ("No Repair"), or bit repair capacity ("Repair"), in test ( n_t << N) |
| n_u | 0 | | Bad bits tolerated in use ( n_u << N) |

Test and Use Conditions

| | Test | | Use | | | Typical Range |
|---|---|---|---|---|---|---|
| r_t | 121 | (au) | r_u | 108 | | $25 < r < 200$ |
| lnAlpha_t | 13.05 | | lnAlpha_u | 13.05 | | |
| Vp_t | 0.45 | Volts | Vp_u | 0.45 | | $0.4 < Vp < 0.8$ |
| Vd_t | 1.2 | Volts | Vdd_u | 1.2 | | $0.85 < Vd < 1.25$ |
| T_t | 125 | deg C | T_u | 125 | | $85 < Temp < 125$ |

Test/Use Coverage: test > r_use (WC)

Figures of Merit

| | No Repair at Test | | Repair at Test | Description |
|---|---|---|---|---|
| Yield Loss | 72.49 | % | 72.49 | Valid and Invalid Test Rejects/All Units Manufactured |
| Overkill(Mfg) | 3.49 | % | 3.49 | Invalid Test Rejects/All Units Manufactured |
| Overkill(Test) | 4.82 | % | 4.82 | Invalid Test Rejects/Valid and Invalid Test Rejects |
| End Use Fraction Fail | 3351 | PPM | 3351 | Fails in Use/Passes Test |

Targets

| | | |
|---|---|---|
| Target: Yield Loss | 20 | % |
| Target: Overkill (Mfg) | 2 | % |
| Target: EUFF | 200 | PPM |

FIG. 26

COPULA-BASED SYSTEM AND METHOD FOR MANAGEMENT OF MANUFACTURING TEST AND PRODUCT SPECIFICATION THROUGHOUT THE PRODUCT LIFECYCLE FOR ELECTRONIC SYSTEMS OR INTEGRATED CIRCUITS

FIELD OF THE INVENTION

The present invention relates generally to the design and manufacturing test of electronic systems or integrated circuits. More particularly, the invention relates to a system and method that supports decision-making in the design and manufacture of electronic systems or integrated circuit components throughout the product lifecycle.

BACKGROUND OF THE INVENTION

Design and manufacturing test of electronic systems require consideration of the effect of variation of individual components on the variability of the system. Similarly, design and manufacturing test of integrated circuit components require consideration of the effect of variation of individual circuit modules on the variation of the integrated circuit itself. Characterizing and modeling this variation support decision-making in the design and manufacturing test of both electronic systems and integrated circuit components.

Test in the manufacture of electronic systems or integrated circuit components requires specification of test conditions such as temperatures, voltages, frequencies and parametric test limits, as well as end-use specifications. End-use specifications are given in a datasheet specification document used by designers of systems employing the electronic (sub-) system or integrated circuit component being manufactured. Test specifications and datasheet specifications are set to optimize yield, yet meet quality and reliability requirements, and so have an important revenue and brand image impact. Each unit tested is characterized by many parametric attributes such as power and delay for electronic systems, or $I_{sb}$, $F_{max}$, bit refresh time, reliability lifetimes, etc., for integrated circuit components, all as functions of environmental conditions such as temperature, voltage and frequency. These parametric attributes are dependent (correlated) to various degrees in the population of manufactured units. A traditional method of optimizing the test manufacturing flow is to characterize a sufficiently large sample of units of a specific product by measuring, but not screening, the multiple parametric attributes over a range of temperatures, voltages, and frequencies corresponding to possible Test and Use conditions of a future product. Test set points and limits are then found by filtering the data and computing figures of merit (FOMs) such as yield loss, overkill, and end-use fail fraction so that manufacturing cost, and quality and reliability targets are met. What is needed is a way to do this earlier in the product lifecycle by building a statistical model of a product from test vehicle data and then using the model to scale the model to the specific die area, bit count, fault tolerance scheme, etc. of a future product. The same statistical model may also be used later in the product lifecycle to decide on end-use specifications to be published to system designers using the component, and even later in the product lifecycle to optimize the test specification in manufacturing test. A test vehicle is an electronic subsystem or integrated circuit device specifically designed to facilitate data acquisition needed to build the statistical model. The statistical model must handle multivariate dependency, and be scalable from the conditions of the test vehicle to the hypothetical design and manufacturing specifications of a future product.

SUMMARY OF THE INVENTION

To address the needs in the art, a method implemented by an appropriately programmed computer for determining specifications that meet electronic system or integrated circuit product requirements is provided. The method includes acquiring data from a test vehicle, fitting the data to a copula-based statistical model using an appropriately programmed computer, and using the copula-based statistical model to compute figures of merit of a future electronic system or integrated circuit product, different from the test vehicle, using the appropriately programmed computer. Test vehicles and products have multiple dependent (correlated) attributes, which are comprehended by the copula-based statistical model used to fit the test vehicle data. The computed figures of merit of the product are compared with target values of the figures of merit to determine design and manufacturing specifications of the product.

According to one embodiment of the invention, the test vehicle data includes values of attributes for each member of a population of the test vehicles manufactured by an integrated circuit manufacturing process measured as a function of environmental conditions. In one aspect, the environmental conditions can include temperature, voltage, or frequency.

In another embodiment of the invention, the copula-based statistical model describes a dependency structure of the data.

According to a further embodiment of the invention, the copula-based statistical model includes a copula and marginal distribution functions that describe a statistical distribution of each attribute of the data, where the copula and the marginal distribution functions embody a dependency on environmental conditions. In one aspect, the environmental conditions can include temperature, voltage, or frequency. In a further aspect, if the environmental dependencies are such that the copula does not depend on environmental conditions, and the marginal distribution functions depend on all environmental conditions through a single characteristic parameter, then useful flexibility in establishing set points in test specifications and datasheet specifications obtains. In another aspect, the copula is a geometrical copula that enables non-reject Monte-Carlo synthesis of synthetic data used to compute the figures of merit. According to another aspect, the copula of the statistical model has a tail dependency structure characteristic to the physics of both the test vehicle and the product. In yet another aspect, the copula is used to generate synthetic Monte-Carlo samples of instances of units with multiple attribute values, where the instances of units correspond to a censored sample of a population of the product, and where attribute values are compared to the test specifications and the datasheet specifications to determine a pass or fail status of each instance, and where the figures of merit are determined by counting instances of the pass and fail status.

According to another embodiment of the invention, the specifications include design, test and datasheet specifications.

According to another embodiment, the invention further includes determining figures of merit and their statistical confidence limits by efficient non-reject Monte-Carlo synthesis of censored synthetic product data for any experimental design, not only the experimental design which produced the test vehicle data, using the appropriately programmed computer. The efficient non-reject Monte-Carlo synthesis is enabled by choosing a geometrical copula to represent the dependency structure of the test vehicle data in the statistical model.

According to another embodiment, the invention includes determining figures of merit and their statistical confidence limits for the experimental design which produced the test vehicle data, by using resampling methods, of which one embodiment is the Bootstrap method.

In a further embodiment of the invention, the fitting includes fitting individual marginal attribute distribution models and the copula for a reference test coverage model, where the fitting of the individual marginal attribute distribution models and the copula may be done in any order. A test coverage model specifies the degree of imperfection in the manufacturing test screen for the attribute it is directly measuring.

According to yet another embodiment of the invention, the acquisition of the data using the test vehicle includes measuring attributes separately on sub-elements, called "modules", of the test vehicle, which are also modules of the product, or are similar to modules of the product.

In one embodiment of the invention, the acquisition of the data using the test vehicle includes a test program that disables all fault tolerance mechanisms in the test program and the test vehicle.

In a further embodiment of the invention, the acquisition of the data using the test vehicle includes an experimental design having conditions spanning possible datasheet specifications and test specifications of a product.

According to another embodiment, the invention further includes determining whether the figures of merit of a new product satisfy quality, reliability, and cost requirements, where the new product has design specifications, test specifications and datasheet specifications that are different from design specifications and test specifications of the test vehicle. In one aspect, the different design specifications and different test specifications include a different test coverage model from a reference test coverage model assumed in determining the statistical model from test vehicle data. According to another aspect, the different design specifications of the product include a number of circuit sub-elements (modules) that is different from the number of circuit sub-elements (modules) in the test vehicle. In a further aspect, the different design specifications include fault tolerance mechanisms that are not enabled or not present in the test vehicle but are enabled in the product. In yet a further aspect, the way in which test specifications of the test vehicle and product differ include a test program for the test vehicle specifically designed to acquire data to build the statistical model.

According to another embodiment of the invention, an analytical form of the statistical model is used by an appropriately programmed computer to enable deterministic calculation of figures of merit. In one aspect, the deterministic calculation of figures of merit enables efficient calculation of variation of figures of merit as part of characterization of the design of experiment used to obtain test vehicle data, and extract model parameters of the statistical model there from. In another aspect, the deterministic calculation of figures of merit makes the statistical model useful as a component of larger models, which impose constraints beyond the targets for figures of merit described in this invention.

BRIEF DESCRIPTION OF THE DRAWINGS

FIG. 1 shows 60 retention times measured in 5 groups of 12 for each bit, according to one embodiment of the invention.

FIG. 2 shows how $i_{min}$ and $i_{max}$ were extracted for a single bit from the retention time pass/fail record spanning 5 loops of 12 retention time measurements, according to one embodiment of the invention.

FIG. 3 shows data for several bit failures (rows) copied from an Excel workbook recording 32843 bit failures, according to one embodiment of the invention.

FIG. 6 shows retention times for the nominal skew at the highest environmental condition binned according to each bit's failing retention time in Test and in Use, and empirical marginal Test and Use distributions computed there from, according to one embodiment of the invention.

FIG. 26 shows an example user interface of an Excel calculator, which implements the models in this invention.

DETAILED DESCRIPTION

Figure 4A:
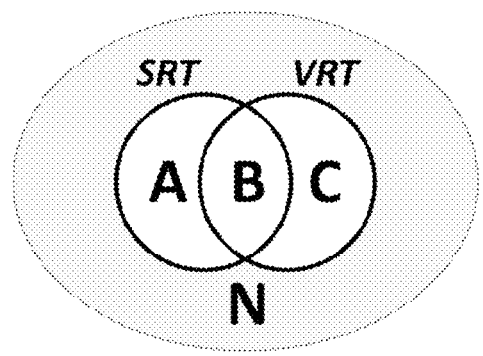
FIGS. 4a-4c show Venn diagrams of the categories used in Table 3, according to one embodiment of the invention.

A method of determining design, manufacturing test, and end-use (datasheet) specifications for an electronic system or integrated circuit product is provided. Since the method applies to both electronic systems and to integrated circuits it will be convenient to describe the method in terms of application to only one of these, namely, an integrated circuit. In the following, the term "test chip" for the integrated circuit (IC) case would be replaced by "prototype system" (or similar) for the system case; "module" (or "bit" for the DRAM example) for the IC case would be replaced by "component" for the system case, and so on.

The method includes acquisition of data from a test vehicle, where the test vehicle can be a test chip or product different from the product for which specifications are being determined. Differences between the product and the test vehicle may include different test specifications, datasheet specifications, and different design specifications. Examples of design specifications include the number (e.g. array size) of modules (e.g. bits) and the degree and type of fault tolerance required. The method further includes fitting the test vehicle data to a statistical model using an appropriately programmed computer, and using the statistical model to compute figures of merit using the appropriately programmed computer. Since the data acquired using a test vehicle includes measurements of dependent (e.g. correlated) attributes, it is necessary for the statistical model to describe this dependency. The method uses a copula-based statistical model to comprehend the dependency. The copula-based model is used to compute figures of merit and compare them with target values to determine specifications that meet requirements of the integrated circuit product. Because of properties unique to copulas, such as the decoupling of marginal distributions from the core dependency structure, the copula-based statistical model gives significant advantages in model fitting and in making inferences.

The following algorithms and equations of the current invention are implemented in a software tool using a computer, which allows the user to specify attributes of the product such as number of modules (e.g. array size), fault tolerance characteristics, manufacturing test set points and limits, and datasheet specifications of the product. The tool outputs values of figures of merit such as yield loss, overkill, and end-use fail fraction. The algorithms can also be implemented as plug-in software modules in larger software programs such as optimization engines.

The copula can be characterized independently of marginal distributions. For example, empirical rank statistics such as Kendall's tau provide a view into the underlying dependency structure (the copula), without interference by details of marginal distributions. Further, it is likely that a population copula that is independent of environmental conditions may be found since it contains only rank statistical information, which is relatively undisturbed by environmentally-induced changing marginal distributions. If an environmentally independent copula can be found, a great simplification of the model obtains, and advantages such as "equivalent set points", explained below may be realized. Additionally, copula models have an advantage over the prior art because different copula models may be tried without changing any other part of the analysis, whereas for multi-normal models the marginal and dependency structures are entangled.

Copula-based methods have a much greater flexibility than the multi-normal-based methods usually employed to represent the dependency structure of parametric attributes. Multi-normal statistics are a special case of the Gaussian copula described in this invention, and share the shortcomings of the Gaussian copula. A key shortcoming of the Gaussian copula, and therefore of the usual multi-normal model, is that these models cannot properly represent correlation that extends deep into the tail of multi-variate distributions, whereas, according to the current invention, many copulas can do this. The DRAM example below requires a deep-tail-dependence copula, which will be shown not to be satisfactorily modeled using the Gaussian copula.

An example case study using DRAM retention time correlation between Test and Use is provided to demonstrate the current invention of a copula-based statistical modeling method which is not limited to integrated circuit memory arrays, but is also applicable to more complex integrated circuits. Further, the method described here can be applied to other dependent attributes measured in the same test socket, different test sockets, and being manifested in end-use ("Use"). Examples include exploiting in a manufacturing environment the correlation of measured attributes like $I_{sb}$ to difficult- or expensive-to-measure attributes like $F_{max}$, power, or reliability lifetime. The invention enables quantitative characterization, in terms of well-defined figures of merit, of methods in which measured attributes are used to used to screen hard-to-measure correlated attributes.

Aspects unique to the application of copula methods to manufacturing test and product specification application include: Fitting and efficient synthesis of highly censored data across environmental conditions; Construction of a new kind of "geometrical" copula; Precise definition of figures of merit such as yield loss, overkill and customer-perceived fail fraction; Scaling by product size; Fault tolerance. Both model fitting and inference aspects of the copula-based statistical modeling method are covered by the invention.

Turning to the example, each memory bit of a dynamic random access memory (DRAM) retains its information as stored charge on a capacitor. After the bit has been written to, the charge leaks away so that valid data has a characteristic retention time. To retain the information, the bit must be read and refreshed. DRAM memory cells can have a defect, which causes a few bits to have a variable retention time (VRT), while most bits have stable retention times (SRT). The VRT behavior is caused by a silicon lattice vacancy-oxygen complex defect when the defect is embedded in the near surface drain-gate boundary of a DRAM cell. The defect can transition reversibly between two states. One of the states is associated with a leaky capacitor and short retention times. The VRT mechanism causes a soft-error reliability issue in DRAM arrays since a VRT bit may be tested and pass a brief retention time screen while in the low leakage state, but in extended use, a high leakage state will almost certainly occur possibly with retention time less than the system-specified refresh time. This miscorrelation of retention time between test and use is perceived as a soft-error reliability issue, which requires error correction methods to make the DRAM tolerant of single bit errors. This example of the invention shows how to measure and model this miscorrelation in a DRAM case study to establish test specifications such as set points (temperature, voltage) and limits (retention time), establish datasheet specifications (temperature, voltage, refresh time), and determine sufficient levels of fault tolerance to meet quality and reliability requirements.

Test chips with four identical DRAM arrays on each chip were fabricated in five skews of a 65 nm process as shown in Table 1. Each of the four arrays on a chip has 1218750 bits. The test chips were packaged in ball grid array packages and 10 randomly selected test chips from each of the process skews were selected for this example.

TABLE 1

Five process skews were produced for this experiment.
Slower skews have longer retention times.

| Name | Description |
| --- | --- |
| Nominal | Nominal process. |
| Slow | NMOS Slow, PMOS Slow |
| Fast/Slow | NMOS Fast, PMOS Slow |
| Slow/Fast | NMOS Slow, PMOS Fast |
| Very Slow | NMOS Slow, PMOS Slow, 20% larger than nominal capacitors. |

The arrays were tested on a Credence Quartet tester with 145 I/Os and seven power supplies and the temperature was controlled by a Silicon Thermal Powercool LB300-i controller. Retention time for each bit was measured at 18 environmental conditions:

three temperatures: 105° C., 115° C., 125° C. Temperature was measured by a calibrated sensor on the silicon die.

three $V_d$'s: 0.8, 1.0, 1.2 volts. $V_d$ is the supply voltage.

two $V_p$'s: 0.4, 0.45 volts. $V_p$ is the substrate bias.

60 retention times in five groups of 12 were measured for each bit, shown in FIG. 1, and as follows:

12 retention times (r) were tested, increasing from 60 au to 604 au in steps of 49.5 au: r=10+i×49.5 au, i=1 to 12, with "pass" or "fail" determined at each retention time. To obscure proprietary aspects of the data, and the fitted model, retention times are given in arbitrary units (au), which are related to the true retention times by a numerical ratio.

This was repeated five times, with each repetition called a "loop". The repeated loops were separated by variable durations, typically many hours.

At each environmental condition the pattern (FIG. 1) of retention time failures observed for each bit was used to classify a bit as not failing (r>604 au), or as failing by either variable retention time (VRT) or by stable retention time (SRT). If a bit failed on the first reading on any loop, it was also classified as a zero retention time ZRT bit. At each environmental condition any given failing bit may be classified as SRT or VRT and ZRT or not-ZRT. The classification of a given bit may be different in a different environmental condition.

EXAMPLES

SRT: r index varies by ≤1 within loop, or loop-to-loop (two examples).

```
000000011111    000000011111    000000011111
000000011111    000000011111    000000001111
000000001111    000000011111    000000001111
000000011111
```

VRT: r index varies by ≥2 within loop, or loop-to-loop (two examples).

```
000000000111    000011111111    000000001111
000000001111    000000000111    000110111111
000001111111    000111101111    000001111111
000111111111
```

(This pattern is used in an example below).

SRT/ZRT: r index=0 in any loop. r index varies by ≤1 within loop, or loop-to-loop (two examples).

```
111111111111    111111111111    111111111111
111111111111    111111111111    111111111111
111111111111    111111111111    011111111111
011111111111
```

VRT/ZRT: r index=0 in any loop, and r index varies by ≥2 within loop, or loop-to-loop (one example).

```
111111111111    111111111111    001111111111
111111111111 011111111111
```

For each bit and each environmental condition, the pass/fail patterns were processed to extract the index of the smallest passing retention time, $i_{min}$, and the index of the longest passing retention time, $i_{max}$. $i_{max}$ was found by "AND-ing" all loops for a bit and finding the index of the first "0" counting from the right. $i_{min}$ was found for the same loop data by "OR-ing" all loops and finding the last "0" counting from the left. The method is shown in FIG. 2 for the second VRT example above. If the first measurement of retention time in any loop is a failure ("1"), then $i_{min}$=0.

Bits for which $i_{min}$=0 in any loop were classified as zero retention time (ZRT) bits. Bits for which $i_{max}-i_{min}\le 1$ were classified as stable retention time (SRT) bits. The margin of 1 allows for the possibility of tester variation in case the bit retention time falls on a retention time bin boundary. Bits for which $i_{max}-i_{min}\ge 2$ were classified as variable retention time (VRT) bits. The reason for repeating the retention time measurement sequence five times is to give bits plenty of opportunity to show variable retention time behavior.

Provided is a description of the data, where a total of 32843 bit retention time failures were recorded from 48750000 bits in each skew across 18 environmental conditions (temperature and voltage). The data were censored because only bits failing with retention times less than 604 au were recorded. The same bit could be recorded as a failure multiple times because, within a skew, the same bit may fail in multiple environmental conditions. FIG. 3 shows data for a few failures (rows) copied from the Excel workbook containing all the data. The field names (columns) are defined in Table 2.

TABLE 2

Definitions of data fields used in DRAM data records.

| Group | Field | Description |
|---|---|---|
| Identity | skew | Process skew code. Values = 4, 8, 9, 10, 12. |
|  | chip | Which of 10 chips sampled contains the macro. Values = 1-10. |
|  | macro | Macro which contains PX, PY bit. Values = 0, 1, 2, 3. |
|  | PX, PY | x, y coordinates of bit. |
| Environmental | Vp | Value of Vp. Values = 0.4, 0.45 |
|  | Vd | Value of Vd. Values = 0.85, 1.0, 1.2 |
|  | temp | Temperature (° C.) Values = 105, 115, 125. |
| Results of Test | IRetMin | Minimum retention time index derived per FIG. 2. If IRetMin = 0, the bit is a ZRT bit. |
|  | IRetMax | Maximum retention time index derived per FIG. 2. |
|  | IRetDelta | IRetDelta = IRetMax-IRetMin If IRetMin > 0 and IRetDelta ≤ 1, the bit is a SRT bit. If IRetMin > 0 and IRetDelta > 1, the bit is a VRT bit |
|  | Loop Groups | Pass/Fail record of bit at specified environmental condition. |

Provided below is a classification of bits into categories to give an overview of the nature and significance of the miscorrelation phenomenon to be analyzed by the method of this patent. The data in FIG. 3 were used to classify the observed failing bits as either SRT or VRT, and each of these as ZRT or not-ZRT for each environmental condition. Any given to bit could be classified differently in any of the 18 environmental conditions. A summary of the statistics when each category is OR-ed across all environmental conditions is given in Table 3. This gives a measure of the fraction of defective bits of various kinds in each skew. For example, in the nominal skew, 1610 of 48750000 bits remained as SRT bits across all environmental conditions; although the retention times varied from bit to bit they were always stable through time. Also, for this skew, 288 of 48750000 bits were observed as either SRT or VRT depending on the environmental condition. And 64 of 48750000 bits were observed only as VRT bits in all 18 environmental conditions. Also, 10 of 288+64=352 bits which exhibited VRT behavior were also seen as ZRT bits at some environmental condition, and four of 1610 bits which exhibited only SRT behavior were seen as ZRT bits in some environmental condition.

An important observation from Table 3 is that for the Nominal skew 18%=(B+C)/(A+B+C) of the 40 DPPM of bits observed to fail within the environmental and retention time span of the experiment exhibited VRT behavior. Since the environmental and retention time settings span realistic Test and Use conditions, the number of SRT/VRT failures implies that bit repair or fault tolerance schemes will be necessary in the design of any practical DRAM array with thousands or millions of bits. It also shows that the VRT failure mode is a significant contributor to the soft error failure rates, along with contributions from other sources such as cosmic rays.

TABLE 3

Figure 4B:
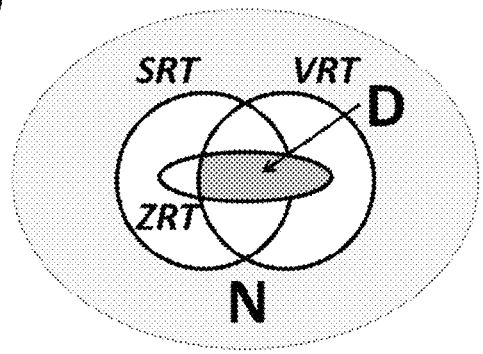
Figure 4C:
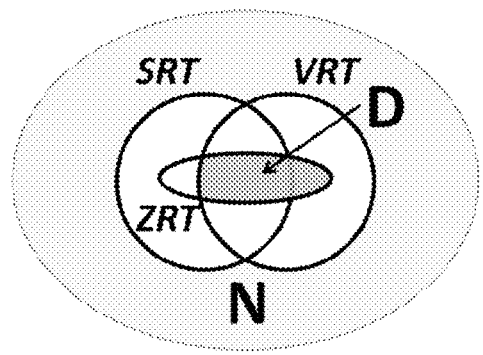

Bit-count and defective parts-per-million (DPPM) statistics of bit failure modes OR-ed across all environmental conditions. The keys are explained by the Venn diagrams in FIGS. 4a-4c.

| | | Skew | | | | |
|---|---|---|---|---|---|---|
| Description | Key | Nominal | Slow | Fast/Slow | Slow/Fast | Very Slow |
| SRT, but not VRT | A | 1610 | 833 | 2092 | 1042 | 501 |
| VRT and SRT | B | 288 | 124 | 787 | 280 | 83 |
| VRT, but not SRT | C | 64 | 24 | 141 | 73 | 10 |
| ZRT and VRT | D | 10 | 4 | 10 | 6 | 0 |
| ZRT and SRT, but not VRT | E | 4 | 2 | 4 | 2 | 0 |
| Total Bits | N | 48750000 | 48750000 | 48750000 | 48750000 | 48750000 |
| SRT (incl. ZRT) DPPM | A/N | 33.0 | 17.1 | 42.9 | 21.4 | 10.3 |
| VRT (incl. ZRT) DPPM | (B + C)/N | 7.2 | 3.0 | 19.0 | 7.2 | 1.9 |
| ZRT DPPM | (D + E)/N | 0.29 | 0.12 | 0.29 | 0.16 | 0.00 |

Figure 5:
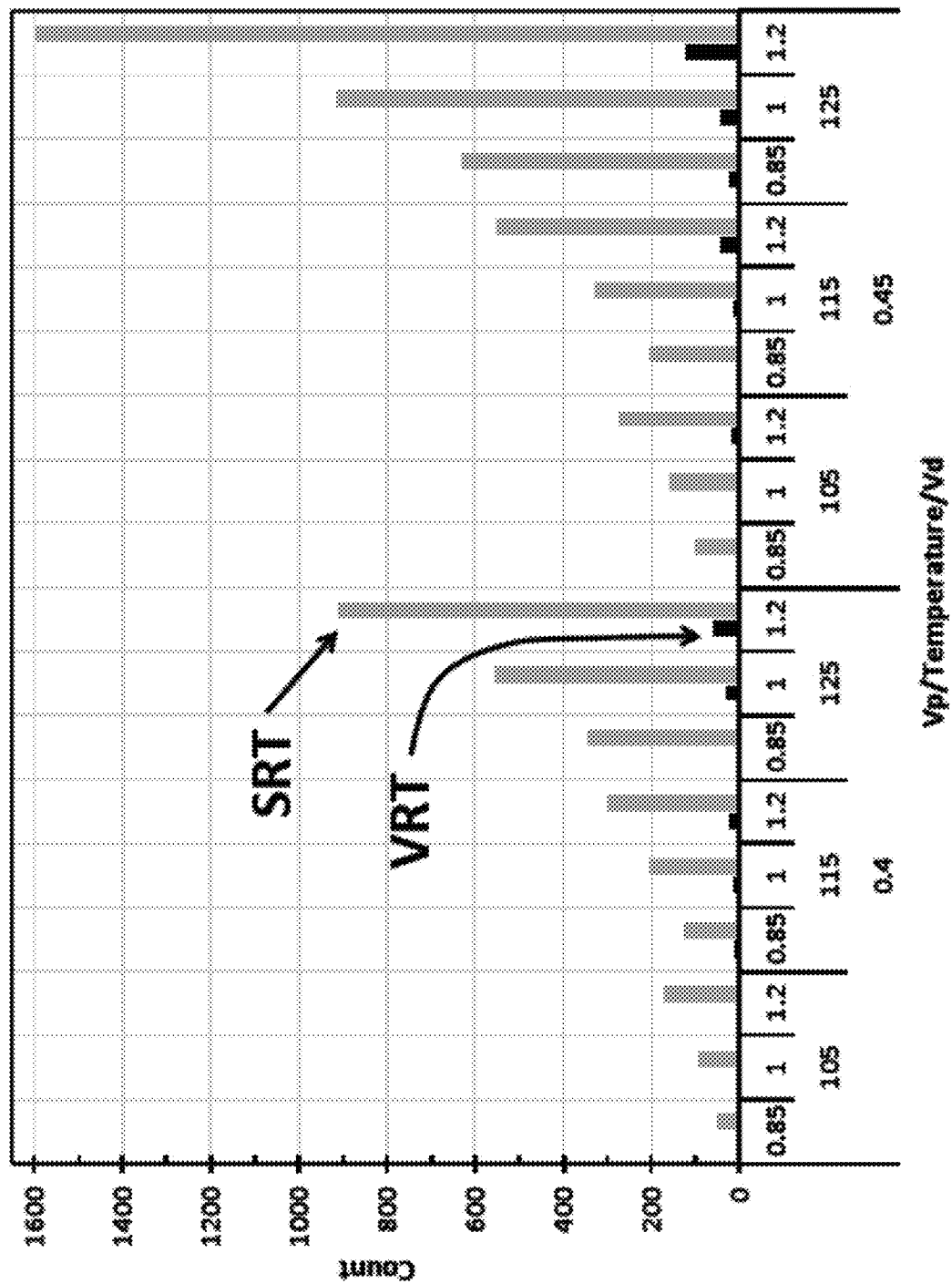
FIG. 5 shows counts of bits in SRT and VRT categories as a function of environmental conditions for the nominal skew for retention times less than 604 au (arbitrary units of time). Each bar is sampled from 48750000 bits, according to one embodiment of the invention.

The environmental dependence of the SRT and VRT categories is shown in FIG. 5. Within each environmental condition, these categories are mutually exclusive. The strong temperature and voltage dependence is apparent. It will be shown that these data are accurately fitted with exponential voltage dependence, and Arrhenius temperature dependence.

The method of this patent requires extraction of a statistical model for the actual retention times for each bit, rather than of the coarse categories (SRT, etc.) into which bits may fall according to their retention time behavior. In the example experiment, for a given skew and environmental condition, every failing bit will have minimum retention time of $r_{min}$ and a maximum retention time of $r_{max}$ observed in the course of 60 repeated measurements (12 measurements in five loops). On the other hand, in Test and Use conditions, the retention time of a bit at Test, $r_{test}$, is measured just once, and the retention time in Use, $r_{use}$, is sampled an indefinitely large number of times as the memory is used.

It is necessary to associate $r_{max}$ and $r_{min}$ with $r_{test}$ and $r_{use}$ in a way that does not underestimate the failure rate of bits in use. This association is an example of a "test coverage model". The most conservative association from the customer standpoint, predicting the highest escape rate, is $r_{test}=r_{max}$, and $r_{use}=r_{min}$. This association is called the "conservative test coverage model". It is clear that $r_{use}$ should be associated with $r_m$, since $r_{min}$ is the result of many repeated measurements, mimicking Use. In reality, the probability that $r_{max}$ will occur in Test depends on the fraction of time a bit is in the maximum retention time state. Since this fraction cannot be determined from the results of the experiment because the intervals between measurements are not precisely known, it is conservative to assume that Test always measures $r_{max}$. Measurement of the fraction of time a bit spends in high and low retention time states would provide information allowing this conservative assumption to be relaxed.

Although the model that is ultimately used assumes $r_{test}=r_{max}$, and $r_{use}=r_{min}$ it is more convenient for the initial model extraction to assume that the assignment $r_{test}=r_{max}/r_{use}=r_{min}$, and $r_{test}=r_{min}/r_{use}=r_{max}$ are made with equal probability for each bit. This assignment is called the "symmetrical test coverage model". Shown below is an analytical way to invoke the conservative test coverage model that $r_{test}=r_{max}/r_{use}=r_{min}$ when making inferences from the model extracted assuming the symmetrical test coverage model. Besides simplifying model extraction, this technique has the advantage of enabling exploration of the sensitivity of inferences to any chosen test coverage model. This might be used to evaluate the return on the investment of a more precise time-in-state characterization of variable retention times. An example of an empirical probability density function for a single skew at the highest environmental condition derived by assuming a symmetrical test coverage model is shown in FIG. 6.

Figure 6:
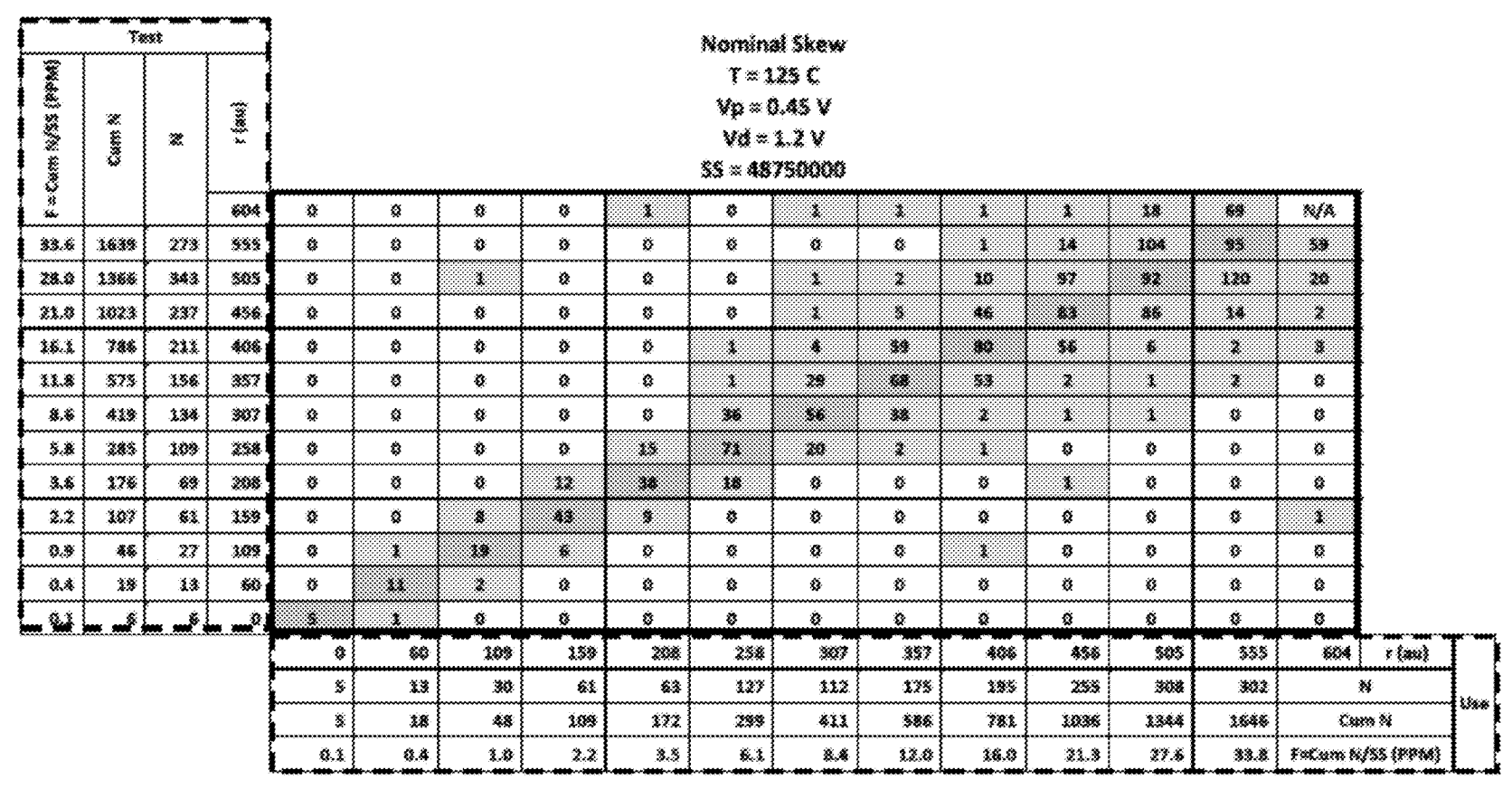

The next step, shown in the dashed-line areas of FIG. 6, is to extract empirical marginal distributions for Test and Use by summing fail counts in rows, and in columns, and then computing the cumulative fail count and cumulative fraction fail for each. This was done for each of the 5 skews at each of the 18 environmental conditions. The marginal distributions of Test and Use for the DRAM are the same, apart from some sampling noise, because of the symmetrical way in which $r_{min}$, and $r_{max}$ were assigned to $r_{use}$ and $r_{test}$. Notice from the figure that only a tiny part of the entire sample space near the origin is of practical significance—a fraction of only about 34 parts per million (PPM) of the sample space was observed. This is typical of integrated circuit test correlation data.

Figure 7:
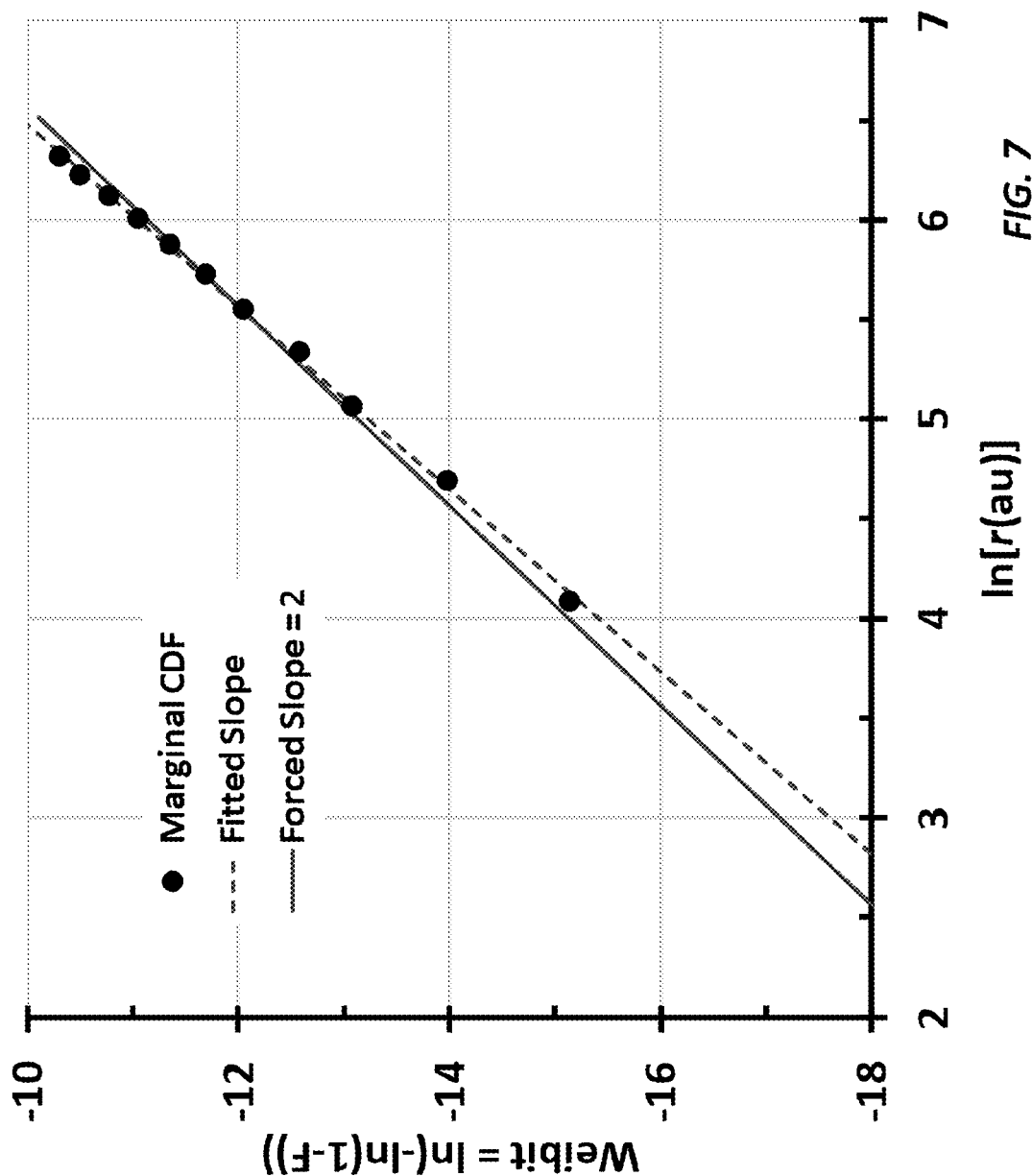
FIG. 7 shows a Weibull distribution fitted to the (equal) margins of the nominal skew data in FIG. 6, according to one embodiment of the invention.

Also typical of parametric test data in general is the strong increase in cumulative fraction failing as a function of the test condition, which suggests fitting of the empirical marginal distributions in FIG. 6 to a Weibull model distribution. The Weibull distribution is a natural choice because, with a shape parameter $\beta>1$, it can fit data for which the proportional increase in fraction failing per unit increase in retention time is a strongly increasing function, as observed here. FIG. 7 is a plot of $\ln(-\ln(1-F))$, known as the "Weibit", versus $\ln(r)$. Slope and intercept of lines fitted to these data give estimates of the shape, $\beta$, and scale, $\alpha$, parameters of the Weibull distribution of retention time, r, in $$F(r) = 1 - \exp\left[-\left(\frac{r}{\alpha}\right)^\beta\right], \text{ or} \quad (1)$$

$$Weibit = \ln(-\ln(1-F)) = \beta\ln(r) - \beta\ln(\alpha)$$

for both Test and Use.

The fitted marginal distributions were simplified by forcing $\beta=2.0$ in the fit of all marginal distributions, as exemplified by the dashed line in FIG. 7. Visual examination of all fitted distributions shows that this gives a small underestimate of the retention time at short retention times. Such an underestimate is conservative from the standpoint of customer-perceived quality. This analysis was repeated for each of 18 environmental conditions for each of five skews.

Figure 8:
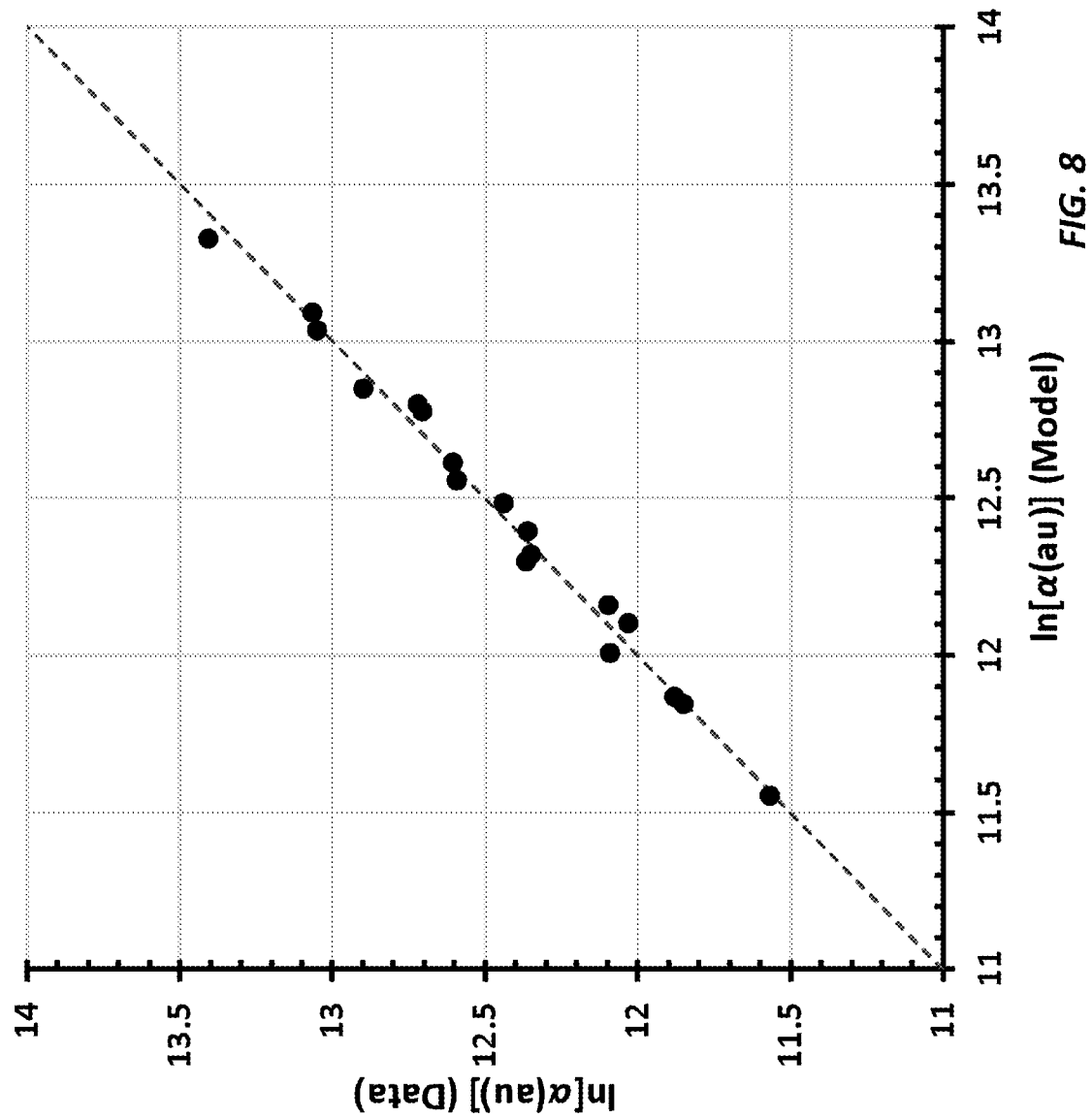
FIG. 8 shows the quality of fit of characteristic retention time to an exponential voltage, Arrhenius temperature, and model in Eq. (2) at 18 environmental conditions for the nominal skew, according to one embodiment of the invention.

For each skew, this method extracts a value of the natural log of the characteristic retention time, $\ln \alpha$, for each of 18 environmental conditions. The characteristic retention time, α, accurately fits an exponential voltage dependence and Arrhenius temperature dependence:

$$\ln\alpha = \ln\alpha_0 + a(V_p - V_{p0}) + b(V_d - V_{d0}) + \frac{Q}{k_B}\left(\frac{1}{T} - \frac{1}{T_0}\right) \quad (2)$$

where the subscript 0 indicates a reference environmental condition. The reference condition has been chosen arbitrarily as the maximum stress condition in the experiment. ln $\alpha_0$ is the natural logarithm of the characteristic retention time in au at this condition. $V_d$ is the supply voltage, $V_p$ is the substrate bias voltage, and T (° K) is the temperature. The quality of the fit is shown in FIG. 8. It is known that the activation energy of retention time is between 0.6 eV and 1 eV for SRT bits and VRT bits in the low-leakage state and about 0.2 eV for VRT bits in the high leakage state. In this example the fitted value of Q is about 0.6 eV (Table 4). This is expected since most observed bits are in the low leakage state. The low activation energy of VRT bits in the high leakage state could lead to under-estimates of customer risk if the model is extrapolated beyond the range of the data on the low temperature side. However, the data spanned the test conditions and use conditions so extrapolation is not needed.

Regarding the equivalent set point method, environmental conditions enter the statistical model only through ln α, and through possible environmental dependence of the copula. If, in addition, the fitted copula model is environmentally independent, as will be seen for the best fit to the DRAM example (wedge copula), then test specifications or datasheet specifications which have a given value of r/α are statistically equivalent and so give the same figures of merit. In Test, this is useful because temperatures cannot be quickly changed from test to test in an integrated test program, whereas voltages and retention time settings can be. So rapid voltage and/or retention time setting changes can be used instead of equivalent slow temperature setting changes. In Use, equivalence of datasheet specifications with a given value of r/α gives flexibility since temperature or voltage supply specifications may be constrained by other components in a system. The set point flexibility enabled by environmental independence of the copula, and marginal distribution dependence only on r/α, is called the equivalent set point method.

Kendall's tau is a statistic used in the invention to measure the similarity of the rank orderings between a pair of attributes measured on a population of units. Its value ranges from 1 when the ranks are the same, through 0 when there is no relationship between ranks, to −1 when the ranks are opposite. Suppose that $\{(x_1, y_1), (x_2, y_2), \ldots (x_n, y_n)\}$ denotes a random sample of n observations sampled from a population 2-vector of continuous random variables, (X, Y). Any pair of observations, i and j, may be labeled "concordant", or "discordant", according to whether the sense of the inequality between $x_i$ and $x_j$ is the same or the opposite to the inequality between $y_i$ and $y_j$. There are a total of n(n−1)/2 pairs of observations, of which c are concordant and d are discordant. Kendall's tau for the random sample is defined as $$\tau' = \frac{c - d}{c + d} = \frac{2(c - d)}{n(n - 1)} \quad (3)$$

where the prime indicates a sample estimate of tau. The definition of the sample tau in Eq. (3) assumes that the sampled values are known with arbitrary numerical resolution so that they can be ranked with no ties.

Test data, such as FIG. 6, has limited resolution and is "binned" so that ties in x's and y's occur. The definition, Eq. (3), has a known extension to take ties into account. The sample tau for data with ties is $$\tau' = \frac{c - d}{\sqrt{\frac{1}{2}n(n-1) - U}\sqrt{\frac{1}{2}n(n-1) - V}} \quad (4)$$

where now any pairs that are tied in x or y are not counted in either c or d, and where $$U = \frac{1}{2}\sum u(u - 1), \quad V = \frac{1}{2}\sum v(v - 1). \quad (5)$$

The sum in Eq. (5) is over all sets of tied x-values, and u is the number of tied x values in each set. V is defined in the same way, but for y-values. Code to implement (4) is known.

Figure 9:
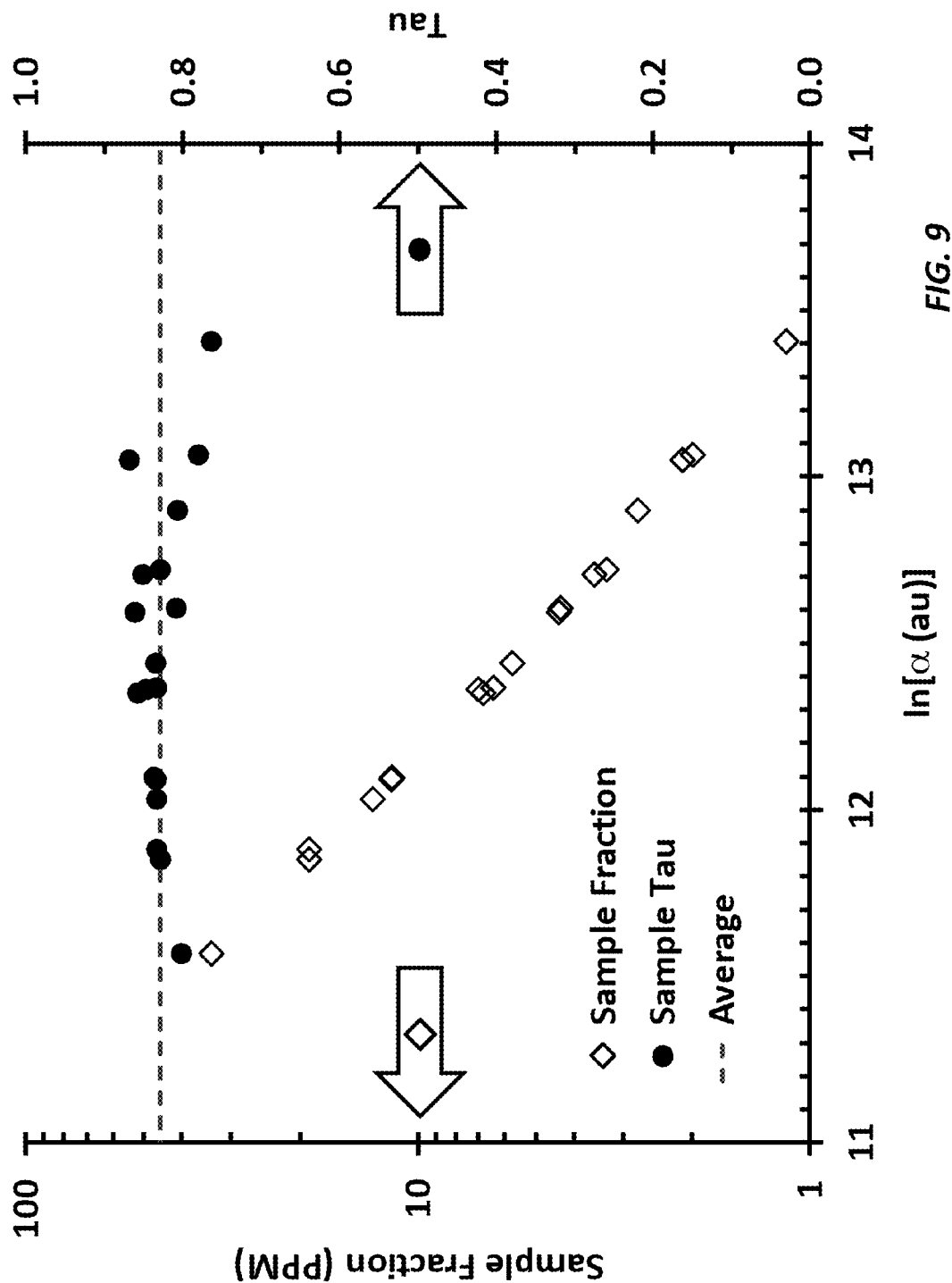
FIG. 9 shows Kendall's tau and sample fraction values for the measured sample of retention time data plotted as a function of environmental condition measured by characteristic retention time for the nominal skew, according to one embodiment of the invention.

For each environmental condition of each skew, Eq. (4) was used to compute Kendall's tau for the measured sample of retention time data. These values are plotted as a function of environmental condition for the nominal skew in FIG. 9, along with the fraction of the population of 48750000 bits tested. Note that the sample tau is independent of environmental condition (ln α) and the degree of censoring (sample fraction). This was true for all skews, not only the nominal skew shown in FIG. 9. Moreover, since Table 4 shows the average value of tau across environmental conditions for each skew, it is clear that the value of tau does not vary greatly from skew to skew. This key result is consistent with an environmental and skew independence of the underlying dependency structure of the DRAM VRT behavior embodied in the copula.

TABLE 4

Parameters of extracted marginal and dependence models.
Sample tau extracted from data via Eq. (4), averaged across
environmental conditions, is also given.

|  |  | Skew | | | | |
| --- | --- | --- | --- | --- | --- | --- |
|  |  | Nominal | Slow | Fast/Slow | Slow/Fast | Very Slow |
| Margin |  | 2.0 | 2.0 | 2.0 | 2.0 | 2.0 |
|  | $\ln[\alpha_0(au)]$ | 11.57 | 11.93 | 11.39 | 11.72 | 12.15 |
|  | $a_0$ | −5.79 | −4.00 | −5.71 | −5.55 | −4.52 |
|  | $b_0$ | −1.55 | −1.09 | −1.47 | −1.87 | −1.23 |
|  | $Q_0$ (eV) | 0.605 | 0.572 | 0.658 | 0.566 | 0.630 |
|  | $V_{p0}$ | 0.45 | 0.45 | 0.45 | 0.45 | 0.45 |

TABLE 4-continued

Parameters of extracted marginal and dependence models.
Sample tau extracted from data via Eq. (4), averaged across
environmental conditions, is also given.

| | | | Skew | | | | |
|---|---|---|---|---|---|---|---|
| | | | Nominal | Slow | Fast/Slow | Slow/Fast | Very Slow |
| | $V_{d0}$ | | 1.2 | 1.2 | 1.2 | 1.2 | 1.2 |
| | $T_0$ | | 125 | 125 | 125 | 125 | 125 |
| Dependence | SampleTau | | 0.828 | 0.828 | 0.769 | 0.802 | 0.822 |
| | Wedge Copula | c | 1.142 | 1.140 | 1.185 | 1.174 | 1.144 |
| | Gaussian Copula | (1-) × 1E3 | 0.695 | 0.646 | 1.250 | 1.026 | 0.634 |

Turning now to modeling the dependence observed in the example data summarized in Table 4 using a copula-based statistical model, start by observing that FIG. 6 is an empirical sampling of a bi-variate probability density function (pdf), which here is taken to be h(x, y). In this pdf, for convenience, $r_{use}/\alpha$ is denoted by x, and $r_{test}/\alpha$ is denoted by y. The off-diagonal cells in FIG. 6 are populated by counts of units for which Use and Test measurements of retention time are mis-correlated. The marginal cumulative distributions for Test and for Use are also shown in FIG. 6 by the dashed-line areas. Separation of modeling of marginal distributions from modeling the dependency structure of the data is a key aspect and major benefit of the current invention.

For perfect correlation the pdf sampled in FIG. 6 would be a line of probability density running up the diagonal $$h(x,y) = f(x)\delta(x-y) \quad (6)$$

where $\delta(\cdot)$ is Dirac's delta function, and $f(x)$ is the pdf of the marginal distributions (both equal for the DRAM case study), $$f(x) = \frac{dF(x)}{dx} \quad (7)$$

where F(x) is the cumulative density function (cdf) of the marginal distributions.

Figure 10:
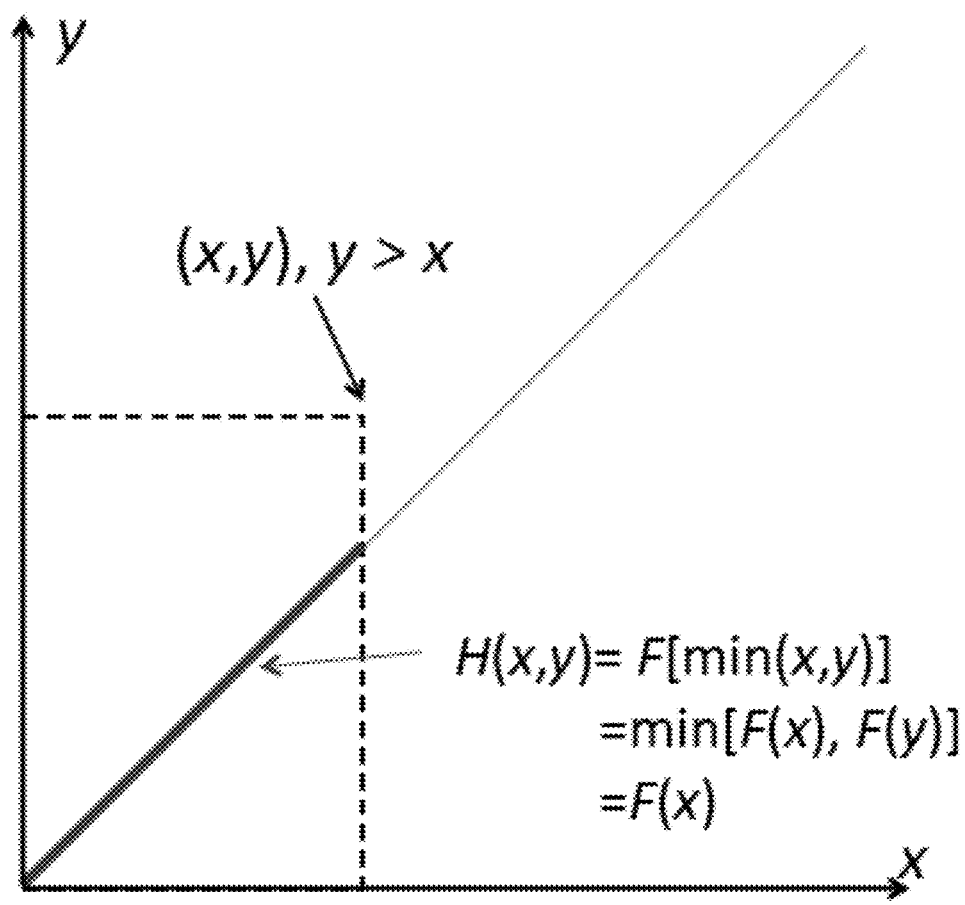
FIG. 10 shows a geometrical interpretation of the two-dimensional cumulative distribution function corresponding to perfect correlation, according to one embodiment of the invention.

Now, consider the corresponding two-dimensional cdf:

$$H(x, y) = \int_0^x dx' \int_0^y dy' h(x', y') \quad (8)$$

$$= \int_0^x dx' \int_0^y dy' f(x')\delta(x'-y')$$

$$= \begin{cases} \int_0^x f(x') \left[\int_0^y \delta(x'-y')dy'\right] dx' = \\ \quad \int_0^x f(x') \times 1 \times dx' = F(x) \quad y \geq x \\ \int_0^y \left[\int_0^x f(x')\delta(x'-y')dx'\right] dy' = \\ \quad \int_0^y f(y')dy' = F(y) \quad x \geq y \end{cases}$$

$$= \min[F(x), F(y)]$$

where, for $y \geq x$, $[\cdot] = 1$ because $x' \in [0, y]$, and for $x \geq y$, $[\cdot] = f(y')$ because $y' \in [0, x]$. A geometrical interpretation of Eq. (8) is shown in FIG. 10, where for perfect correlation, the probability density is a delta function on the diagonal. The two-dimensional cdf is the probability mass enclosed by a rectangle with one corner pinned at (0, 0).

On the other hand, for perfect independence, elementary probability theory gives the two dimensional cdf as the product of the marginal cdfs $$H(x,y) = F(x)F(y). \quad (9)$$

Generalizing, if the marginal cdfs are different, for perfect correlation $$H(x,y) = \min[F(x), G(y)], \quad (10)$$

and for perfect independence $$H(x,y) = F(x)G(y). \quad (11)$$

A copula is the multi-dimensional cdf written as a function of the marginal cdfs, rather than the marginal variables, $$H(x,y) = C[F(x), G(y)] \quad (12)$$

or $$C(u,v) = H(F^{-1}(u), G^{-1}(v)), \quad (13)$$

so Eqs. (10) and (11) are special cases of Eq. (12) where C is one of the first two of the following special copulas $$C(u, v) = \begin{cases} \min[u, v] & M(u, v) \text{ Perfect correlation} \\ uv & \Pi(u, v) \text{ Independence} \\ \max[u+v-1, 0] & W(u, v) \text{ Perfect anti-correlation} \end{cases} \quad (14)$$

All possible multi-dimensional cdfs have copulas which are bounded above by M, the Frechet Upper Bound, and below by W, the Frechet Lower Bound. Π and all other copulas lie between these limiting functions.

Copulas have four defining properties. A 2-dimensional copula is a cdf with range [0, 1] on domain $[0, 1]^2$ (the unit square) which has the following properties:
1. Grounded.

$$C(u,0) = 0 = C(0,v). \quad (15)$$

2. Normalized.

$$C(1,1) = 1. \quad (16)$$

3. Uniform marginal distributions.

$$C(u,1) = u \text{ and } C(1,v) = v. \quad (17)$$

4. 2-increasing. For every $u_1, u_2, v_1, v_2$ in [0, 1] such that $u_1 \leq u_2$ and $v_1 \leq v_2$ $$C(u,v) - C(u,v) - C(u,v) + C(u,v) \geq 0. \quad (18)$$

Figure 11:
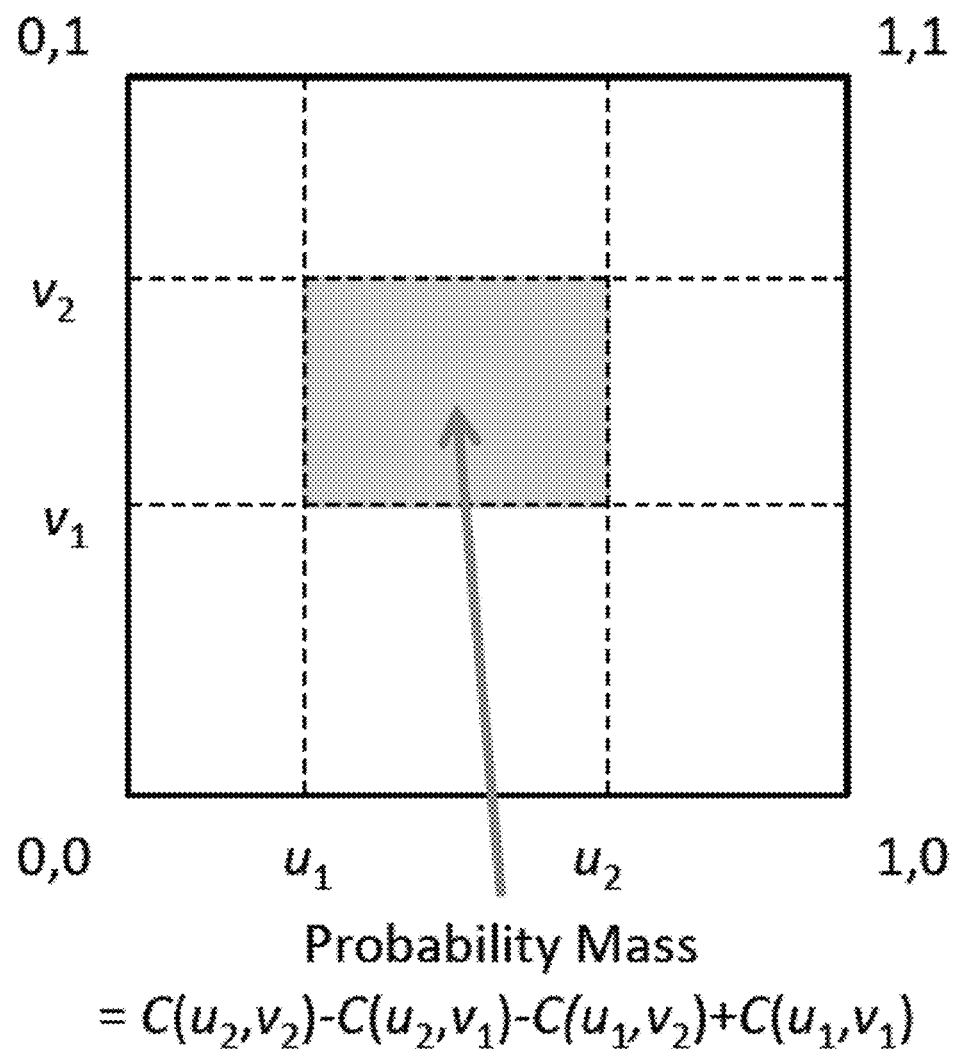
FIG. 11 shows how the probability mass in any sub-domain of a copula is computed from the copula function, according to one embodiment of the invention.

The expression on the left side of Eq. (18) is the probability mass in the region defined by $u_1, u_2, v_1, v_2$ in [0, 1] such that $u_1 \leq u_2$ and $v_1 \leq v_2$. The method of computing probability mass in a sub-area of $[0, 1]^2$ shown in FIG. 11 is used extensively in the description of this invention.

These concepts can be extended in several known ways. One way is to consider more than two independent variables. Another way is to relax one or more of the four defining properties of a copula. A pseudo-copula relaxes condition 3, Eq. (17). For a pseudo-copula, condition 3 becomes $$C(u,1)=F(u) \text{ and } C(1,v)=G(v), \qquad (19)$$

where F has the properties of a one-dimensional cdf, that is $F(0)=0$, $F(1)=1$, and $F(u)$ is a monotonically increasing function and similarly for G. In the current invention a copula is fitted to test vehicle data, and then a pseudo-copula is constructed to make model inferences. A pseudo-copula is also the starting point for definition of a class of "geometrical" copulas described in this invention.

Figure 12:
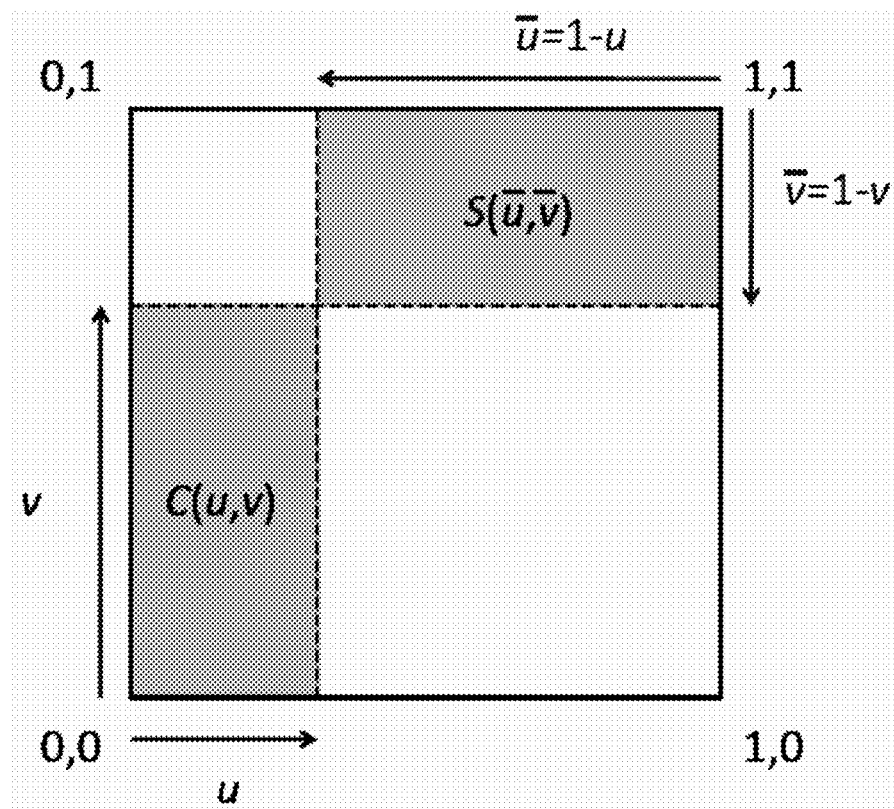
FIG. 12 shows the relation of the copula and corresponding survival copula, according to one embodiment of the invention.

Another known extension of the copula concept used here is the survival copula, illustrated in FIG. 12. A 2-dimensional copula is the fraction of the population failing by both marginal cdfs (that is, $u<1$ and $v<1$) as a function of the marginal fail cdfs, u and v. The corresponding survival copula is the fraction of the population surviving by both marginal cdfs (that is, $u \geq 1$ and $v \geq 1$) as a function of the marginal survival cdfs $\bar{u}=1-u$ and $\bar{v}=1-v$. Using Eq. (18), from FIG. 12 it is apparent that the survival copula is related to the copula by $$\begin{aligned} S(\bar{u}, \bar{v}) &= C(1, 1) - C(u, 1) - C(1, v) + C(u, v) \\ &= 1 - C(1-\bar{u}, 1) - C(1, 1-\bar{v}) + C(1-\bar{u}, 1-\bar{v}) \\ &= \bar{u} + \bar{v} - 1 + C(1-\bar{u}, 1-\bar{v}) \end{aligned} \qquad (20)$$

where the second equality applies to copulas and pseudo-copulas, and the final equality applies to copulas.

The foundation of the copula method is Sklar's theorem, which states that the decomposition of a given multidimensional cdf H into its marginal distributions and the function C in Eq. (12) is unique. That is, there is only one function C, which satisfies Eq. (12) for a given H. Moreover, it has been shown that the copula corresponding to a joint cdf of statistical variables is invariant under strictly increasing transformations, say $\psi$ and $\zeta$, of the arguments of the cdf. That is, if $$H(x,y)=C[F(x),G(y)] \qquad (21)$$

then the transformed cdf has the same unique copula, C $$H'(x,y)=H[\psi(x),\zeta(y)]=C[F'(x),G'(y)], \qquad (22)$$

where $F'(x)=F(\psi(x))$ and $G'(y)=G'(\zeta(y))$.

A copula contains all the information of rank dependency of its marginal variables. Kendall's tau is a statistic which summarizes this rank dependency. Tau is best understood by considering how to compute the "sample" tau from data (real or synthesized) per Eq. (3). Less intuitively, the "population" tau can also be computed from the analytical form of a copula using the known formula:

$$\begin{aligned} \tau &= 4 \int \int_{I^2} C(u,v) dC(u,v) - 1 \\ &= 4 \int_0^1 du \int_0^1 dv C(u,v) \frac{\partial^2 C(u,v)}{\partial u \partial v} - 1 \end{aligned} \qquad (23)$$

where the second equality shows the copula pdf (the mixed second derivative) explicitly. It is important to note that Eq. (23) depends only on the copula, and not on the marginal distributions.

Although tau does not in general uniquely determine the copula, for a family of copulas spanned by a single parameter, a sample estimate of tau from data can be used to determine the parameter. The parameter of the copula is determined by adjusting it to make the model population value of tau from Eq. (23) match the sample estimate of tau. This gives an easy way to fit single-parameter copula models to data provided that the data is sampled from the entire population space. However, test data is typically highly censored. Remember that the conditions of the DRAM experiment span only about 40 PPM near the origin of the copula. The sample tau for the censored data can still be used to determine the copula parameter if the model tau is computed only from part of the population model copula corresponding to the censored data. If Test and Use right-censor x and y $$x_i \leq a, y_i \leq b \qquad (24)$$

then the "sub-population" model tau computed from a generalization of Eq. (23) for a restricted domain, $[0, u_a \equiv F(a)] \times [0, v_b \equiv G(b)]$ of $[0, 1]^2$ is $$\tau_{subpopulation} = \frac{4}{C^2(u_a, v_b)} \int_0^{u_a} du \int_0^{v_b} dv C(u,v) \frac{\partial^2 C(u,v)}{\partial u \partial v} - 1 \qquad (25)$$

which depends on the censor limits a and b, as well as the parameter(s) of the copula. For $u_a=v_b=1$ the censored sub-population is the same as the entire population and Eq. (25) reduces to the population formula of Eq. (23). Eq. (25) is a new result, derived below, which is part of the invention described here.

Analytical evaluation of Eq. (23) or Eq. (25) can be daunting. According to one embodiment of the invention, an alternative method of computing tau is Monte-Carlo (MC) synthesis of data from a copula by any of many known methods, and evaluation of tau using Eq. (3). This is a good way to evaluate the population tau corresponding to Eq. (23). But the MC evaluation of the copula model subpopulation tau corresponding to the highly censored data can be very inefficient if the samples cannot be confined to the region of the data, and many samples must be rejected. According to another embodiment of the invention, a geometrical copula of the kind described in this invention provides a way to compute the subpopulation tau by the MC method with complete efficiency because samples can be confined to any sub domain of the copula. This is not true of copulas in general.

The main challenge to use of copula methods is choosing a copula that makes sense for the particular application. In spite of the constraints on the functions which qualify as copulas, there are many sometimes exotic functions that are copulas. Many have interesting properties but the properties are often not related to an obvious underlying stochastic mechanism. They may also have limited parametric flexibility to fit data. For example, Archimedian copulas have nice algebraic properties, which Make them tractable and model-fitting methods have been developed, but it is often hard to relate them to a plausible underlying mechanism, and even to appreciate their geometrical shapes. A non-Archimedian example is the Marshall-Olkin copula, which is a natural bi-variate extension of the Poisson process and so has an intuitive stochastic interpretation. But the Marshall-Olkin copula is not flexible enough to fit many scenarios, including the DRAM example. A third example is the Gaussian copula, which is a well-known extension of the multi-normal distribution. As shown below, when the Gaussian copula is fitted to the data of the DRAM example it had the drawback that its parameter was forced to an implausible limit to fit the data.

Geometrical copulas offer an intuitive and practical approach to the problem of choosing a copula for manufacturing test applications. Geometrical copulas define probability densities along easy to visualize lines and regions of the copula's domain. These shapes can be adjusted by parameters with geometrical interpretations. According to the current invention, test data is acquired over a range of environmental conditions and sample sizes, which span the application over which the model is used. This means that the copula needs to "look like" the data, and the fitted model will not be used to extrapolate far from the data. For the DRAM application example two geometrical copulas, the "stripe" and the "wedge", in addition to the Gaussian copula are derived and fitted to the data.

An indicator that can also guide the choice of copula for test applications is the limit $$LT = \lim_{u \to 0+} \frac{C(u, u)}{u} \quad (26)$$

which characterizes the lower tail dependence of C(u, v) near the origin. It is seen by inspection of Eq. (14) that this limit vanishes for copulas Π and W, but is unity for M Any finite value for this limit indicates that the copula has asymptotic dependence in the lower tail. Since one would expect dependence of retention times observed in Test and in Use to persist even for the few units, which have very short retention times, a copula for which this limit is finite is a good model candidate for the DRAM example.

According to the invention, a major benefit of copula models is that they provide a deterministic semi-analytical way to compute figures of merit used to characterize, and so specify, the test manufacturing process. This is much more efficient than doing a Monte-Carlo (MC) synthesis from the models. But sometimes, MC synthesis is unavoidable, and the current invention provides MC synthesis in these cases. Another major benefit of geometrical copulas (not shared with the Gaussian copula, for example) is that it is possible to generate MC samples only in the important tail region, without wasting samples in the larger domain of the copula. This will be shown for the geometrical copulas described below.

Regarding Gaussian copulas, a method of modeling dependence is to treat variables as multi-normally distributed correlated statistical variables. In the bi-normal case the cdf is $$H(x, y) = \Phi_2(x, y; \rho) = \quad (27)$$

$$\frac{1}{2\pi\sqrt{1-\rho^2}} \int_{-\infty}^{x} \int_{-\infty}^{y} \exp\left[-\frac{x'^2 - 2\rho x' y' + y'^2}{2(1-\rho^2)}\right] dy' \, dx'$$

The correlation coefficient, $-1 \leq \rho \leq 1$, quantifies the dependence. The Gaussian copula corresponding to Eq. (27) is $$Ga(u, v; \rho) = \Phi(\Phi_1^{-1}(u), \Phi_1^{-1}(v); \rho) \quad (28)$$

where $\Phi_1$ is the standard normal cdf.

Advantages of the Gaussian copula in the current invention include easy extension to higher dimensions, easy Monte Carlo simulation for the entire domain of the copula using Cholesky decomposition of the covariance matrix, and availability of known numerical algorithms to evaluate Eq. (28). For test applications, however, efficient Monte Carlo sample generation focused only on a part of the domain such as the tail region near the origin is not possible. This is a significant disadvantage in the test application compared to the geometrical copulas described below. The fact that LT vanishes for the Gaussian copula, except for $\rho=1$, would tend to disqualify this copula for applications that require non-vanishing correlation deep into the fail/fail tail of the multivariate distribution, such as the DRAM example. However, because the Gaussian copula is commonly used, it will be fitted to the DRAM data as an example which will make clear the benefits of the new geometrical-copula-based method described in this invention. The related t-copula has a finite value of LT, and so may be more suitable than the Gaussian copula, but it shares the other advantages and, particularly the disadvantages, of the Gaussian copula for the test applications described in this invention.

Figure 13:
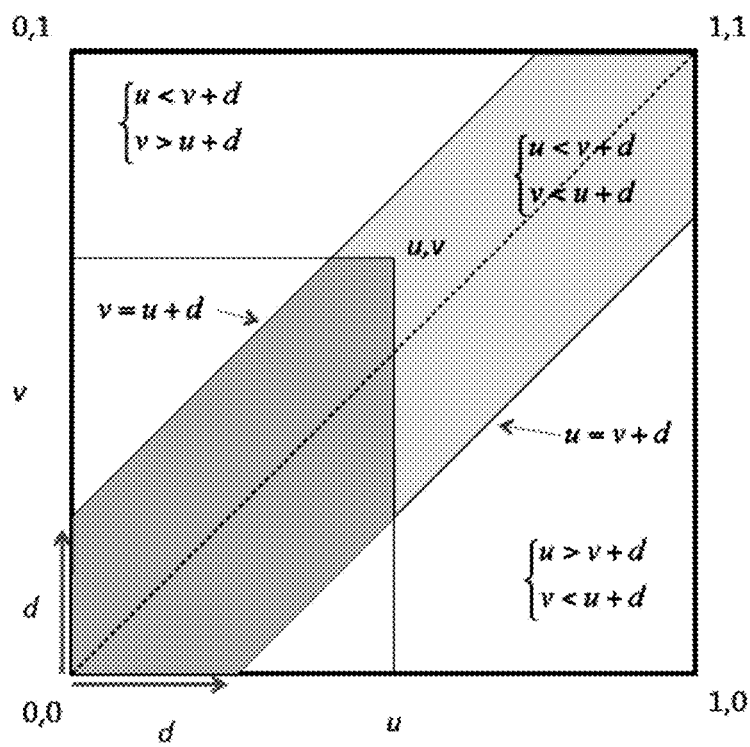
FIG. 13 shows a diagonal stripe drawn across the unit square forming a pseudo-copula in the first step of constructing the stripe geometrical copula, according to one embodiment of the invention.

Regarding the stripe copula, the data in FIG. 6 is concentrated along a diagonal, with some scatter to either side. This suggests using a copula in which has finite probability density in a diagonal stripe on either side of the diagonal, but vanishing probability density outside the stripe. The width of the stripe can then be adjusted by a parameter. Both the shape of the stripe and the probability density are adjusted to make the margins uniform so that it is a copula. The stripe copula is constructed by first drawing a diagonal stripe across the unit square shown in FIG. 13 to construct a stripe pseudo-copula. The parameter d controls the width of the stripe, which can range from zero (perfect correlation), to covering the entire unit square uniformly (independence). The probability density in the stripe is uniform, normalized to unity, and vanishes outside the stripe. The uniform probability density of the stripe in FIG. 13 is 1/(2d−d²), the reciprocal of the stripe's area. A(u, v) is the function which gives the probability enclosed by the rectangle (0, 0)/(u, v). By considering four distinct geometrical cases, expressions for the probability density A(u, v) enclosed by the boundaries of the rectangle (0, 0)/(u, v) shown in FIG. 13 may be found as a function of (u, v). All of these cases are covered by the formula for the stripe pseudo-copula $$A(u, v) = \frac{u'v' - \frac{1}{2}a^2 - \frac{1}{2}b^2}{d(2-d)} \quad (29)$$

where $$\begin{aligned} u' &= \min[u, v + d] \\ v' &= \min[v, u + d] \\ a &= \max[u' - d, 0] \\ b &= \max[v' - d, 0]. \end{aligned} \quad (30)$$

The function A is a pseudo-copula because it satisfies the requirements of a copula except that the margins are not uniform. The marginal distributions, $A(u, 1) = f^{-1}(u)$ and $A(1, v) = f^{-1}(v)$, are non-uniform since $f^{-1}(z) \neq z$. z is a dummy argument which can be either u, or v. The function $f^{-1}(z)$ is:

Case $d \leq \frac{1}{2}$ $$f^{-1}(z) = \frac{1}{d(2-d)} \times \begin{cases} \frac{1}{2}z^2 + zd & 0 \leq z \leq d \\ 2zd - \frac{1}{2}d^2 & d \leq z \leq 1-d \\ z - \frac{1}{2}(z-d)^2 - \frac{1}{2}(1-d)^2 & 1-d \leq z \leq 1 \end{cases} \quad (31)$$

Case $d \geq \frac{1}{2}$ $$f^{-1}(z) = \frac{1}{d(2-d)} \times \begin{cases} \frac{1}{2}z^2 + zd & 0 \le z \le 1-d \\ z - \frac{1}{2}(1-d)^2 & 1-d \le z \le d \\ z - \frac{1}{2}(z-d)^2 - \frac{1}{2}(1-d)^2 & d \le z \le 1 \end{cases} \quad (32)$$

To construct the stripe copula from the stripe pseudo-copula the inverse of this function is needed.

$$\text{Case } d \le \frac{1}{2} \quad (33)$$

$$f(z) = \begin{cases} -d + \sqrt{d^2 + 2(2d - d^2)z} & 0 \le z \le \frac{3d}{4-2d} \\ \left(1 - \frac{1}{2}d\right)z + \frac{1}{4}d & \frac{3d}{4-2d} \le z \le \frac{4-5d}{4-2d} \\ 1 + d - \sqrt{2(2d - d^2)(1-z) + d^2} & \frac{4-5d}{4-2d} \le z \le 1 \end{cases}$$

$$\text{Case } d \ge \frac{1}{2} \quad (34)$$

$$f(z) = \begin{cases} -d + \sqrt{d^2 + 2(2d - d^2)z} & 0 \le z \le \frac{1-d^2}{2(2d-d^2)} \\ (2d - d^2)z + \frac{1}{2}(1-d)^2 & \frac{1-d^2}{2(2d-d^2)} \le z \le 1 - \frac{1-d^2}{2(2d-d^2)} \\ 1 + d - \sqrt{2(2d-d^2)(1-z) + d^2} & 1 - \frac{1-d^2}{2(2d-d^2)} \le z \le 1 \end{cases}$$

So the stripe copula sought is $$St(x,y) = A(f(x), f(y)). \quad (35)$$

This is a copula because it has all the properties of a copula, including uniform margins:

$$St(x,1) = A(f(x), f(1)) = A(f(x), 1) = f^{-1}(f(x)) = x \quad (36)$$

since x is the cdf of the uniform distribution. The equation of the upper line bounding the area of finite probability density for this copula is $$y = \begin{cases} f^{-1}(f(x) + d) & 0 \le x \le f^{-1}(1-d) \\ 1 & f^{-1}(1-d) \le x \le 1 \end{cases} \quad (37)$$

and the equation of the lower line is $$y = \begin{cases} 0 & 0 \le x \le f^{-1}(d) \\ f^{-1}(f(x) - d) & f^{-1}(d) \le x \le 1 \end{cases}. \quad (38)$$

The low tail dependence is $$LT = \lim_{x \to 0+} \frac{St(x,x)}{x} = \lim_{x \to 0+} \frac{f^2(x)}{xd(2-d)} = \lim_{x \to 0+} \frac{2-d}{d}x = 0 \quad (d > 0) \quad (39)$$

so there is no asymptotic low tail dependence unless d vanishes.

Algorithms for Monte-Carlo synthesis of random points in geometrical copulas such as the stripe copula can be derived using geometrical arguments starting with the pseudo copula, A. It is possible to fill any parallelogram or triangle with uniformly distributed random points using every point generated, that is, without the rejection of any Monte-Carlo sample. This is done by weighting the basis vectors that define the parallelogram with a pair of independent uniformly distributed random numbers. For a triangle, points in the "wrong half" of a parallelogram are reflected into the triangle of interest. The slice in FIG. 13 can be decomposed into rectangles and triangles, and random points placed in them according to probabilities determined by area ratios of the rectangles and triangles.

This produces uniformly distributed points within the stripe pseudo-copula. Most importantly, it is possible to limit the region of the stripe over which these points are generated. Generated points may be mapped into the stripe copula using Eqs. (31) and (32), so that if u, and v are generated for the pseudo-copula, then the corresponding points of the copula are $$x = f^{-1}(u), y = f^{-1}(v). \quad (40)$$

Figure 14A:
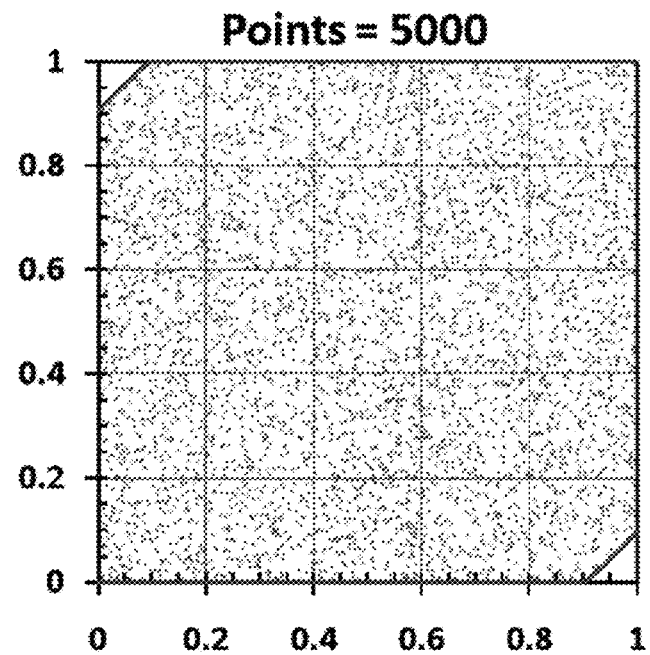
FIGS. 14a-14f show examples of synthesized probability density maps of the stripe copula for various values of the parameter d, and various degrees of censoring, according to one embodiment of the invention.
Figure 14B:
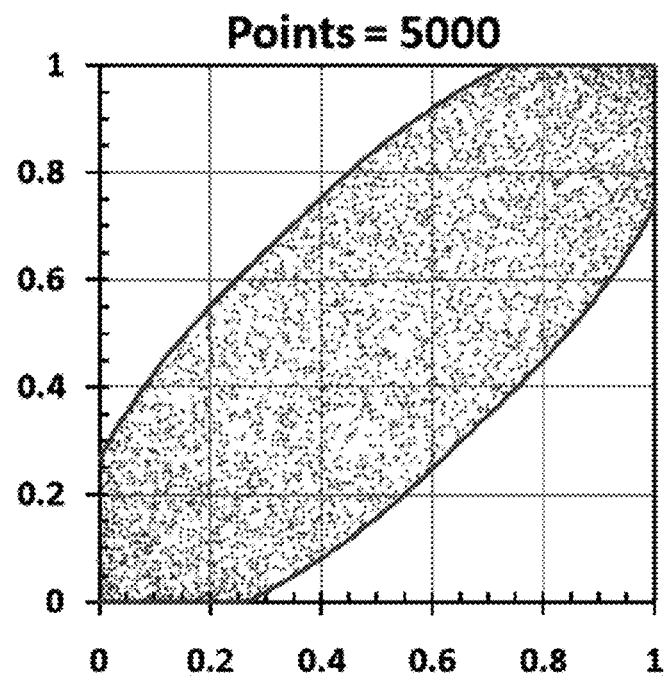
Figure 14C:
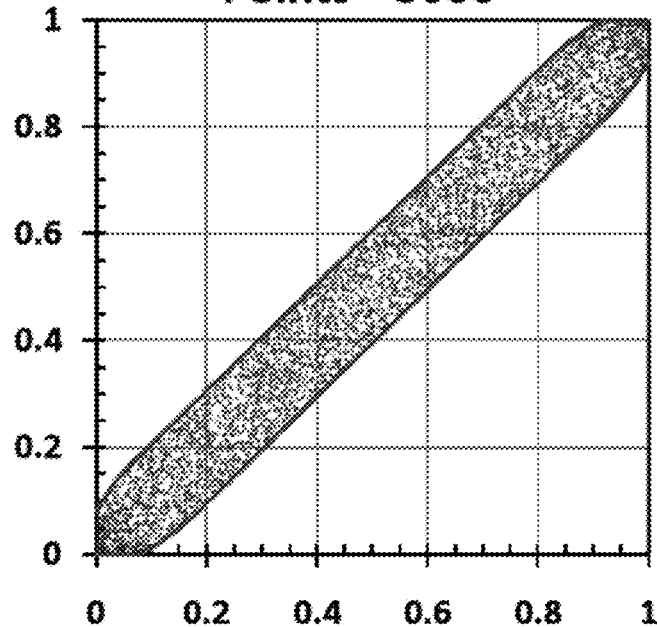
Figure 14D:
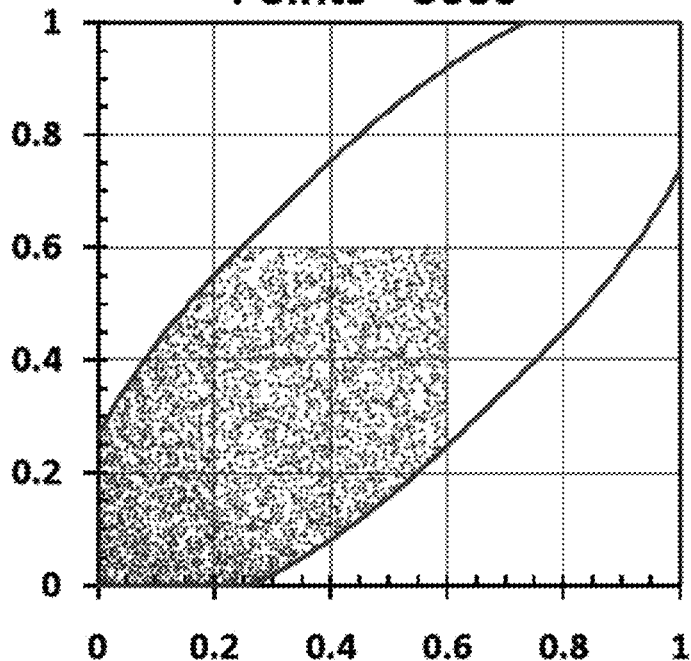
Figure 14E:
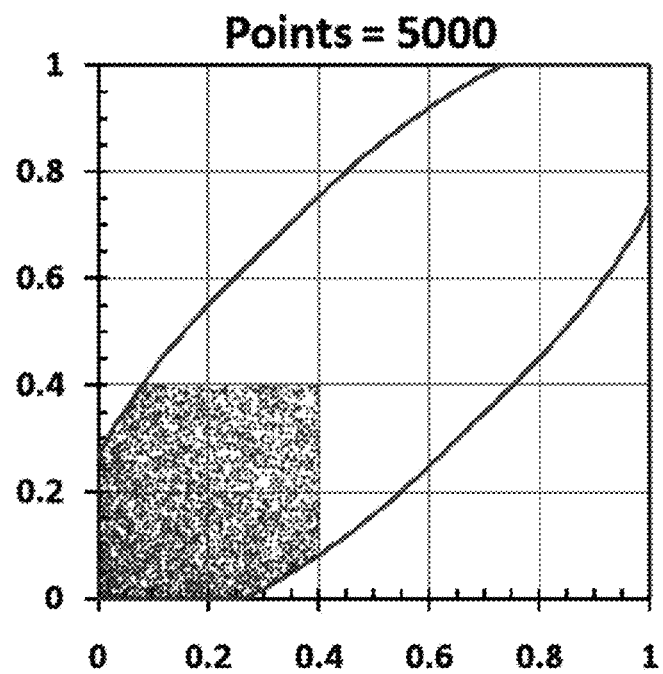
Figure 14F:
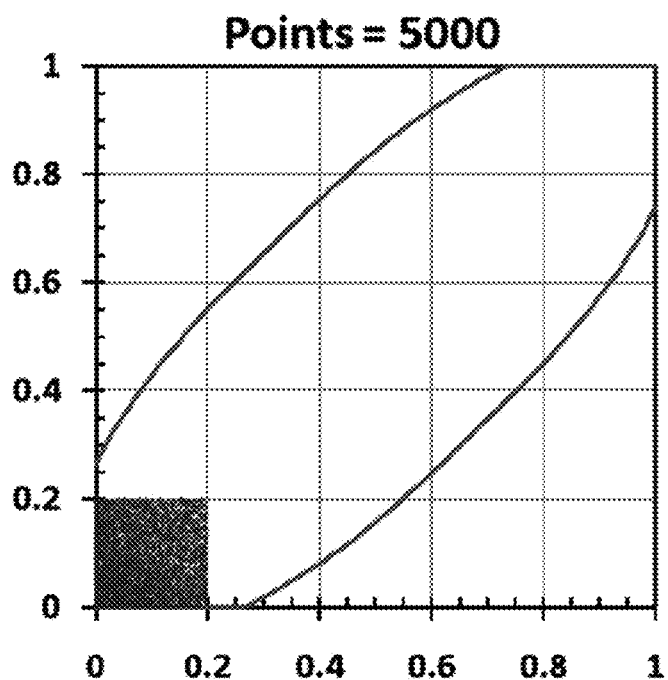

FIGS. 14a-14f show examples of synthesized probability maps of the stripe copula. The density of random points indicates the probability density of the copula. Notice that both the shape and the density of points have been transformed by the function f, Eqs. (33) and (34), from the pseudo-copula of FIG. 13. FIGS. 14a-14c show that the stripe copula spans independence (d=1) to perfect correlation (d=0), and FIGS. 14d-14f show synthesized points concentrated near the origin. The degree of censoring, or censor fraction, is indicated in FIGS. 14a-f by the parameter "Censor". The censor fraction is the number of units in a sample or sub-population divided by the number of units in the entire population. Kendall's tau is computed from the synthesized data using Eq. (3) and is also shown in the header of plots in FIGS. 14a-f. Recall from Table 3 that DRAM bits for which retention times were measured covered only 40 PPM of the population. This degree of censoring, typical of integrated circuit test applications, would be a tiny dot near the origin on the scale of the plots in FIGS. 14a-f. The efficiency advantage of any Monte Carlo (MC) sample generation method which confines samples to the non-censored subpopulation, compared to a MC sample generation method which must reject samples of the entire population, is proportional to the reciprocal of the censor fraction ("Censor" in FIGS. 14a-f). So the small censor fractions typical of test applications gives a very large MC efficiency advantage to the geometrical copula method of selective sample generation described in this invention.

Regarding the wedge copula, the data in FIG. 6 appears to be more scattered as retention time increases. This suggests constructing a wedge-shaped copula. The construction starts with a wedge-shaped pseudo-copula A(u, v) symmetrical about the (0, 0)/(1, 1) diagonal with uniform probability density inside the wedge, and vanishing probability density outside the wedge, shown in FIG. 15. This shaded region has area (1−c)/c, where c is defined in the figure, so the wedge's uniform probability density is c/(1−c). The size of the region is controlled by the parameter $1 \le c \le \infty$ which ranges from c=1 for perfect correlation and to c=∞ for independence.

Figure 15:
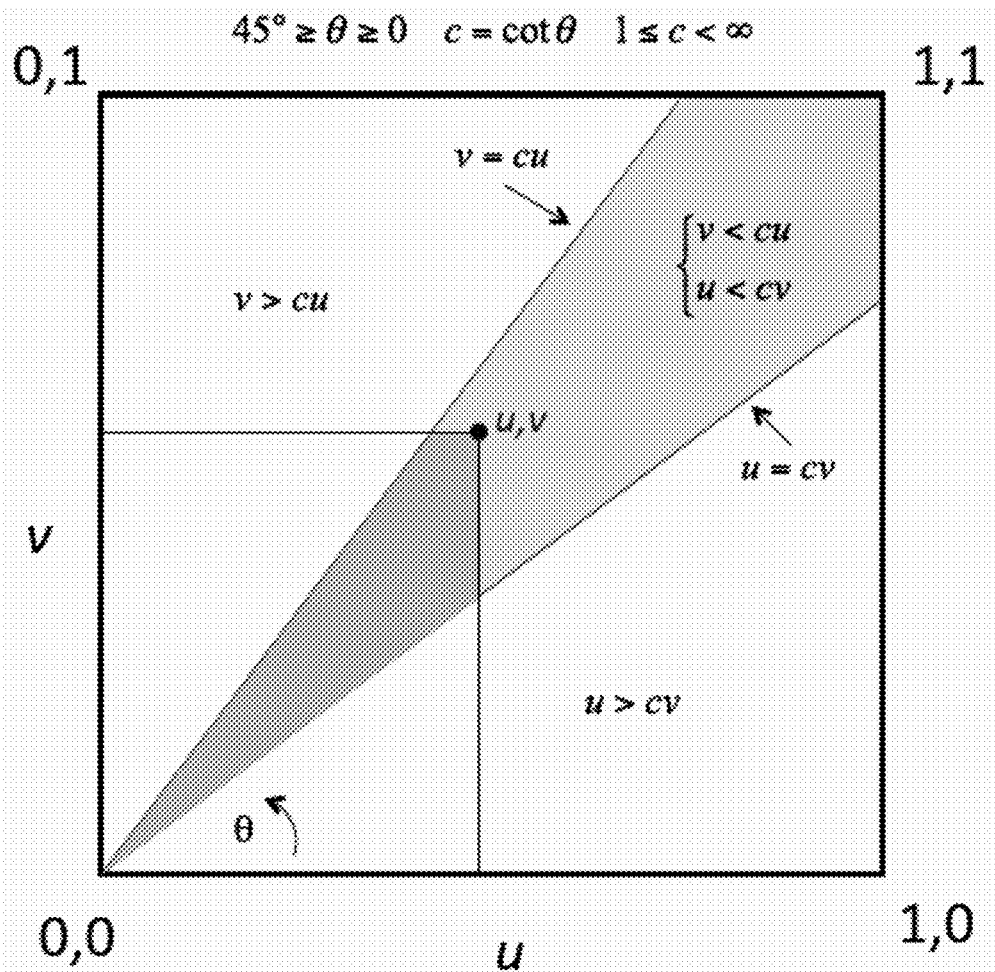
FIG. 15 shows a pseudo-copula A(u, v) having a shaded wedge-shaped region symmetrical about the (0, 0)/(1, 1) diagonal as the first step in constructing the wedge geometrical copula, according to one embodiment of the invention.

The wedge pseudo-copula can be shown by geometrical considerations to be the probability density enclosed by the (0, 0)/(u, v) rectangle in FIG. 15 for (u, v) anywhere in $[0, 1]^2$ $$A(u,v) = \frac{c}{c-1}\left(u'v' - \frac{u'^2}{2c} - \frac{v'^2}{2c}\right) \quad (41)$$

-continued $$u' = \min[u, cv],$$
$$v' = \min[v, cu]$$

On the margins, this is $$A(u, 1) = f^{-1}(u) \quad (42)$$
$$A(1, v) = f^{-1}(v)$$

where $$f^{-1}(z) = \begin{cases} \dfrac{(c+1)z^2}{2} & 0 \leq z \leq c^{-1} \\ z - \dfrac{(1-z)^2}{2(c-1)} & c^{-1} \leq z \leq 1 \end{cases} \quad (43)$$

which is a monotonically increasing function of the dummy argument, z. Notice that A(u, v) is a pseudo-copula because the marginal distributions, Eqs. (42), are not uniform. To construct the wedge copula the inverse of Eq. (43) is needed:

$$f(z) = \begin{cases} \sqrt{\dfrac{2z}{c+1}} & 0 \leq z \leq \dfrac{1+c}{2c^2} \\ c - \sqrt{(c-1)^2 + 2(c-1)(1-z)} & \dfrac{1+c}{2c^2} \leq z \leq 1 \end{cases} \quad (44)$$

So the wedge copula corresponding to FIG. 15 is $$We(x,y) = A(f(x), f(y)) \quad (45)$$

which satisfies the requirement that it have uniform marginal distributions because $$We(x,1) = A(f(x), f(1)) = A(f(x), 1) = f^{-1}(f(x)) = x \quad (46)$$

and the same for y, since x and y are cdfs of uniform distributions.

The lower boundary of the area of non-vanishing probability is $$y = f^{-1}(c^{-1}f(x)), 0 \leq x \leq 1 \quad (47)$$

while the upper boundary is $$y = \begin{cases} f^{-1}(cf(x)) & 0 \leq x \leq \dfrac{1}{2}(c+1)/c^2 \\ 1 & \dfrac{1}{2}(c+1)/c^2 \leq x \leq 1 \end{cases} \quad (48)$$

For the test application the important region is the region near the origin. In this region the boundaries of the regions with non-vanishing probability given by Eqs. (47) and (48) are straight lines. The lower boundary is $$y = c^{-2} x \quad (49)$$
$$0 \leq x \leq \dfrac{c+1}{2c^2}$$

and the upper boundary is $$y = c^2 x \quad (50)$$
$$0 \leq x \leq \dfrac{c+1}{2c^4}.$$

The low tail dependence of the wedge copula is $$LT = \lim_{x \to 0+} \dfrac{We(x, x)}{x} = \lim_{x \to 0+} \dfrac{f^2(x)}{x} = \lim_{x \to 0+} \dfrac{1}{x} \dfrac{2x}{c+1} = \dfrac{2}{c+1} \quad (51)$$

So the wedge copula has asymptotic tail dependence except in the limit of independence ($c \to \infty$) where it becomes $\Pi$, the independence copula. In the opposite limit ($c \to 1$) the asymptotic dependence becomes unity because We becomes M, the Frechet upper bound copula corresponding to perfect correlation.

Figure 16A:
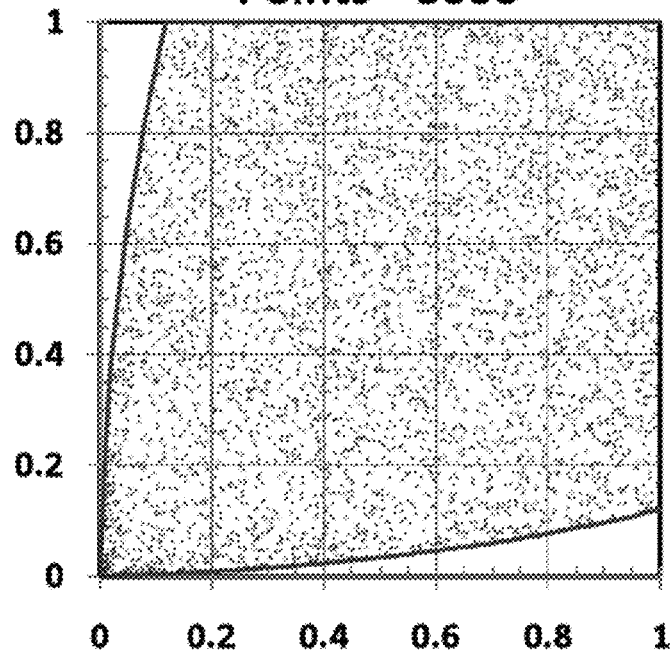
FIGS. 16a-16f show examples of synthesized probability density maps of the wedge copula for various values of the parameter c and various degrees of censoring, according to one embodiment of the invention.
Figure 16B:
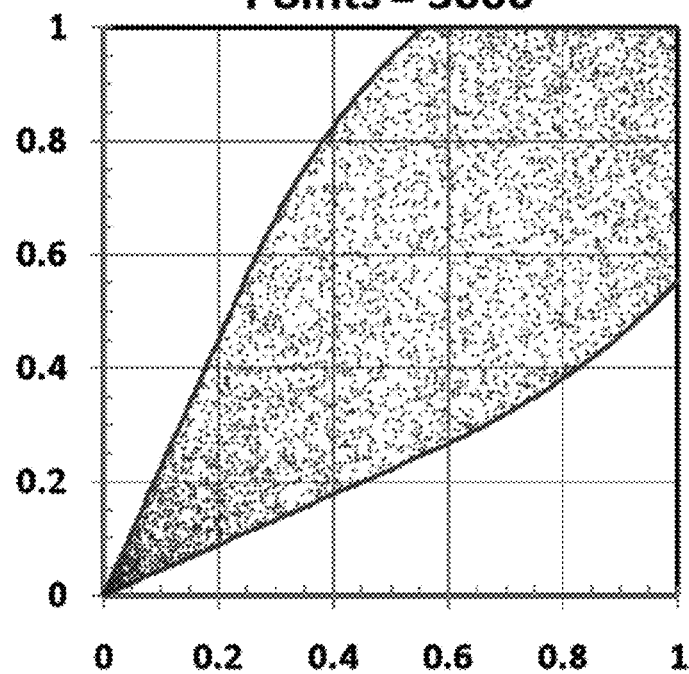
Figure 16C:
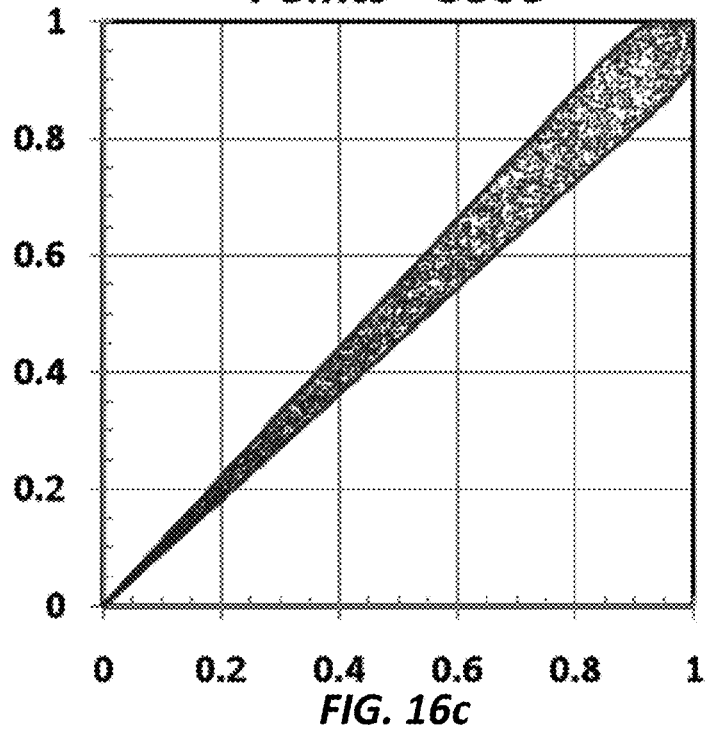
Figure 16D:
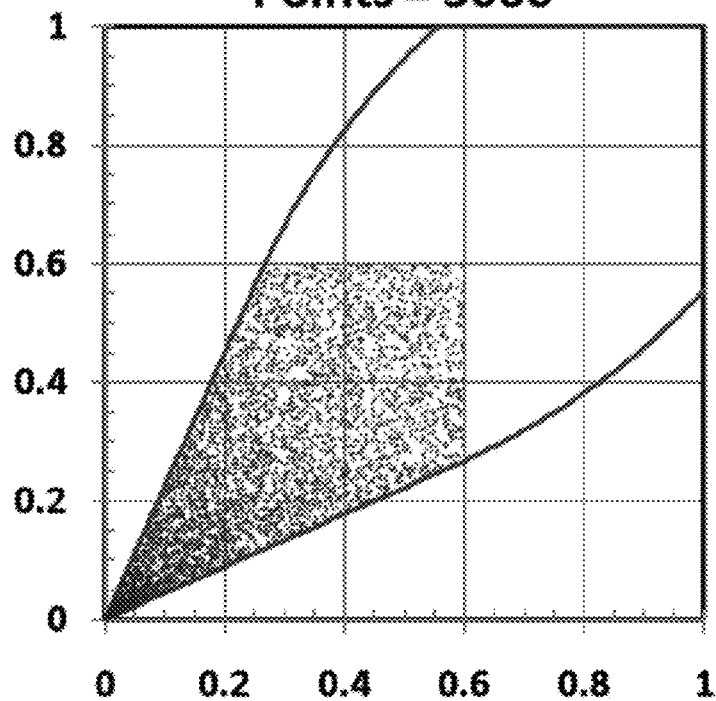
Figure 16E:
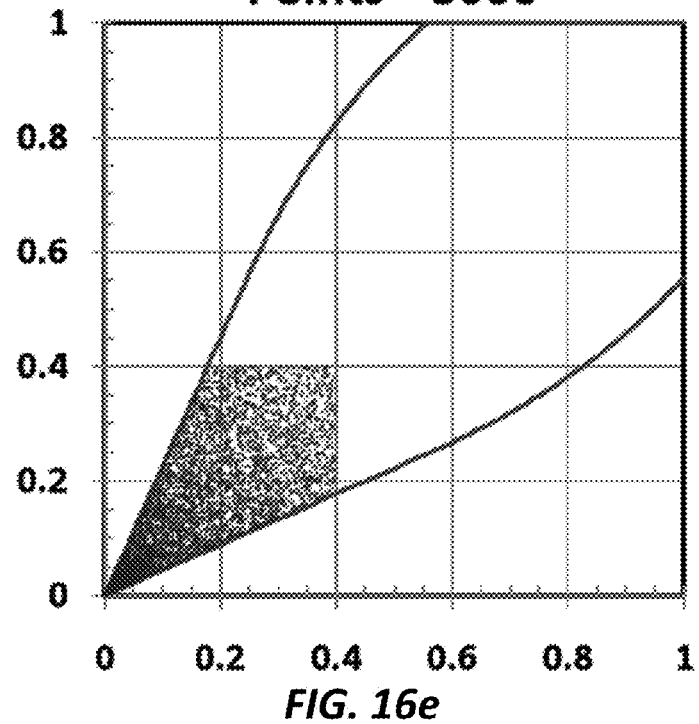
Figure 16F:
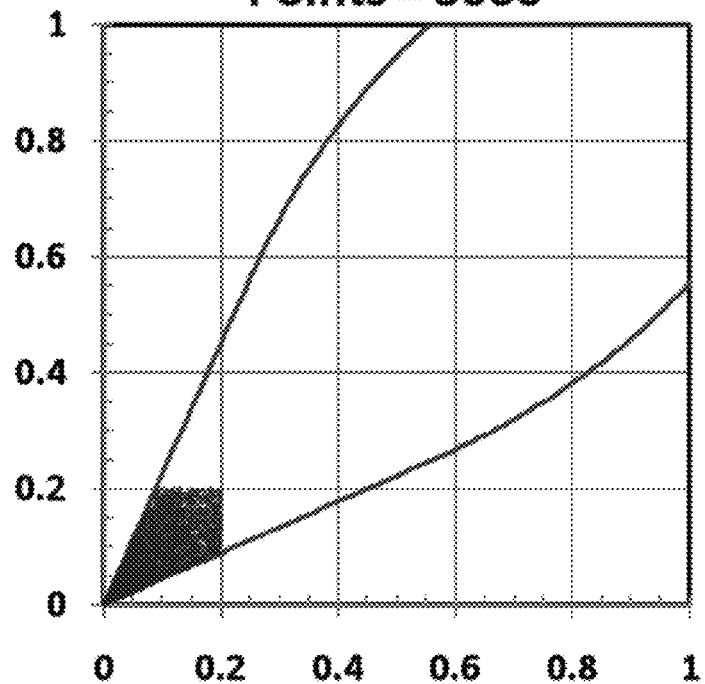

Points of the wedge copula may be synthesized by generating uniformly distributed (u, v) points in the wedge-shaped finite uniform probability density area of the pseudo-copula A in FIG. 15, and then mapping them to the space of the copula using $x = f(u)$, and $y = f(v)$ where $f$ is given by Eq. (44). The algorithm for generating (u, v) points is given below. The probability density maps of the wedge copula in FIGS. 16a-16f were generated using this method. Notice that it is possible to restrict the generation of synthesized points to sub-domains of the copula, particularly the region near the origin. FIGS. 16a-16c show that the wedge copula spans independence ($c = \infty$) to perfect correlation ($c = 1$), and FIGS. 16d-16f show that synthesized points can be concentrated near the origin, corresponding to values of the censor fraction, "Censor" <1.

Values of Kendall's tau given in FIGS. 16a-16f for the synthesized data of the wedge copula were computed to good precision using Eq. (3). It is also possible to derive an analytical expression for Kendall's tau for the wedge copula as a function of the parameter c, and of the censor fraction a, using Eq. (25):

$$\tau_{Subpopulation}(c, a) = \quad (52)$$
$$\dfrac{4}{We^2(a, a; c)} \int_0^a dx \int_0^a dy We(x, y; c) \dfrac{\partial^2 We(x, y; c)}{\partial x \partial y} - 1$$

The result, derived below, is $$\tau_{Subpopulation}(c, a) = \dfrac{2c+1}{3c^2} \quad (53)$$

The wedge copula has the attractive property that the subpopulation tau is independent of a, the censor fraction. This is not true of copulas in general as may be seen by comparing the cases in FIGS. 14a-14f and FIGS. 16a-16f for which the parameter d or c, respectively, is constant, but the censor fraction varies. Since tau may be computed directly from data, Eq. (53) provides a way to estimate the parameter c of the wedge copula, according to the current invention.

Since it is convenient if the model subpopulation tau is independent of the censor fraction, it is useful to know more general conditions under which this holds so that copulas with this property can be identified. A sufficient condition for this to be true is that a copula be expressed as $C(x, y) = A[f(x), f(y)]$ where A satisfies $A(a \times u, a \times v) = a^2 \times A(u, v)$, for $a \leq 1$. This is shown below. The geometrical interpretation is that all sub-regions $[0, a]^2$ of the pseudo-copula A are geometrically self-similar. It is immediately apparent by inspection of FIG. 13 that this is not true of the stripe copula, whereas FIG. 15 shows that it is true of the wedge copula.

Turning now to an example of fitting DRAM data to copula models, the selection of a copula is guided by the conditions of data acquisition and specific knowledge of integrated circuit manufacturing. The DRAM retention time data is deliberately symmetrical between Test and Use because the selection of a symmetrical test coverage model for the purpose of model-fitting maps $r_{min}$ and $r_{max}$ for each bit to $n_{test}$ and $r_{use}$ with equal probability. So only "exchangeable" [C(x, y)=C(y, x)] model copulas need to be considered. All of the candidate model copulas are exchangeable. According to one embodiment of the invention, if the dependent attributes of a test vehicle or product are expected to be related only by the intrinsic physics of the materials and design, and defects will affect one or the other but not both of the attributes, then one can expect that dependency will be strong in the bulk but weak in the tails of the two-dimensional distribution. In this example case, a copula such as the Gaussian copula, for which LT=0, will be suitable. If, on the other hand, a defect is regarded as potentially affecting both attributes, as in the DRAM case, then the dependency will extend deep into "fail/fail" tail of the two-dimensional distribution. In this case, one would choose a copula model which can have a finite lower tail dependence, LT≈0. Since both the Gaussian copula and the stripe copula have LT=0 except in limiting cases, and the data suggest that a model with LT≈0 will be needed, a two-parameter copula model was constructed using a linear combination of each of the wedge, Gaussian, and stripe copulas with the Frechet upper bound copula, M The model is $$C'(x,y,p,\text{parameter})=pM(x,y)+(1-p)C(x,y;\text{parameter}) \quad (54)$$

where the parameter is ρ, d, or c when C is the Ga, St, or We copula described above. This model C' will have LT≈0 if p≈0. It may have LT≈0 for vanishing p, if C has LT≈0 by itself.

A least-squares method was used to extract the best fit copula at each of the 18 environmental conditions for each skew of the DRAM data. The following sum was minimized using Excel's solver to determine p, and the copula-specific model parameter:

$$SSQ(p, \text{parameter}) = \frac{\sum_i \sum_j (N \times \delta C'_{ij}(p, \text{parameter}) - n_{ij})^2}{\sum_i \sum_j n_{ij}^2} \quad (55)$$

where $$\delta C'_{ij} = C'_{ij} - C'_{i-1,j} - C'_{i,j-1} + C'_{i-1,j-1} \quad (56)$$

where i, and j are cell indexes in FIG. 6, where $n_{ij}$ is the number of failures observed in each cell, and where N=48750000 is the total population size.

In every case the best fit was found at p=0. So, for the DRAM, a one-parameter model suffices for any of the three candidate copulas.

For a one-parameter copula, a simpler and more convenient way than the least-squares method to extract the parameter of the copula is to compute a "sample" estimate of Kendall's tau directly from the data and compare it with the theoretical expression for the subpopulation tau, Eq. (25), to solve for the parameter. The theoretical expression for the subpopulation tau is generally also a function of the censor fraction, which is known from the experiment.

Regarding model parameter estimation for the wedge copula, an estimate of c may be derived by substituting the sample tau computed from the data using Eq. (3), and given in Table 4, into the inverse of Eq. (53), written as $$c = \frac{1+\sqrt{1+3\tau}}{3\tau}. \quad (57)$$

Figure 17A:
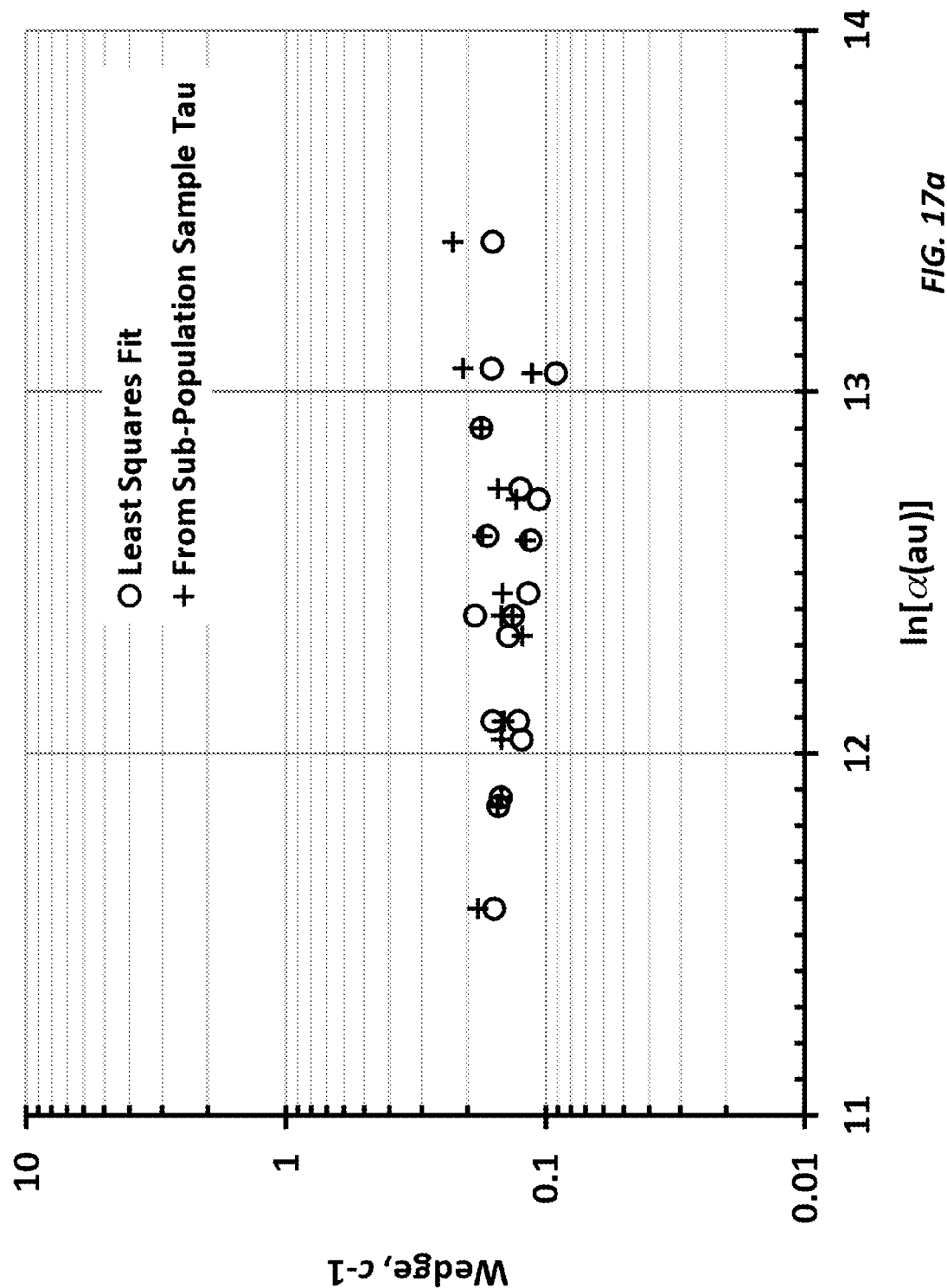
FIGS. 17a-17c show plots of the single parameter of the wedge, Gaussian, and stripe copulas, which minimized the sum-of-squares of Eq. (55), and for the wedge and stripe copulas the sub-population sample tau computed using Eq. (4), as a function of environmental condition measured by characteristic retention time, according to one embodiment of the invention.

Generally a relation like Eq. (57) depends on the censor fraction but for the wedge copula there is no censor fraction dependence. FIG. 17a shows estimates of c as a function of the 18 environmental conditions, ln α. Estimates using Eq. (57) and the more generally applicable least-squares method show good agreement in the figure. Moreover, the figure shows that c is independent of the environmental condition.

Figure 17B:
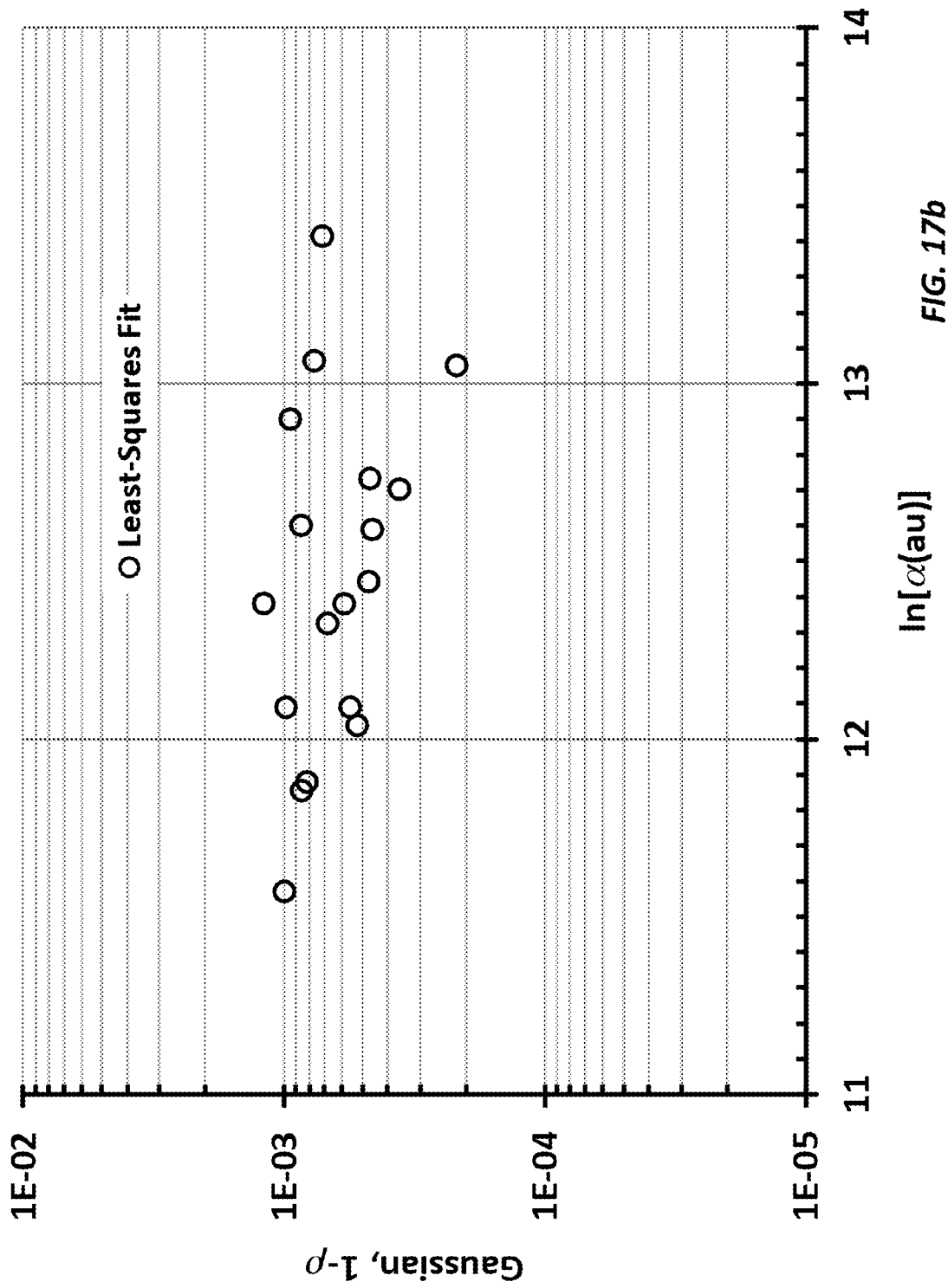
Figure 17C:
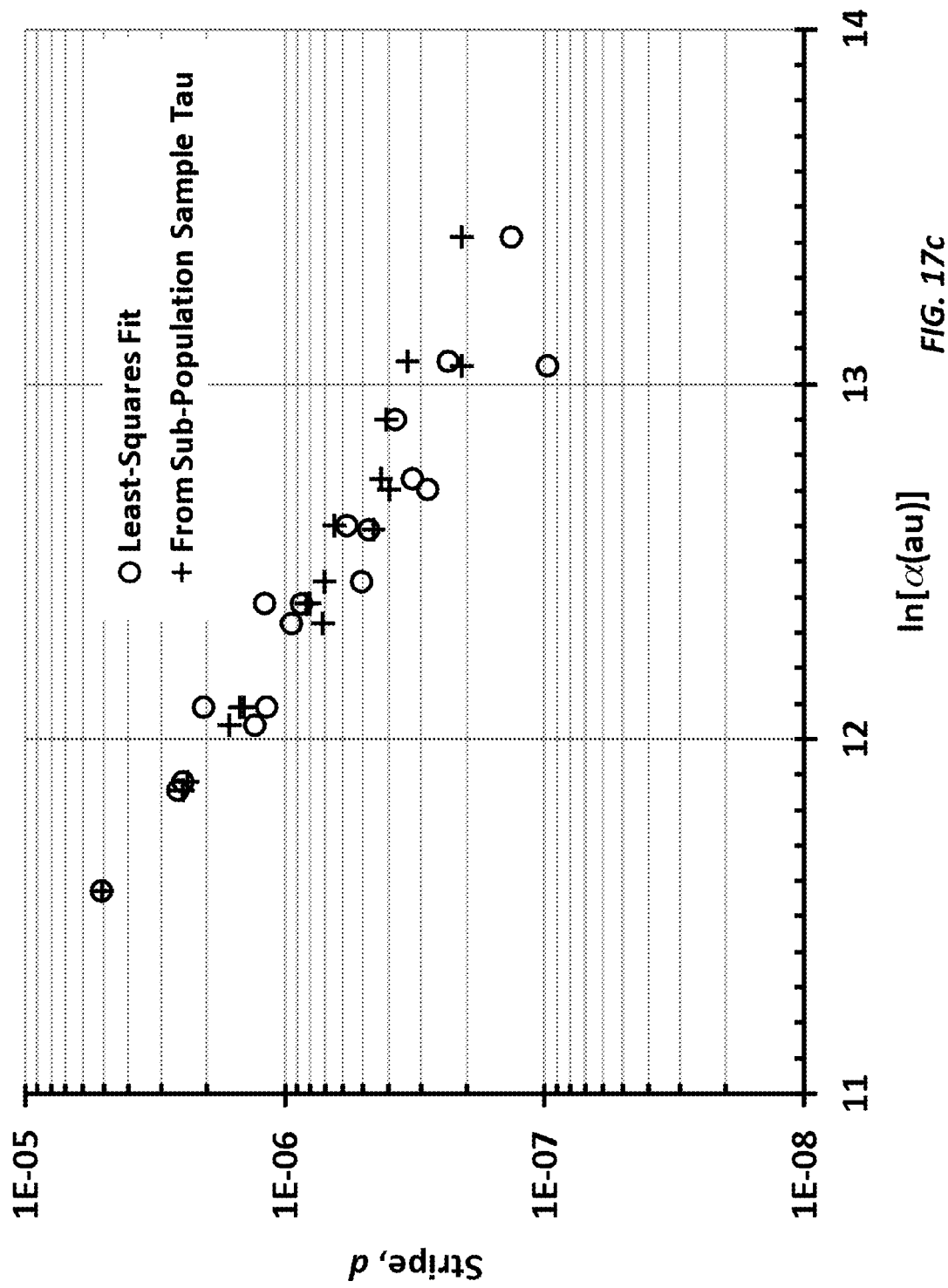

Regarding the Gaussian copula, FIG. 17b shows a reasonably environmental-condition-independent fit to the Gaussian copula by the least-squares method. It was not possible to determine the copula parameter using the sample tau method because there is no easily derived expression from Eq. (25), nor is it possible to do an efficient Monte-Carlo computation of the sample tau because there is no known way to confine random samples to the tail of the copula without rejection of points. Remember that the range of the data covers only 40 PPM of the population (for the nominal skew), so sampling the entire population to estimate tau for the range of the data is not practical. The best least-squares fit was obtained for a correlation coefficient of about 0.999 (see FIG. 17b), with the significant variation occurring in the $3^{rd}$ and higher digits. It seems that the main, unobserved, body of the population must be forced to have an extremely strong correlation, so that the weaker correlation in the tail, where the data is observed, will be sufficiently strong to fit the data. So, the Gaussian copula is not a natural fit to the strong dependence observed in the range of the data:

Regarding the stripe copula, FIG. 17c shows parameter estimates for the stripe copula as a function of environmental condition, ln α, for both the least-squares and the sample tau methods. Because a single parameter value could not be chosen for all environmental conditions, no single value of the stripe copula parameter can be given in Table 4. The strong environmental dependence of the copula parameter makes this an undesirable copula for the DRAM application. The sample-tau method requires an efficient way to compute Eq. (25) for the model copula. For the stripe copula, derivation of an analytical formula was daunting. But, as for any geometrical copula, it was possible to do very efficient and accurate Monte-Carlo numerical calculations of the sample tau because all the samples may be concentrated in the sample region of interest. This is the easiest method for most geometrical copulas.

Figure 18:
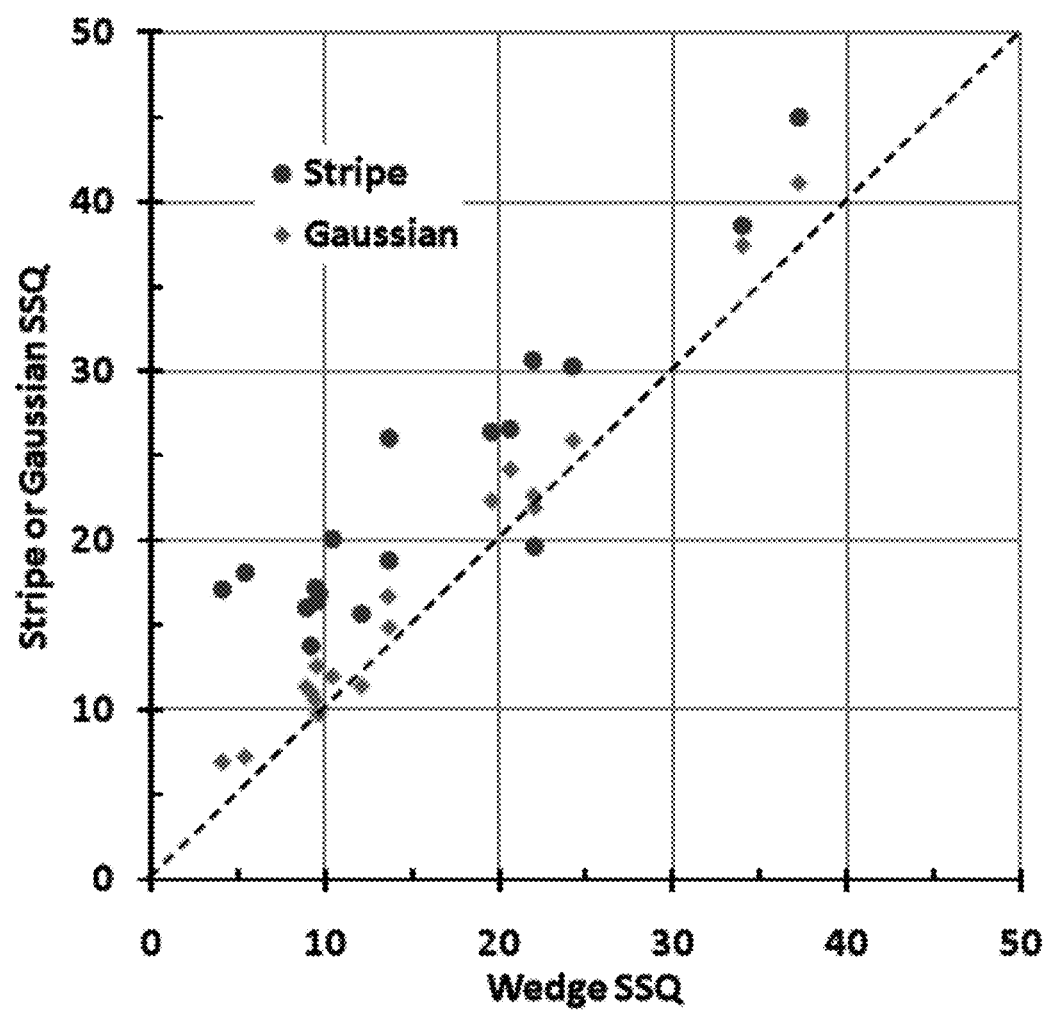
FIG. 18 shows that, because most points lie above the diagonal, the wedge copula is the best fit of each of the three types of copula, which are embodiments of the invention.

The quality of fit for each of the three types of copula is compared in FIG. 18, which shows a comparison of minimum sums of squares computed from Eq. (55) for each of 18 environmental conditions for the nominal skew. Most of the plotted points in FIG. 18 are above the diagonal, showing that the wedge copula gives the best fit.

The discussion shows application of several principles of copula selection, which led to the selection of the wedge copula to model the DRAM application example:

Copula models with parameters independent of environmental conditions are preferred because they greatly simplify the model, and probably reflect a fundamental underlying dependency structure of the mechanism. Moreover, an environmentally-independent copula model in combination with marginal distributions that embody all Test and Use conditions in a single parameter such as r/α, enables an "equivalent set point" test method which gives flexibility in determining test and datasheet specifications. For the DRAM example, the wedge copula was environmentally independent, the Gaussian copulas was less so, and the stripe copula was strongly environmentally dependent.

Figure 19A:
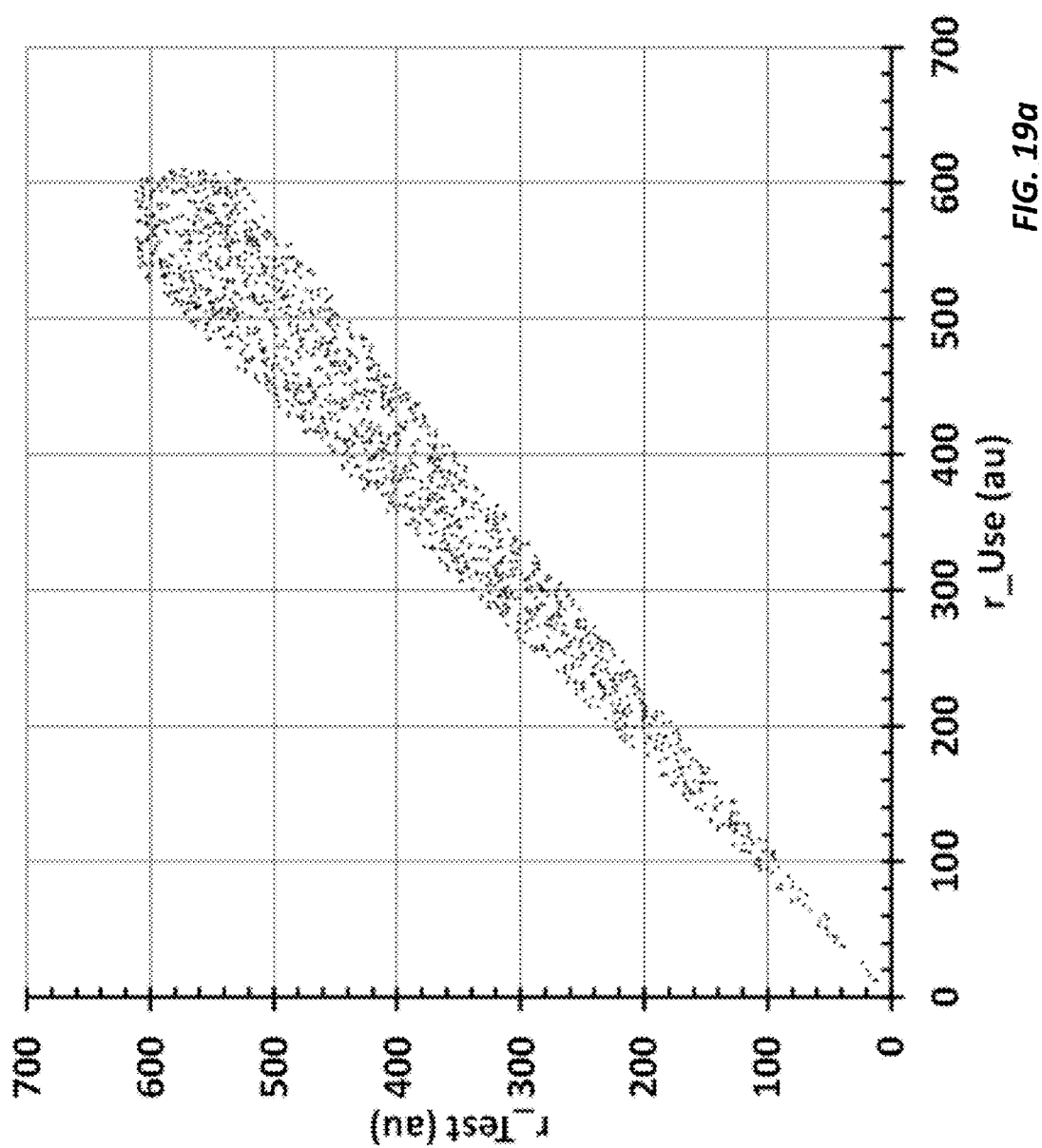
FIGS. 19a-19b show that, considering the shape of the data in FIG. 6, the best-fit wedge copula (FIG. 19a) is a better representation of the tail dependence of the data than the best-fit stripe copula (FIG. 19b), comparing two embodiments of the invention.
Figure 19B:
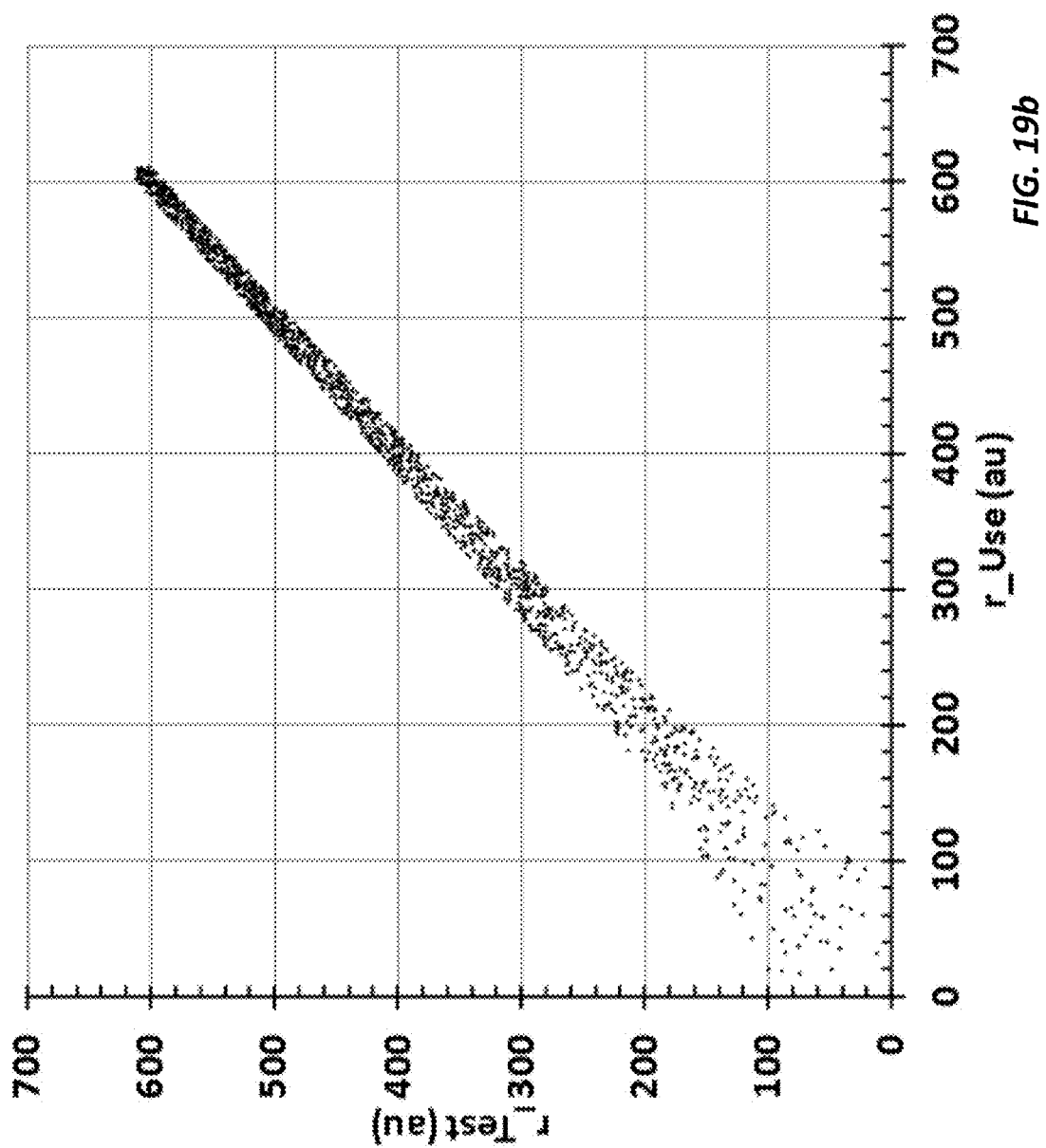

Copula models with a plausible tail dependence based on application knowledge are desirable. Geometrical copulas are preferred because they are easy to construct to mimic observed or plausible behavior. Only the wedge copula satisfies this for the DRAM example. Comparison of FIG. 6 with FIGS. 19a-19b show that the best-fit wedge copula is a better representation of the shape of the tail dependence of the data than the best-fit stripe copula. FIGS. 19a-19b were synthesized from the best fit wedge and slice copulas at the highest environmental condition of the nominal skew. The sample size of 1641 and censoring also matched the experimental conditions of FIG. 6.

Geometrical copulas are also preferred because it is possible to concentrate Monte-Carlo samples in the tail region of a geometrical copula. This has two major benefits. First, highly accurate Monte-Carlo evaluations of the sample tau can be obtained, sidestepping the need for deriving analytical formulas from Eq. (25). Second, any Monte-Carlo simulation from the copula can be extremely efficient since sample generation can be focused on the tail region. Both wedge and stripe copulas have this advantage.

Based on these considerations, the wedge copula model was selected to model the dependency structure of the DRAM bit retention time.

Figure 20:
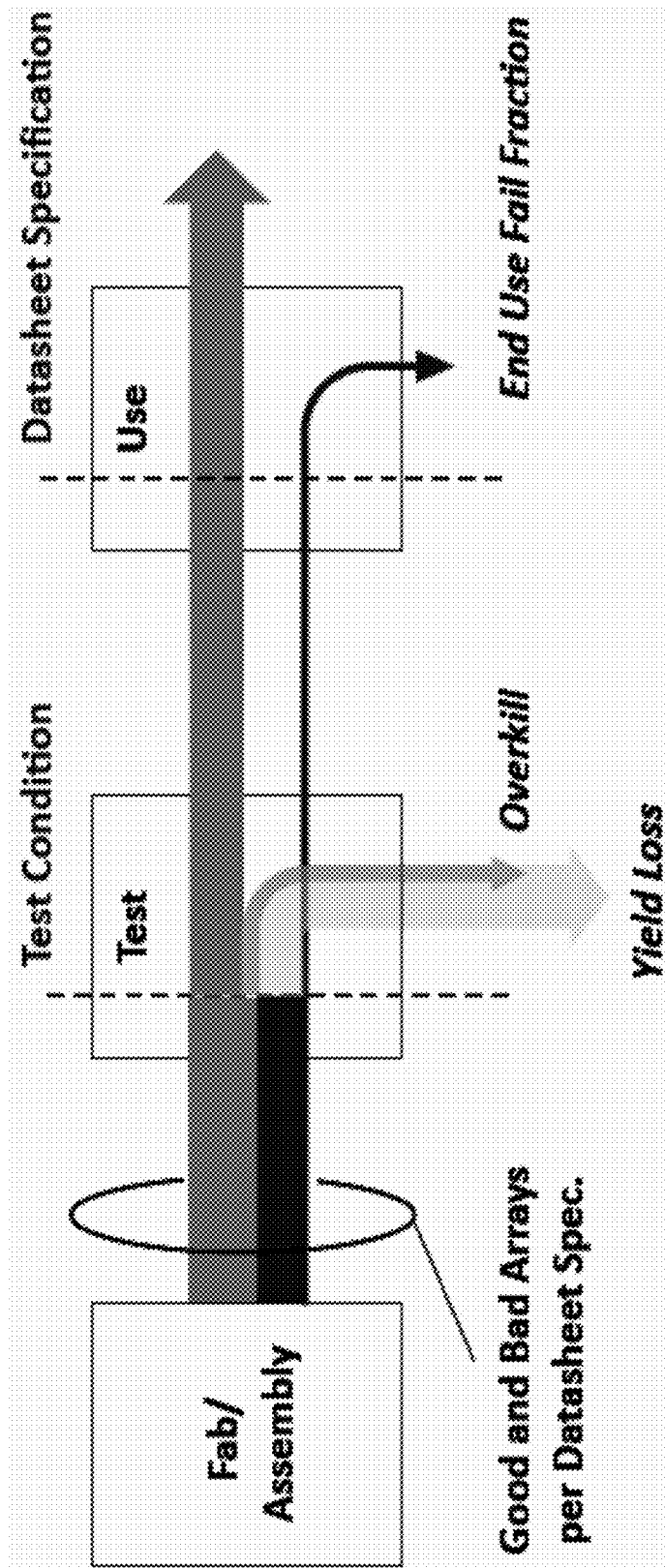
FIG. 20 shows a schematic drawing of integrated circuit manufacturing process (Fab/Assembly) producing units of a product which are tested (Test) per Test Conditions and then go on to be used (Use) per Datasheet Specifications. The definition of key figures of merit (FOMs) is illustrated, according to one embodiment of the invention.

Turning now to the aspect of the invention in which the copula-based statistical model fitted to the data according to the preceding description is used to model Test and Use of a integrated circuit product, FIG. 20 shows how good and bad (defective) units of an integrated circuit product such as a memory array are produced by the Fab/Assembly process, and then are screened by final Test and go on to Use. The figure also shows important figures of merit (FOMs) including Yield Loss, Overkill (there are two kinds), and End-Use Fail Fraction.

Figure 21:
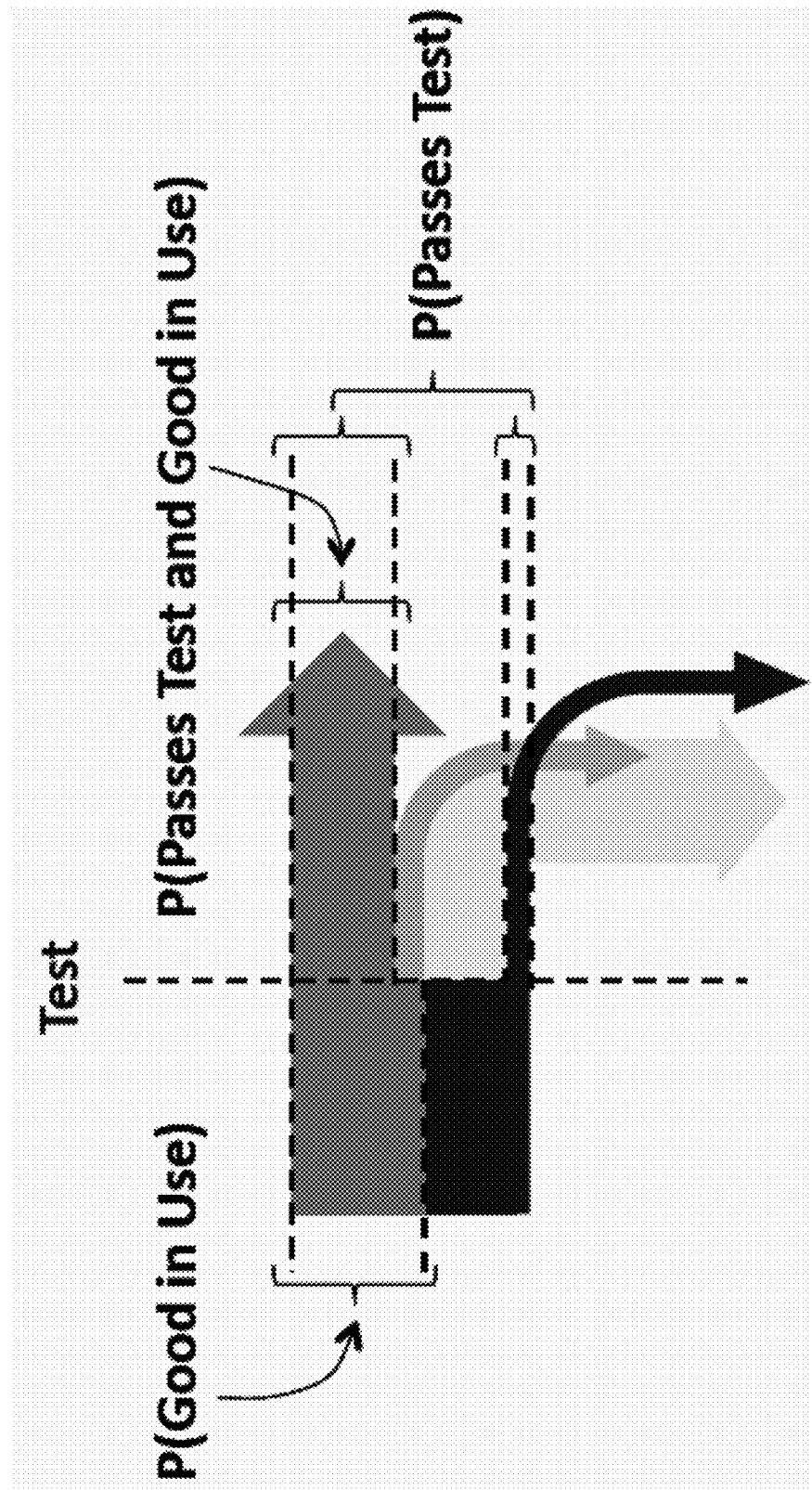
FIG. 21 shows a schematic drawing of how the Test and Use conditions divide the population of manufactured units into categories, according to one embodiment of the invention.

Regarding the FOMs, targets and cost models, a schematic drawing of how the Test and Use conditions divide the population of manufactured units into categories is shown in FIG. 21. The three proportions shown in FIG. 21, which are modeled as probabilities, are sufficient to characterize the effect of Test and Use. The four FOMs described next are defined in terms of these probabilities.

First, Yield Loss is given by $$YL = P(\text{Fails Test}) = 1 P(\text{Passes Test}) \quad (58)$$

where P(Passes Test) is the fraction of units which pass Test irrespective of whether they are good or bad in Use. Yield Loss is a primary manufacturing indicator since it directly affects revenue.

Second, End Use Fail Fraction is given by $$\begin{aligned} EUFF &= P(\text{Fails in Use} \mid \text{Passes Test}) \\ &= 1 - P(\text{Good in Use} \mid \text{Passes Test}) \\ &= 1 - \frac{P(\text{Passes Test and Good in Use})}{P(\text{Passes Test})} \\ &= \frac{P(\text{Passes Test}) - P(\text{Passes Test and Good in Use})}{P(\text{Passes Test})}. \end{aligned} \quad (59)$$

EUFF is the fraction of units classified as failing in Use, given that they have passed Test (a conditional probability). End-Use Fail Fraction (EUFF) is a primary quality indicator since it is the customer-perceived proportion of defective units.

Third, Manufacturing Overkill is given by $$OKill(\text{Mfg}) = P(\text{Good in Use}) - P(\text{Passes Test and Good in Use}). \quad (60)$$

Finally, Test Overkill is given by $$OKill(\text{Test}) = \frac{P(\text{Good in Use}) - P(\text{Passes Test and Good in Use})}{1 - P(\text{Passes Test})}. \quad (61)$$

Overkill is associated with the cost of missed opportunity for revenue caused by invalidly rejecting units at Test. FIGS. 20-21 shows that Manufacturing Overkill, Eq. (60), is the fraction of all manufactured units (good and bad in Use), which are invalidly rejected by Test and that Manufacturing Overkill is a subset of Yield Loss. Manufacturing Overkill is a measure of the cost to the entire manufacturing process. Test Overkill, Eq. (61), is the fraction of all units rejected by test which are invalidly rejected by Test and is a measure of how good the Test screen is.

Turning to consider targets, the definitions of FOMs show that each FOM is a ratio falling into the range [0, 1] and that for each, "0" is most desirable and "1" is least desirable. So specifications for a product and test manufacturing process are found by requiring that FOMs meet do-not-exceed targets for each FOM. Targets are chosen with producer costs and customer-perception of brand image in mind, and are product-specific. Quality-related customer costs are one aspect of this perception. Example targets used in the application examples later in the description of the invention are YL(Target)=20%, OKill(Mfg, Target)=2%, EUFF (Target)=200 DPPM. The values of the example targets are not representative of any particular product or manufacturing process.

Regarding the Datasheet Specification and Test Condition shown in FIG. 20, one embodiment of the invention (the DRAM example) specifies these in terms of environmental conditions ($V_p$, $V_d$, T) and retention time, r. The settings of these four parameters in Use (Datasheet Specification) and at Test (Test Condition) will be different. Usually the Test Condition is more "stressful" than the Datasheet Specification. Because of the fit of environmental conditions ($V_p$, $V_d$, T) to the model of Eq. (2), the environmental condition is mapped into the single parameter $\alpha_{use}$ in Use and $\alpha_{test}$ in Test. The datasheet specifies a refresh time $r_{use}$, and the Test specification uses a different retention time limit setting, $r_{test}$. So, a single parameter, x, depending on both the environmental condition via α and retention time limit $r_{use}$ in the datasheet defines the Datasheet Specification (Use) condition:

$$x = 1 - \exp\left[-\left(\frac{r_{use}}{\alpha_{use}}\right)^\beta\right] \quad (62)$$

And similarly, a single parameter, y, defines the Test Condition:

$$y = 1 - \exp\left[-\left(\frac{r_{test}}{\alpha_{test}}\right)^\beta\right]. \quad (63)$$

Figures of merit are used in cost models of the integrated circuit product. Costs to the producer of a component and costs to the customer producing systems using the component must be included in these models. Regarding producer costs, suppose the cost of manufacturing a component is $Cost and the sale price of a component is $Price, and suppose N component units are to be manufactured. Besides costs of materials used in the unit, $Cost includes per-unit capital depreciation costs associated with the manufacturing equipment such as testers, charged to the unit. For testers, this cost-contributor will depend on the time needed to test each unit, among other factors. According to the definitions of the FOMs defined above, the cost of manufacturing N component units is $$\text{Cost of manufacturing } N \text{ units} = N \times \$\text{Cost} \tag{64}$$

and the revenue from the N units manufactured is $$\text{Revenue from } N \text{ units manufactured} = N \times (1-YL) \times \$\text{Price} - N \times \text{OKill(Mfg)} \times \$\text{Price} \tag{65}$$

where OKill (Mfg) is the fraction of manufactured units which would have been good in Use, but were rejected at Test.

If the revenue reduced by overkill is regarded as an opportunity cost then the per-unit-manufactured cost is $$\$\text{Cost}' = \$\text{Cost} + \text{OKill(Mfg)} \times \$\text{Price}. \tag{66}$$

and the revenue is $$\text{Revenue from units manufactured} = N \times (1-YL) \times \$\text{Price} \tag{67}$$

For products with high margins so that $Price>>$Cost, and with significant yield loss, overkill may significantly affect the business viability of a product.

Regarding customer costs, the producer's price per component unit is the customer's nominal cost per unit plus additional costs to the customer due to debug and rework or scrapping of systems which fail because of faulty components which have escaped the component manufacturer's process. It is also possible that some faulty components may escape the customer's testing and lead to warranty costs. So, for the customer $$\text{Cost of components} = N \times \$\text{Price} + N \times \text{EUFF} \times \$\text{Average cost impact of defective unit to customer.} \tag{68}$$

The cost impact of a defective component to a system manufacturer is usually much greater than the price of the component, particularly for surface-mounted components. Therefore, EUFF is typically required to be less than about 200 DPPM. Beyond cost, EUFF has a qualitative impact on brand image. This is often the primary consideration in choosing the EUFF target.

Turning now to consider the test coverage model, note that for the copula-based statistical model fitted to the data, the test coverage model used assumed that the minimum and maximum retention times for each bit are equally likely to occur in Test and in Use. This is called a "symmetrical test coverage model". However, for a realistic Manufacture/Test/Use flow like FIG. 20, Use occurs over extended time periods, so that if a minimum retention time can occur for a bit it will certainly occur in Use. On the other hand, Test is brief so the probability of occurrence of the minimum or the maximum retention time of a bit in Test depends on details of time-in-state of bit-leakage which are beyond what can be known from the DRAM example data. So an assumption must be made in order to proceed to model the Manufacture/Test/Use flow of FIG. 20. The most conservative assumption from the end-user perspective, called the "conservative test coverage model", is that Use always "sees" the minimum retention time and that Test always "sees" the maximum retention time. Other test coverage model assumptions are also used to model Test and Use in order to gauge the sensitivity of the model to this assumption.

The test vehicle data were fitted assuming a symmetrical test coverage model, in which Test and Use are equivalent, by assigning $r_{min}$ and $r_{max}$ to Test or Use using a computer-generated "coin flip". So identical marginal distributions for Test and Use were extracted from the data, and an exchangeable copula C(x, y) was fitted. If Test and Use retention times sampled from this symmetrical model, indicated by the primes, are assigned to Test and Use under the conservative test coverage model assumption that Test always "sees" $r_{max}$ and Use always "sees" $r_{min}$ then $$r_{test} = \max[r'_{test}, r'_{use}], \quad r_{use} = \min[r'_{test}, r'_{use}] \tag{69}$$

That is, $r_{test}$ is the 2:2 order statistic and $r_{use}$ is the 1:2 order statistic of the pair ($r'_{test}$, $r'_{use}$). It is known that the 2-dimensional cdf connecting the 2:2, and 1:2 order statistics of a pair of random variables distributed according to a 2-dimensional cdf H(u, v) is $$K(u, v) = \begin{cases} H(u, v) + H(v, u) - H(u, u) & u \leq v \\ H(v, v) & u \geq v \end{cases} \tag{70}$$

and that if the marginal distributions of H are the same, then the pseudo-copula of the order statistics has the same form as K. If in addition, the copula of the original random variables is exchangeable so that C(x, y)=C(y, x), then $$D(x, y) = \begin{cases} 2C(x, y) - C(x, x) & x \leq y \\ C(y, y) & x \geq y \end{cases}. \tag{71}$$

So D is the transformation of the fitted copula, C, embodying the conservative test coverage model that Test always "sees" $r_{max}$ and Use always "sees" $r_{min}$.

Notice that the x and y marginal distributions are cdfs of the 1:2 and 2:2 order statistics of pairs of numbers sampled from X and Y:

$$D(x,1) = 2x - C(x,x)$$

$$D(1,y) = C(y,y) \tag{72}$$

This shows that in general D is a pseudo-copula, not a copula, because D(x, 1)≠x and D(1, y)≠y.

An integrated circuit DRAM memory includes an array of many, N, bits. The preceding description gives a model of the dependence structure, D, of retention times for a single bit. Needed is a model of the dependence structure of retention times for an N-bit array.

Derived next is the dependence structure of N-bit arrays which are good only when all N bits are good. The more realistic and complex cases when an array can be good if some bits are bad (fault tolerance) and when arrays with bad bits can be repaired at Test will be described later. The probability that every bit in an array of N bits is good when the Test and Use conditions are x and y is the survival pseudo-copula of a single bit, S, raised to the power of N $$S_N(\bar{x},\bar{y}) = [S(\bar{x},\bar{y})]^N = [1 - D(1-\bar{x},1) - D(1,1-\bar{y}) + D(1-\bar{x},1-\bar{y})]^N \tag{73}$$

where $\bar{x}=1-x$ and $\bar{y}=1-y$. $S_N$ is the survival pseudo-copula of the array, so a little manipulation using D(x, 1)+D(1-x, 1)=1 and similarly for y gives the pseudo-copula of the non-fault-tolerant array as $$D_N(x, y) = 1 - S_N(1-x, 1) - S_N(1, 1-y) + S_N(1-x, 1-y) \quad (74)$$
$$= 1 - [1 - D(x, 1)]^N - [1 - D(1, y)]^N +$$
$$[1 - D(x, 1) - D(1, y) + D(x, y)]^N.$$

Notice that $D_N=D$ when $N=1$, as it must.

Eq. (73) and (74) can be generalized in an obvious way to get the survival copula of a product with multiple copies of several types of module for which copula models were extracted from test vehicle data. (For the DRAM, there is one type of module; the bit.) In particular, Eq. (73) becomes a product over module types with the survival copula of each module raised to a power which is the number of modules of that type in the product.

Figure 22:
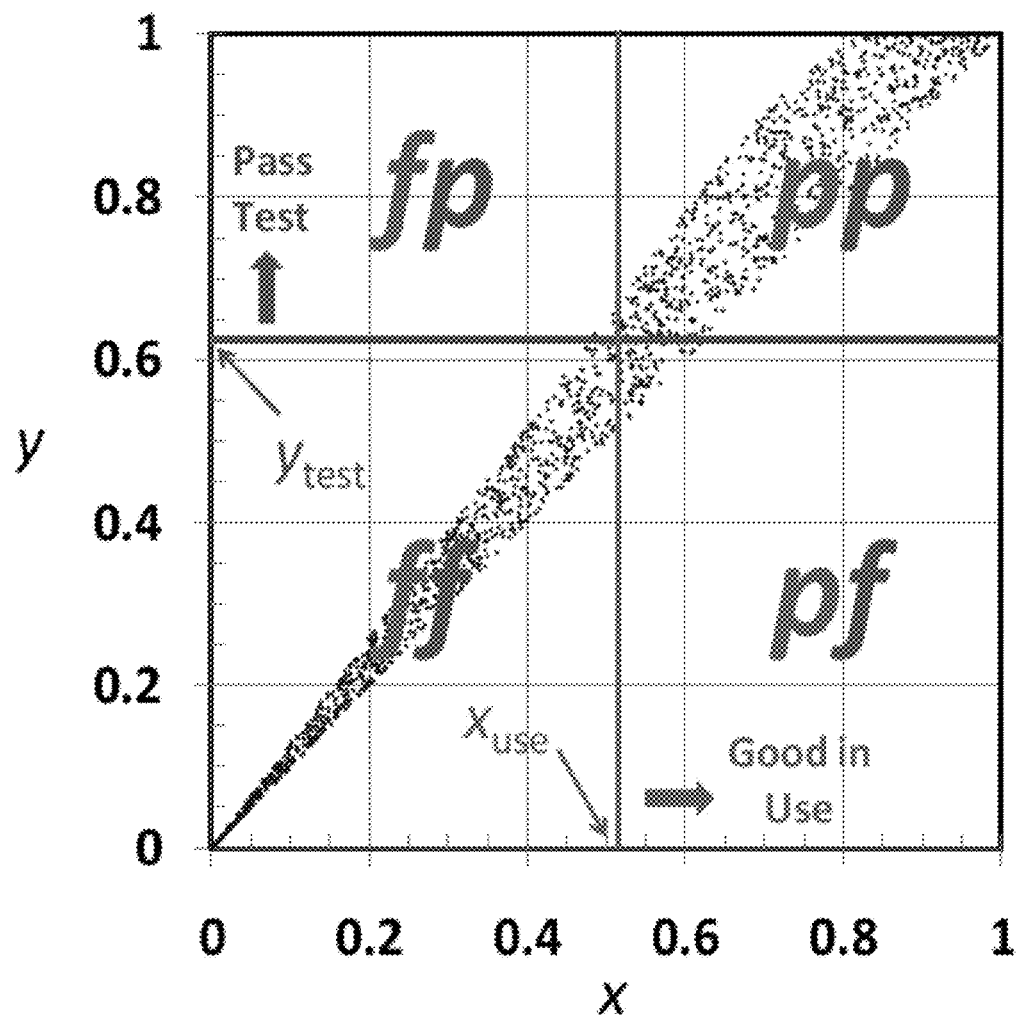
FIG. 22 shows a schematic representation of how the Test and Use conditions superimposed on the DRAM bit pseudo-copula's pdf (shaded) divides the bit population into four Use/Test pass/fail categories, according to one embodiment of the invention.

The FOMs of interest for the non-fault-tolerant array can now be described. FIG. 22 shows a schematic representation of how the Test and Use conditions in Eqs. (62) and (63) superimposed over the bit pseudo-copula pdf of Eq. (71) divide the population probability space into four regions labeled according to a bit's Use/Test pass/fail category. This depiction is schematic because, for the DRAM, x and y are much closer to the origin than shown. It will be shown that FOMs can be expressed in terms of the probability mass (shaded) enclosed in each of the four labeled regions of the population probability space, and the probability masses can be expressed in terms of the pseudo-copula D. The essential tradeoff between overkill and end use fraction fail can be seen in FIG. 22 since moving the intersection of the Test and Use condition settings to reduce overkill (reduce probability density in region pf) will necessarily increase the probability density in region fp, and so increase end use fail fraction. For any given Test condition and Use condition each bit in a given array will fall into one of the four categories shown in FIG. 22. For an N-bit array the same considerations apply but the array pseudo-copula $D_N$ given by Eq. (74) is used rather than the bit pseudo-copula D given by Eq. (71). So, for an N-bit array which is good only when all of its bits are good (that is, it has no fault tolerance) the probability of occurrence of each category of the array is $$P_{fp}=D_N(x,1)-D_N(x,y)$$

$$P_{pf}=D_N(1,y)-D_N(x,y)$$

$$P_{ff}=D_N(x,y)$$

$$P_{pp}=1-D_N(x,1)-D_N(1,y)+D_N(x,y) \quad (75)$$

where the rules for writing the probability mass of a region of a pseudo-copula, Eq. (18), have been used. Note that $p_{fp}+p_{pf}+p_{ff}+p_{pp}=1$. Keep in mind that, as shown in FIG. 22, the first subscript for a probability mass like $p_{fp}$ refers to Use, and the second refers to Test.

Probabilities used to define FOMs may be written $$P(\text{Passes Test})=p_{pp}+p_{fp}$$

$$P(\text{Good in Use})=p_{pp}+p_{pf}$$

$$P(\text{Passes Test and Good in Use})=p_{pp} \quad (76)$$

so using Eqs. (58), (59), (60), (61), and (75) expressions for FOMs in terms of the model copula may be written:

$$YL = \frac{p_{ff} + p_{pf}}{p_{ff} + p_{pf} + p_{fp} + p_{pp}} = \frac{D_N(1, y_{test})}{D_N(1, 1)} = D_N(1, y_{test}) \quad (77)$$

$$EUFF = \frac{p_{fp}}{p_{fp} + p_{pp}} = \frac{D_N(x_{use}, 1) - D_N(x_{use}, y_{test})}{1 - D_N(1, y_{test})} \quad (78)$$

$$OKill(Mfg) = p_{pf} = D_N(1, y_{test}) - D_N(x_{use}, y_{test}) \quad (80)$$

$$OKill(\text{Test}) = \frac{p_{pf}}{p_{ff} + p_{pf}} = \frac{D_N(1, y_{test}) - D_N(x_{use}, y_{test})}{D_N(1, y_{test})}$$

An example of a perfectly correlated Test and Use is provided. For perfectly correlated Test and Use the probability density is uniform along the diagonal of FIG. 22 and $C(x, y)=\min[x, y]$. This in turn means, from Eq. (71), that $D(x, y)=\min[x, y]$. So, $$D_N(x, y) = 1 - [1 - D(x, 1)]^N - [1 - D(1, y)]^N + \quad (81)$$
$$[1 - D(x, 1) - D(1, y) + D(x, y)]^N$$
$$= 1 - [1 - x]^N - [1 - y]^N + [1 - x - y + \min[x, y]]^N$$
$$= \begin{cases} 1 - (1-x)^N & x \le y \\ 1 - (1-y)^N & x \ge y \end{cases}$$

$$YL = D_N(1, y_{test}) = 1 - (1 - y_{test})^N \quad (82)$$
$$= 1 - \exp\left[-N\left(\frac{r_{test}}{\alpha_{test}}\right)^\beta\right]$$

$$EUFF = \frac{D_N(x_{use}, 1) - D_N(x_{use}, y_{test})}{1 - D_N(1, y_{test})} \quad (83)$$
$$= \begin{cases} \frac{1 - (1 - x_{use})^N - [1 - (1 - y_{test})^N]}{1 - [1 - (1 - y_{test})^N]} & x_{use} \ge y_{test} \\ 0 & x_{use} \le y_{test} \end{cases}$$
$$= \begin{cases} \frac{(1 - y_{test})^N - (1 - x_{use})^N}{(1 - y_{test})^N} & x_{use} \ge y_{test} \\ 0 & x_{use} \le y_{test} \end{cases}$$
$$= \begin{cases} 1 - \exp\left\{-N\left[\left(\frac{r_{use}}{\alpha_{use}}\right)^\beta - \left(\frac{r_{test}}{\alpha_{test}}\right)^\beta\right]\right\} & \frac{r_{use}}{\alpha_{use}} \ge \frac{r_{test}}{\alpha_{test}} \\ 0 & \frac{r_{use}}{\alpha_{use}} \le \frac{r_{test}}{\alpha_{test}} \end{cases}$$

$$OKill(Mfg) = D_N(1, y_{test}) - D_N(x_{use}, y_{test}) \quad (84)$$
$$= \begin{cases} 0 & x_{use} \ge y_{test} \\ 1 - (1 - y_{test})^N - [1 - (1 - x_{use})^N] & x_{use} \le y_{test} \end{cases}$$
$$= \begin{cases} 0 & x_{use} \ge y_{test} \\ (1 - x_{use})^N - (1 - y_{test})^N & x_{use} \le y_{test} \end{cases}$$
$$= \begin{cases} 0 & \frac{r_{use}}{\alpha_{use}} \ge \frac{r_{test}}{\alpha_{test}} \\ \exp\left\{-N\left(\frac{r_{use}}{\alpha_{use}}\right)^\beta\right\} - \exp\left\{-N\left(\frac{r_{test}}{\alpha_{test}}\right)^\beta\right\} & \frac{r_{use}}{\alpha_{use}} \le \frac{r_{test}}{\alpha_{test}} \end{cases}$$

$$OKill(\text{Test}) = \frac{D_N(1, y_{test}) - D_N(x_{use}, y_{test})}{D_N(1, y_{test})} \quad (85)$$
$$= \begin{cases} 0 & x_{use} \ge y_{test} \\ \frac{1 - (1 - y_{test})^N - [1 - (1 - x_{use})^N]}{1 - (1 - y_{test})^N} & x_{use} \le y_{test} \end{cases}$$
$$= \begin{cases} 0 & \frac{r_{use}}{\alpha_{use}} \ge \frac{r_{test}}{\alpha_{test}} \\ \frac{\exp\left\{-N\left(\frac{r_{use}}{\alpha_{use}}\right)^\beta\right\} - \exp\left\{-N\left(\frac{r_{test}}{\alpha_{test}}\right)^\beta\right\}}{1 - \exp\left\{-N\left(\frac{r_{test}}{\alpha_{test}}\right)^\beta\right\}} & \frac{r_{use}}{\alpha_{use}} \le \frac{r_{test}}{\alpha_{test}} \end{cases}$$

Eq. (83) shows that for perfect correlation, EUFF vanishes if the Test condition exceeds the Use condition, and it quantifies the fraction failing whenever the test condition is made less than the use condition. The behavior of the overkill FOMs complement this, showing the essential tradeoff between EUFF and overkill. Notice that Use and Test conditions are quantified by the single parameter r/α and α depends on $V_p$, $V_d$, and temperature.

Regarding fault tolerance, the array model is generalized to take account of fault tolerance at Test and in Use. At Test fault tolerance is implemented by physically remapping of failed bits to a small number of rows or columns, whereas in Use fault tolerance is implemented by error correction redundancy coding (ECC), not physical repair. Statistical models of the effect of fault tolerance schemes on FOMs is done by expanding the definition of a "good" array to include arrays with some "bad" bits. "Bad" bits in arrays that are considered "good" are taken to be covered by a fault tolerance scheme. The maximum number of "bad" bits that can be tolerated is a measure of the repair capacity of the fault tolerance scheme. Only the repair capacity of a fault tolerance scheme is needed to estimate the effect on FOMs. It is not necessary to know implementation details of the scheme. The expressions for FOMs for two fault tolerant cases are derived. The cases are 1) No Repair at Test, and 2), Repair at Test. In the first of these cases the tester does not actively repair any failing bits that it finds, whereas in the second case the tester can repair some failing bits.

Consider an array made from N of the bits characterized and modeled by the copula-based model in the DRAM example experiment. The probability that the array has exactly $n_{fp}$ bits in category $fp$, $n_{pf}$ bits in category $pf$, and $n_{ff}$ bits in category $ff$ is, by the multinomial theorem and its Poisson limit, $$\binom{N}{n_{pf}, n_{fp}, n_{ff}} p_{pf}^{n_{pf}} p_{fp}^{n_{fp}} p_{ff}^{n_{ff}} (1 - p_{pf} - p_{fp} - p_{ff})^{N - n_{pf} - n_{fp} - n_{ff}} \xrightarrow[N \to \infty]{} \quad (86)$$

$$\frac{\lambda_{ff}^{n_{ff}} \exp(-\lambda_{ff})}{n_{ff}!} \frac{\lambda_{pf}^{n_{pf}} \exp(-\lambda_{pf})}{n_{pf}!} \frac{\lambda_{fp}^{n_{fp}} \exp(-\lambda_{fp})}{n_{fp}!}$$

where $\lambda_{pf} = N p_{pf}$, $\lambda_{fp} = N p_{fp}$, $\lambda_{ff} = N p_{ff}$ and where $p_{pf}$, $p_{fp}$, and $p_{ff}$ are related to the bit-level pseudo-copula D by Eq. (75) with N=1. It will be shown that expressions for the three probabilities P(Passes Test), P(Good in Use), and P(Passes Test and Good in Use) all involve sums over terms like either side of Eq. (86). FOMs depend, in turn, on these probabilities via Eqs. (58), (59), (60), and (61). The Poisson limit is well-justified for the DRAM since typical arrays have many thousands of bits with only tens of failing bits at most. Moreover, the mathematical manipulations are more tractable in this limit.

The method of summing sums of terms like Eq. (86) over categories of failure mechanisms (single cell, word-line, etc.) is known. The invention described here uses the same method, except that the categories are pass/fail in Use or Test. It is also known from earlier work that account can be taken of variation of defect density across wafers, lots, and factories by replacing the Poisson terms on the r.h.s. of Eq. (86) by a negative binomial distribution $$\frac{\Gamma(\alpha + n)}{n! \Gamma(\alpha)} \frac{(\lambda/\alpha)^n}{(1 + \lambda/\alpha)^{n+\alpha}} \xrightarrow[\alpha \to \infty]{} \frac{\lambda^n \exp(-\lambda)}{n!} \quad (87)$$

where α quantifies the variation of defect density and α→∞ corresponds to uniform defect density. It is important to note that this description applies to variations in cell defect density of much greater spatial extent than the size of the N-bit array, so that the defect density within any given array is constant. Ways to extend yield models of defect-tolerance to arbitrarily complex chip floor plans and to defect density variations, which can occur within the chip have also been established in earlier work. All of these extensions are available to the method described here, but to minimize clutter the single-mechanism Poisson formulation, Eq. (86), will be used to show the novel aspects of the invention. The novel aspects with regard to fault tolerance are 1) calculation of pass/fail probabilities for Test/Use categories, 2) calculation of all important FOMs, not just yield loss, 3) graphical representation of fault tolerance schemes, 4) efficient ways to compute functions needed by the theory. These enable earlier work covering other aspects to be extended to take account of miscorrelation between Test and Use, and to consider FOMs other than yield.

Fault tolerance schemes in Test and in Use may be described by a set of constraints on the range of indices over which the sums of terms like Eq. (86) range in expressions for the probability functions appearing in the expressions for the FOMs, Eqs.(58), (59), (60), and (61). In general, sets of allowed values of $n_{ff}$, $n_{pf}$, and $n_{fp}$ consistent with the constraints may be computed once for any test and array design scheme and then be reused to compute FOMs for different values of $\lambda_{ff}$, $\lambda_{pf}$, and $\lambda_{fp}$. In the examples shown next, attention is confined to cases for which FOMs may be computed even more conveniently using special functions. Two cases will be considered: No Repair at Test, and Repair at Test.

In the No Repair at Test case, Test tolerates, but does not repair, ≤$n_t$ failing bits, and Use tolerates ≤$n_u$ bits. In this case, $n_t$ is a measure of the transparency of Test to failing bits. On the other hand, the Repair at Test case would restore up to $n_t$ failing bits to functionality by, for example, replacing a word with a bad bit with a word with all good bits. In this case, $n_t$ is a measure of the size of the supply of spares. $n_u$ and $n_t$ are usually small integers, which makes evaluation of various required functions easy. In the following, keep in mind that the first character in labels such as ff, pf, and fp refers to Use, and the second refers to Test.

Turning to the No Repair at Test case, expressions for three probability functions are needed. The first of these is the probability of Passes Test where an array is defined as passing test with up to $n_t$ bits failing. The permitted counts of bit categories for arrays in the Passes Test category is the set of integers:

$$\text{PT\_NR} = \left\{ \begin{array}{l} n_{ff}, n_{pf}, n_{fp}: \\ 0 \le n_{ff} + n_{pf} \le n_t \\ 0 \le n_{fp} < \infty \end{array} \right\} \quad (88)$$

which leads to $$P(\text{Passes Test}) = \quad (89)$$

$$\sum_{PT\_R} \frac{\lambda_{ff}^{n_{ff}} e^{-\lambda_{ff}}}{n_{ff}!} \frac{\lambda_{fp}^{n_{fp}} e^{-\lambda_{fp}}}{n_{fp}!} \frac{\lambda_{pf}^{n_{pf}} e^{-\lambda_{pf}}}{n_{pf}!} = R(\lambda_{ff} + \lambda_{pf}, n_t)$$

where $$R(x, n) \equiv e^{-x} \sum_{0 \le i \le n} \frac{x^i}{i!}. \quad (90)$$

Manipulations leading to Eq. (89) and (90) are shown below. As shown below, the function R is related to the cumulative Gamma distribution, which is available in many software function libraries.

The second probability function required for the No Repair at Test case is the Good in Use probability function where an array is defined as good in use with up to $n_u$ bits failing. The permitted counts of bit categories for arrays in the Good in Use (irrespective of Test) category is the set of integers:

$$\text{GIU\_NR} = \left\{ \begin{array}{l} n_{ff}, n_{pf}, n_{fp}: \\ 0 \le n_{ff} + n_{fp} \le n_u \\ 0 \le n_{pf} < \infty \end{array} \right\} \quad (91)$$

which, by symmetry w.r.t. Eq.(88), leads to $$P(\text{Good in Use}) = R(\lambda_{ff} + \lambda_{fp}, n_u). \quad (92)$$

The third probability function required for the No Repair at Test case is the Passes Test and Good in Use probability function. The permitted counts of bit categories for arrays in the Passes Test and Good in Use category is the set of integers $$\text{PTGIU\_NR} = \left\{ \begin{array}{l} n_{ff}, n_{pf}, n_{fp}: \\ 0 \le n_{ff} + n_{pf} \le n_t \\ 0 \le n_{ff} + n_{fp} \le n_u \end{array} \right\} \quad (93)$$

which leads to $$P(\text{Passes Test and Good in Use}) = \quad (94)$$

$$\sum_{PTGIU\_NR} \frac{\lambda_{ff}^{n_{ff}} e^{-\lambda_{ff}}}{n_{ff}!} \frac{\lambda_{fp}^{n_{fp}} e^{-\lambda_{fp}}}{n_{fp}!} \frac{\lambda_{pf}^{n_{pf}} e^{-\lambda_{pf}}}{n_{pf}!} \equiv K(\lambda_{ff}, \lambda_{fp}, n_u, \lambda_{pf}, n_t)$$

Notice that, as expected from the definitions of the probability functions P(Passes Test), etc., the set of integers PTGIU_NR is the intersection of the sets PT_NR and GIU_NR. The function K, shown in Eq. (146) below, is easy to evaluate because it is a sum of a small finite number of terms involving products of the function R.

Figure 23C:
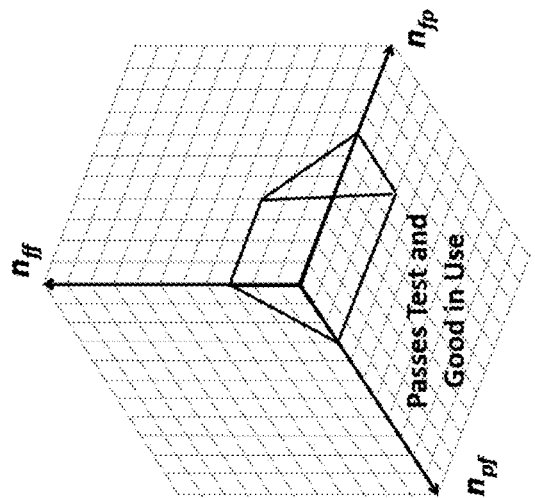
FIGS. 23a-23c show how three probability functions used to compute FOMs correspond to shapes in bit category index space enclosing tolerated counts of to memory array bits in various categories for the No Repair at Test case, according to one embodiment of the invention.
Figure 23B:
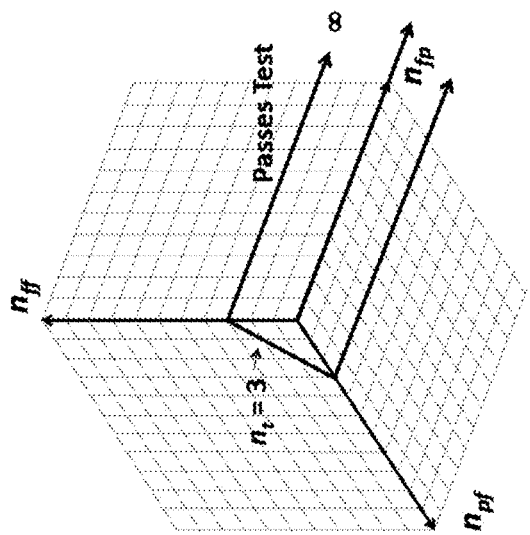
Figure 23A:
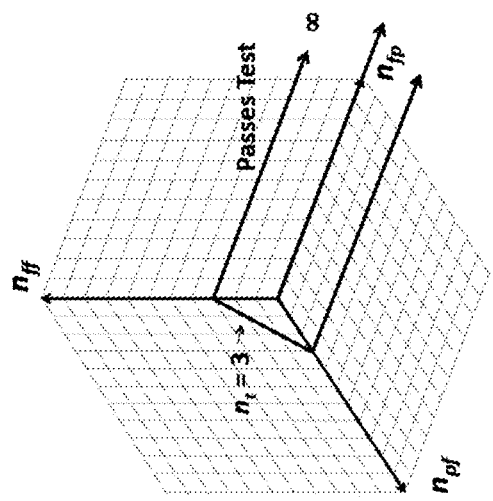
Figure 24A:
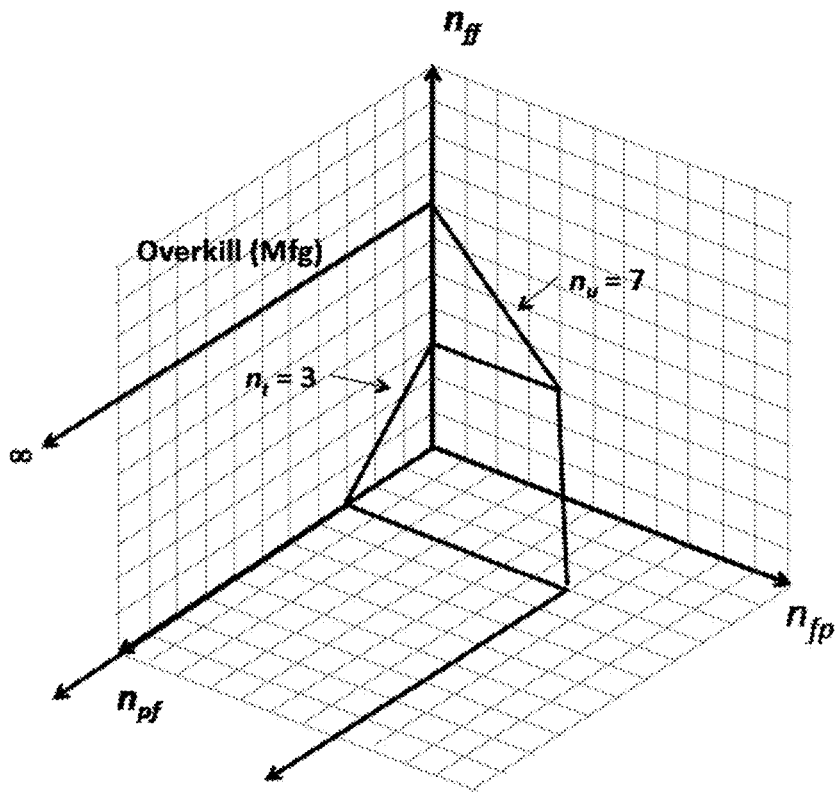
FIGS. 24a-24b show the bit category index space volumes enclosing tolerated bit counts in various categories corresponding to Overkill (Mfg) and EUFF for the No Repair at Test case of a memory array, according to one embodiment of the invention.
Figure 24B:
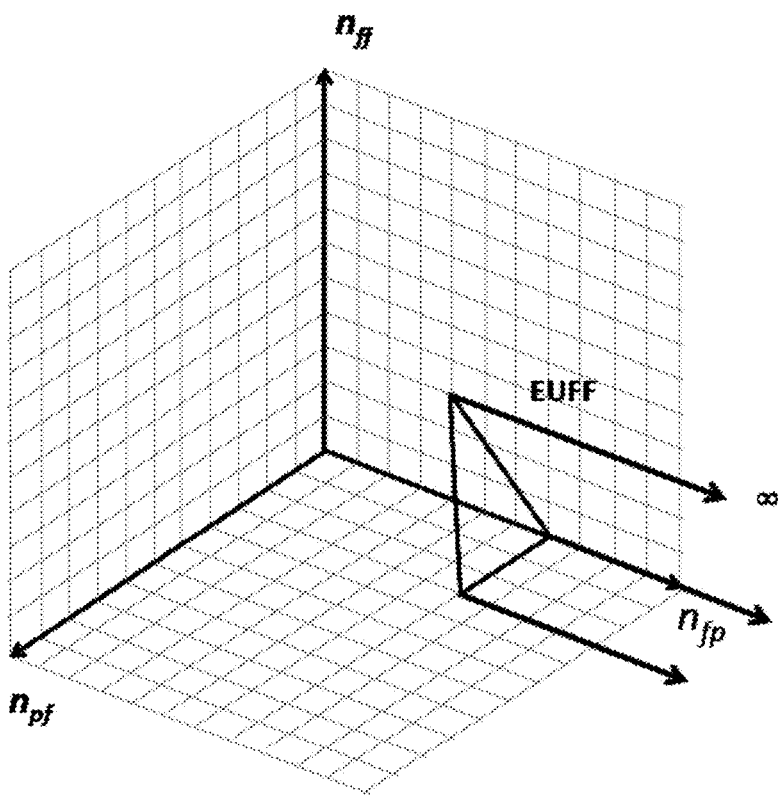

Sets of integers corresponding to three categories of arrays given by Eqs. (88), (91), and (93) may be visualized as regions in bit category index space as shown in FIGS. 23a-23c for $n_t=3$ and $n_u=7$. Each lattice point in this space corresponds to a term like Eq. (86) in the probability functions given by Eqs. (89), (92), and (94). The magnitude of the term depends on values of $\lambda_{pf}$, $\lambda_{fp}$, and $\lambda_{ff}$ and is larger for lattice points closer to the origin. The Passes Test, and the Good in Use categories are infinite prisms running down the $n_{fp}$ and $n_{pf}$ axes, respectively. The Passes Test and Good in Use category is the intersection of these prisms. For no fault tolerance, the allowed integers collapse to the single point at the origin, (0, 0, 0). Because the three probability functions used to compute FOMs correspond to shapes in index space shown in FIGS. 23a-23c, the FOMs derived from these probability functions via Eqs. (58), (59), (60), and (61) also correspond to volumes in index space. The volume corresponding to Yield Loss is the entire space outside the prism in FIG. 23a. The volumes for Overkill (Mfg) and EUFF [apart from the normalizing factor, P(Passes Test)] are shown in FIGS. 24a-24b. Notice that, for $n_u > n_t$, the volume corresponding to Overkill includes array configurations which would pass in Use with fairly high probability since the index points are close to the origin. That is, as $n_u$ increases and $n_u > n_t$, Overkill becomes larger and more nearly equal to Yield Loss because Test is rejecting more arrays that would have been good in Use. On the other hand, EUFF is small because all of the terms contributing to it are distant from the origin. Geometrical considerations like this are helpful in interpreting the dependencies of the model.

Turning to the Repair at Test case, expressions for the three needed probability functions are derived. Suppose that Test can repair up to $n_r$ bits. In this case, the active intervention of repair at Test changes the meaning of the array Good in Use criterion involving $n_u$. So Eqs. (88), (91), and (93) for the No Repair at Test case are rewritten as described in the following.

The Passes Test probability function for the Repair at Test case is defined by the same set of integers as the No-Repair at Test case because the criterion for rejecting an array at Test depends only on the number of bits tolerated at Test, not on whether or not any of the tolerated bits are repaired. So the Passes Test category of arrays in the Repair at Test case is defined by the set of integers:

$$\text{PT\_R} = \text{PT\_NR} = \left\{ \begin{array}{l} n_{ff}, n_{pf}, n_{fp}: \\ 0 \le n_{ff} + n_{pf} \le n_t \\ 0 \le n_{fp} < \infty \end{array} \right\} \quad (95)$$

which leads to the same expression as for the No Repair at Test case:

$$P(\text{Passes Test}) = R(\lambda_{ff} + \lambda_{pf}, n_t). \quad (96)$$

Regarding the Good in Use probability function of the Repair at Test case, if an array is subjected to a repair process at Test with capacity $n_r$, then the effective number of ff and pf bits affecting the post-test classification of the array is the union of the ff and pf categories, minus $n_r$: $n_{ff} + n_{pf} - n_r$. If it is assumed that the repair process does not distinguish between ff and pf bits (both kinds are detected as fails in Test), then the proportion of ff and pf bits affecting post test array classification is the same as the pre-test proportions of these bit categories. So one may model the post-test ff bit count, which must figure into classification of arrays in Use as $$n'_{ff} = n'_{ff}(n_{ff}, n_{pf}, n_t) = \left[ \max[n_{ff} + n_{pf} - n_t, 0] \frac{n_{ff}}{n_{ff} + n_{pf}} \right] \quad (97)$$

where this is rounded up to the next integer. So the set of integers defining the Good in Use category of arrays for the Repair at Test case is $$\text{GIU\_R} = \left\{ \begin{array}{l} n_{ff}, n_{pf}, n_{fp}: \\ 0 \le n'_{ff}(n_{ff}, n_{pf}, n_t) + n_{fp} \le n_u \\ 0 \le n_{pf} < \infty \end{array} \right\} \quad (98)$$

Eq. (98) coincides with Eq. (91) when $n_t=0$ because $n_{ff}=n'_{ff}(n_{ff}, n_{pf}, 0)$.

In general, $n_{ff} \le n'_{ff}$, but whenever $n_{pf}$ is greater than a sufficiently large value, m, then the effect of $n_t$ in Eq. (97) is negligible and $n_{ff}=n'_{ff}$. That is, $$n_{ff}=n'_{ff}(n_{ff},n_{pf},n_t) \text{ for } n_{pf} \ge m. \quad (99)$$

Figure 25A:
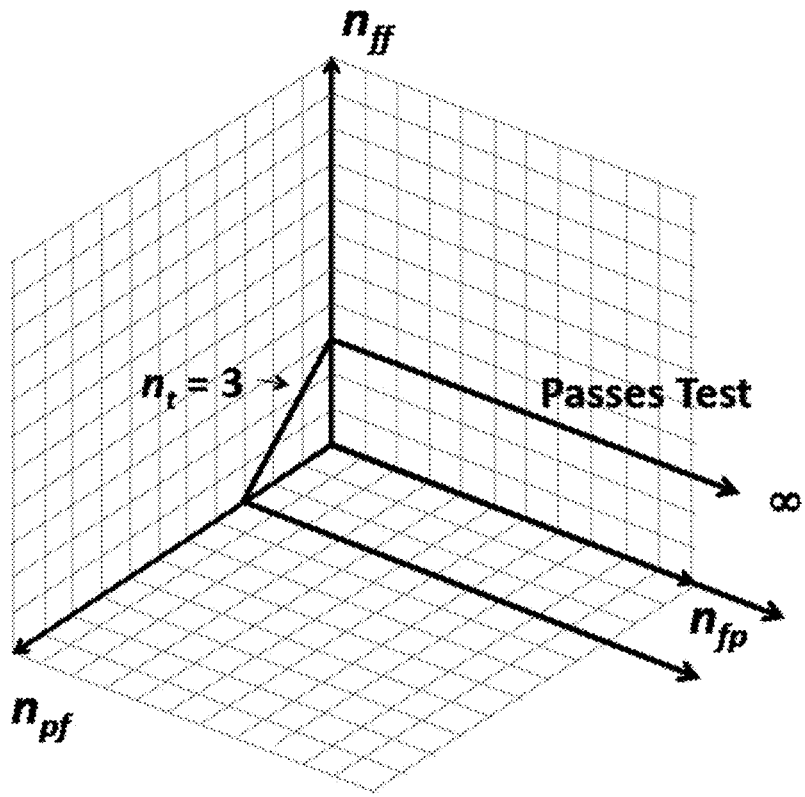
FIGS. 25a-25c show the Passes Test (FIG. 25a) and Good in Use (FIG. 25b) categories represented as volumes in bit category index space, and the intersection of these categories (FIG. 25c), for a memory array in the Repair at Test case, according to one embodiment of the invention.
Figure 25B:
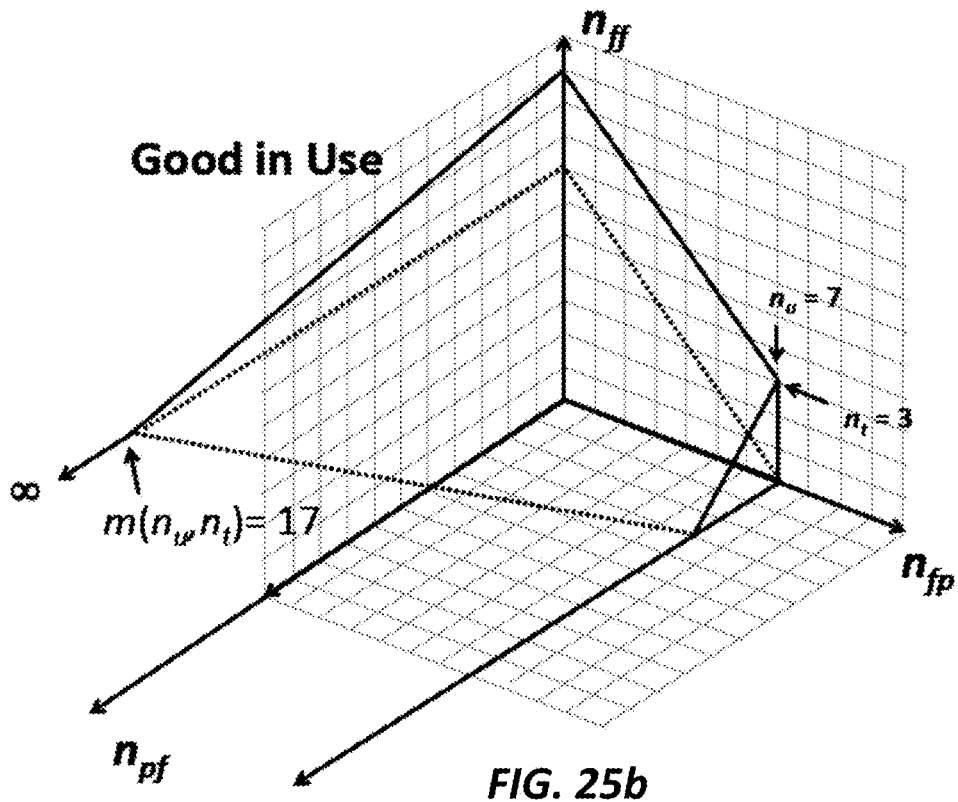

The geometrical interpretation of m is shown in FIG. 25b. Careful study of Eq. (97) shows that m is the smallest integer value (≥0), which satisfies $$n_u = n'_{ff}(n_u+1, m, n_t) - 1 \qquad (100)$$

Eq. (100) is easily solved incrementing m through a small number of integer values until the equation is satisfied. So $m=m(n_u, n_t)$ is a function of $n_u$ and $n_t$. Some special cases are: $m(n_u, 0)=0$, $m(n, n)=n^2$.

Because of the property $n_{ff} \leq n'_{ff}$, the set of integers GIU_NR is a subset of GIU_R. That is $$\text{GIU\_R} = \text{GIU\_NR} \cup \Delta\text{GIU\_R} \qquad (101)$$

where $$\Delta\text{GIU\_R} = \left\{ \begin{array}{c} n_{ff}, n_{pf}, n_{fp}: \\ 0 \leq n'_{ff}(n_{ff}, n_{pf}, n_t) + n_{fp} \leq n_u \\ n_{ff} + n_{fp} > n_u \\ 0 \leq n_{pf} \leq m(n_u, n_t) - 1 \end{array} \right\} \qquad (102)$$

In Eq. (102) the second inequality ensures that the integers in ΔGIU_R are not in GIU_NR, and the final condition limits the range of $n_{pf}$ to cases where $n_{ff} < n'_{ff}$ is possible, for the purpose of efficiency. A geometrical interpretation of GIU_R is shown in FIG. 25b. Notice that, in FIG. 25b, ΔGIU_R is represented by the 5-sided polyhedron atop the Good-in-Use prism for GIU_NR shown in FIG. 23b. The sum over the integers GIU_NR has been given by Eq. (92), to which must be added terms resulting from Eq. (102)

$$P(\text{Good in Use}) = L(\lambda_{ff}, \lambda_{fp}, \lambda_{pf}, n_u, n_t) + R(\lambda_{ff} + \lambda_{fp}, n_u) \qquad (103)$$

where $$L(\lambda_{ff}, \lambda_{fp}, \lambda_{pf}, n_u, n_t) = \sum_{\Delta GIU\_R} \frac{\lambda_{ff}^{n_{ff}} e^{-\lambda_{ff}}}{n_{ff}!} \frac{\lambda_{fp}^{n_{fp}} e^{-\lambda_{fp}}}{n_{fp}!} \frac{\lambda_{pf}^{n_{pf}} e^{-\lambda_{pf}}}{n_{pf}!} \qquad (104)$$

When $n_t=0$ the set ΔGIU_R is empty, then L=0, and the repair-in-Test case becomes the same as the No-Repair-in-Test case. The function L is easy to evaluate for the usual case when $n_t$ and $n_u$ are small integers since it is a sum over the small set of integers in the 5-sided polyhedron in FIG. 25b referred to above. Notice that m in the figure limits the range over which the sum over $n_{pf}$ must be taken.

The Passes Test and Good in Use probability function of the Repair at Test case corresponds to the intersection of allowed indexes for the Passes Test and Good in Use cases previously described:

$$\text{PTGIU\_NR} = \left\{ \begin{array}{c} n_{ff}, n_{pf}, n_{fp}: \\ 0 \leq n'_{ff}(n_{ff}, n_{pf}, n_t) + n_{fp} \leq n_u \\ 0 \leq n_{ff} + n_{pf} \leq n_t \end{array} \right\} \qquad (105)$$

Figure 25C:
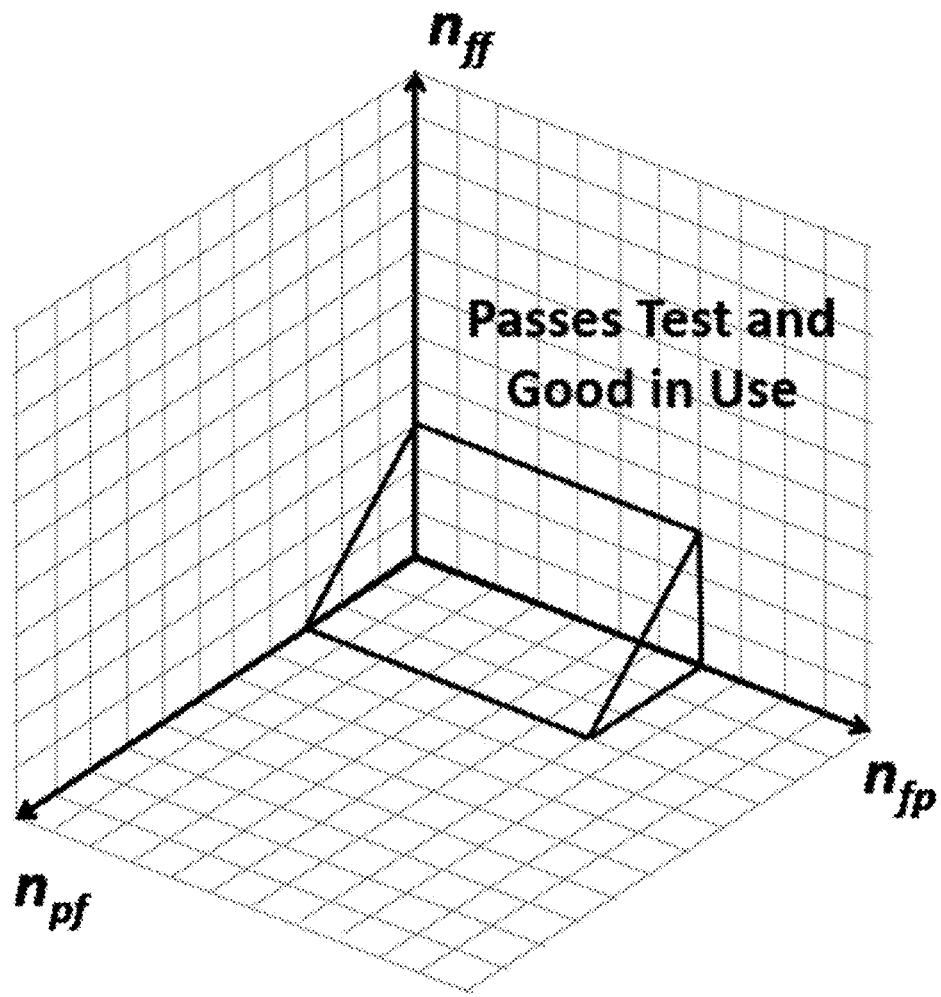

The final inequality in Eq. (105), substituted into Eq. (97), ensures that $n'_{ff}=0$, so Eq. (105) becomes $$\text{PTGIU\_R} = \left\{ \begin{array}{c} n_{ff}, n_{pf}, n_{fp}: \\ 0 \leq n_{fp} \leq n_u \\ 0 \leq n_{ff} + n_{pf} \leq n_t \end{array} \right\} \qquad (106)$$

which has the simple geometrical interpretation shown in FIG. 25c. Eq. (106) immediately leads to $$P(\text{Passes Test and Good in Use}) = R(\lambda_{fp}, n_u) R(\lambda_{ff} + \lambda_{pf}, n_t) \qquad (107)$$

The expressions for the three probabilities, Good in Use, Passes Test, and Passes Test and Good in Use, derived in this section for arrays produced in a No Repair at Test or Repair at Test case may be substituted into the expressions for FOMs, Eqs. (58), (59), (60), and (61) to obtain the array FOMs.

Turning now to application of the current invention, environmental models of marginal distributions, wedge copula models, the test coverage model, and scaling and fault tolerance models were implemented in an Excel calculator. The calculator makes deterministic calculations of FOMs from the fitted model. These FOMs, when compared with FOM targets, can be used to determine the Test manufacturing process, datasheet specification, and fault tolerance requirements of the integrated circuit memory product. The user interface of the calculator is shown in FIG. 26. Dashed-outlined cells are user inputs, and solid-lined cells are outputs. The main sections of the interface of the Excel calculator tool are described in more detail in the following.

The Skew, Model Parameters section in FIG. 26 allows the user to select the process skew (Table 1). The fitted marginal distribution environmental parameters and wedge copula parameters for the selected skew (Table 3) are displayed. An extra skew called "Spare" which is the same as the nominal skew but with a perfect correlation copula, M, is available in addition to the five skews of Table 1 for which parameters were extracted from data.

The Memory Architecture section in FIG. 26 allows the user to select the array size and number of bits tolerated at Test and at Use. The number of bits tolerated at Test is interpreted in two ways: 1) For No Repair at Test, failing bits detected at Test are tolerated but not repaired. 2) For Repair at Test, failing bits detected at Test are tolerated and made good (repaired). A set of FOMs is generated for each way.

The Test and Use Conditions section in FIG. 26 allows the user to select retention time and environmental conditions ($V_u$, $V_d$, T) for Test and for Use. The model also requires specification of the test coverage model, which defines how minimum and maximum retention times for a VRT bits are be distributed between Test and Use. The interface provides a choice between the conservative test coverage model in which $r_{max}$ occurs only in Test, and $r_{min}$ occurs only in Use, the aggressive test coverage model for the opposite assumption, and the symmetrical test coverage model for which min/max retention times are equally likely to be in Test or Use.

The Figures of Merit section in FIG. 26 shows the computed four FOMs defined by Eqs. (58), (59), (60) and (61) for the No-Repair-at-Test, and the Repair-at-Test cases.

Not shown in FIG. 26 are parts of the interface, which specify targets and plotting limits for the graphs also produced by the calculator. The graphs generated by sweeping the Test retention time past the Use refresh time give a good appreciation of the properties of the model. Because environmental conditions enter the model only through ln α [see Eqs. (62), (63) and (2)], properties of the model may be explored by setting $V_p$, $V_d$, and T to a convenient value (the reference condition in the example shown in FIG. 26), and then sweeping the retention time setting in Test past the Use refresh time specification. Plots are generated for which all the input parameters are entered in the user interface as described above, except that the Test retention time (r_t) is swept between the plotting limits defined for it. We suppose a 1 Mb ($2^{20}$ bits) array is fabricated in the nominal skew, that the environmental conditions of both Test and Use are $V_p$=0.45 V, $V_d$=1.2 V, T=125° C., and that the data sheet (Use) refresh time is 108 au. The targets for the product are taken as Yield Loss≤20%, Overkill (Mfg)≤2%, and EUFF≤200 DPPM. As the test retention time set point is swept from 90 au to 150 au, the Yield Loss, Overkill (Mfg), and EUFF FOMs vary as shown in FIG. 27 to FIG. 31.

Figure 27:
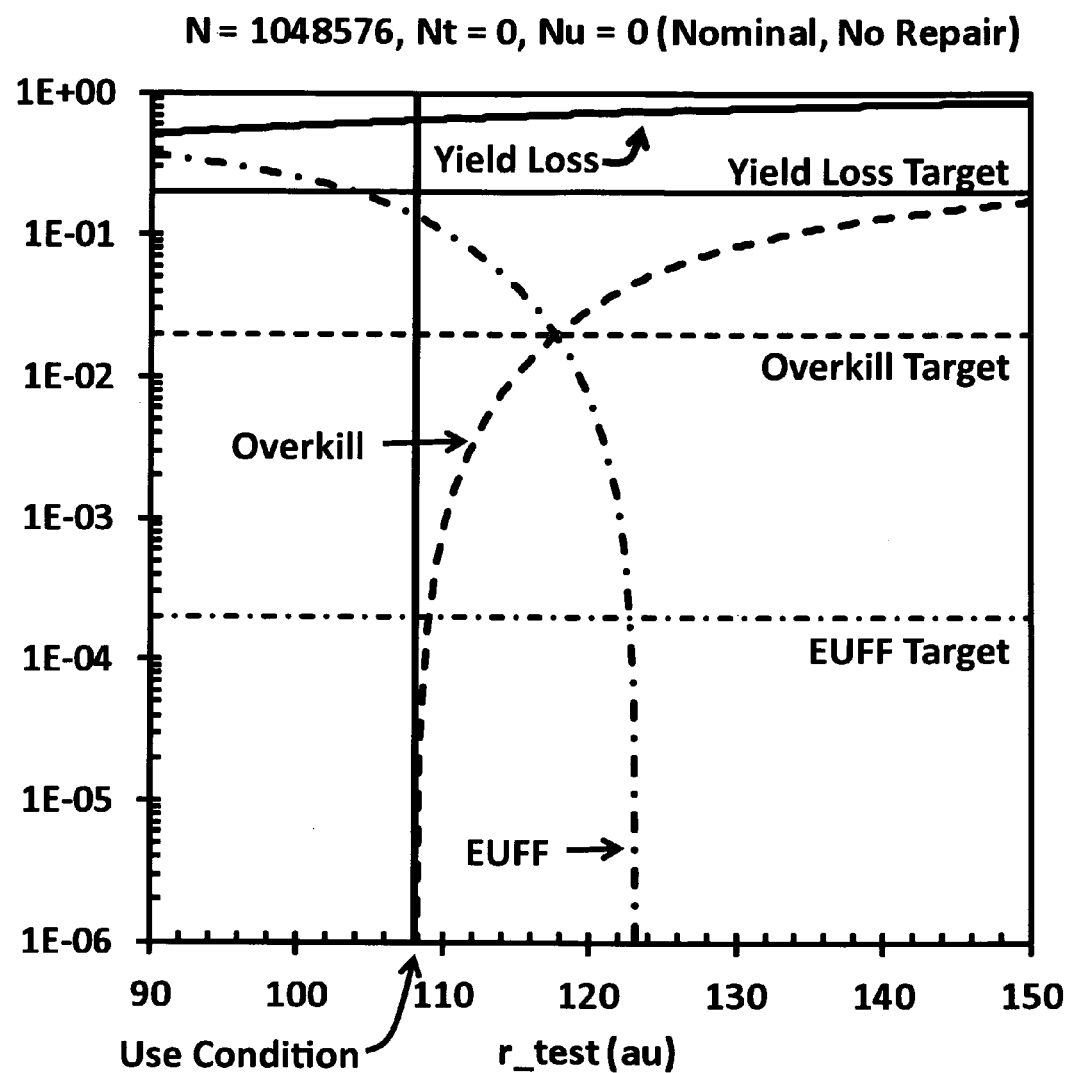
FIGS. 27-28 show graphs of figures of merit vs. test retention time setting, with (FIG. 27), and without (FIG. 28), fault tolerance according to one embodiment of the invention.
Figure 28:
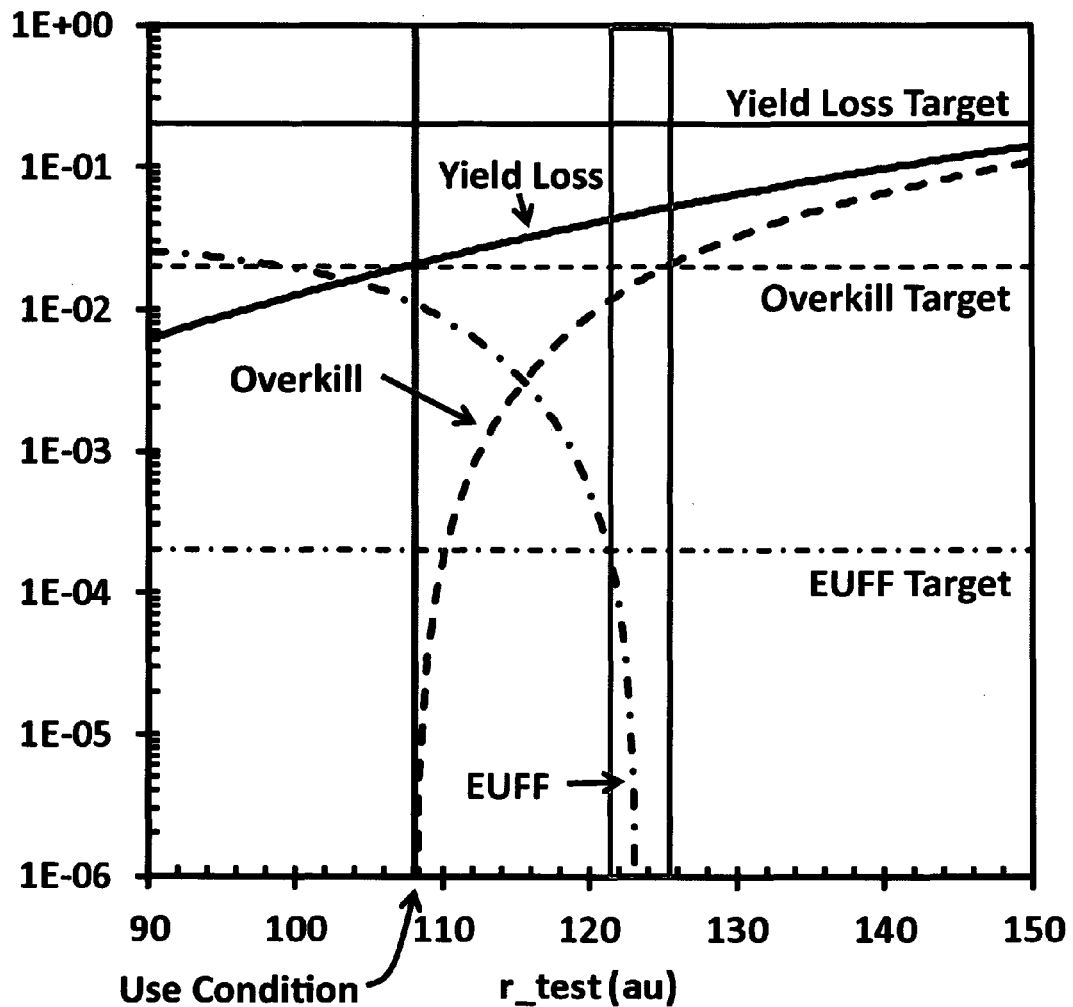

It is apparent from FIG. 27 that, without fault tolerance ($n_t$=0, $n_u$=0), it is impossible to find a Test retention time for which Yield Loss, Overkill (Mfg), and EUFF targets are simultaneously met. If the array can tolerate failing bits by some error-correction mechanism in the array, then all of the FOMs are reduced and a Test set point exists for which all targets are satisfied. For the conditions of the example, three is the minimum number of faulty bits that the array must tolerate [$n_t$=3 (No Repair at Test) and $n_u$=3] for a test set point to exist, and FIG. 28 shows FOM characteristics and the range of possible test retention time settings (shaded region) for this case. A set point at the left edge of this range will minimize Overkill (Mfg) and Yield Loss while meeting the EUFF target: $n_{test}$=121 au, YL=4.3%, Overkill (Mfg)=1.2%, EUFF=173 DPPM.

Figure 29A:
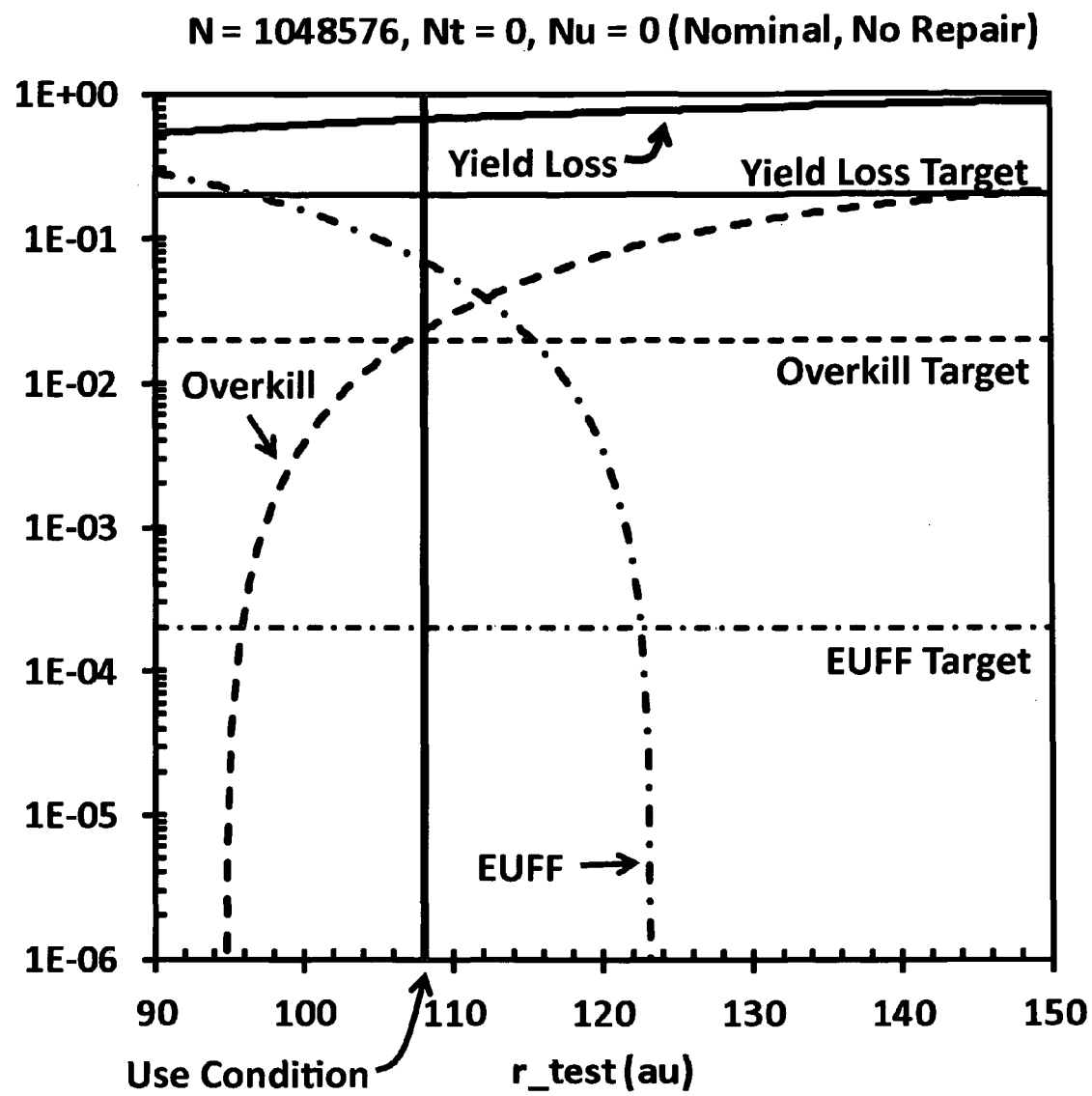
FIGS. 29a-29c show, for the case of no fault tolerance, graphs of figures of merit for test coverage models different from the conservative test coverage model (FIGS. 29a and 29b), and for the case of perfect correlation between test and use (FIG. 29c), according to one embodiment of the invention.
Figure 29B:
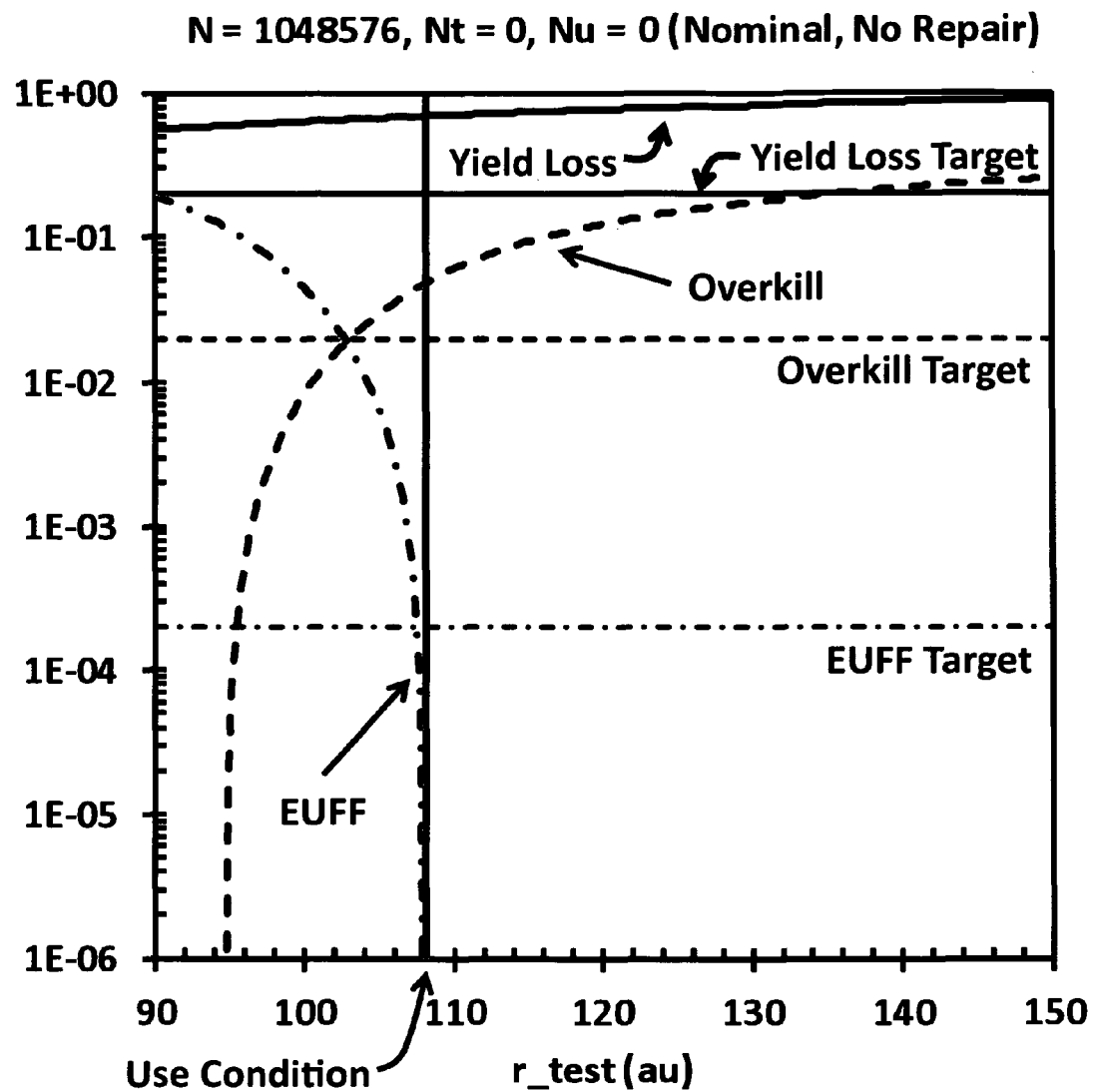
Figure 29C:
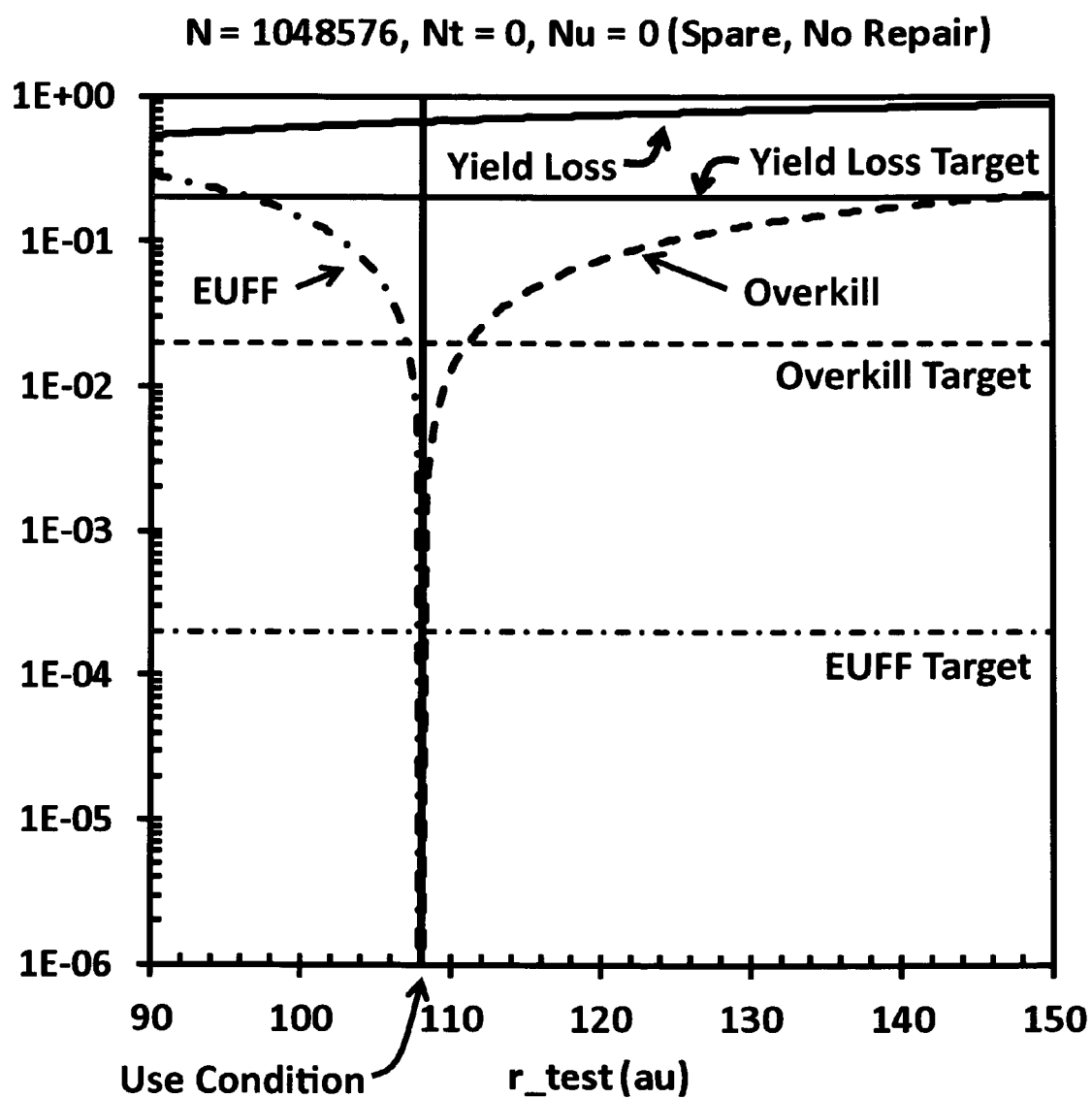

FIGS. 27, 28 and 29a-29c show how the shape of the FOM characteristics reflect the underlying copula model. In the No Repair cases of FIG. 27, FIG. 28, and FIG. 29a-29c, vertical asymptotes on a logarithmic plot of the Overkill and EUFF figures of merit correspond to the boundaries of the wedge copula, transformed by the test coverage model, at the Use condition. If retention time in Test is always $r_{max}$ and in Use it is always $r_{min}$, (the conservative test coverage model) as in all figures except FIGS. 29a and 29b, then the Overkill vertical asymptote corresponds to the Use condition. The case of the symmetrical test coverage model is shown in FIG. 29a and the aggressive test coverage model is shown in FIG. 29b. FIG. 29c shows how the case of perfect correlation makes vertical asymptotes of Overkill and EUFF both align with the Use condition. Comparison of FIGS. 27, 29a, and 29b gives an example of how the conservative test coverage model maximizes the model estimate of EUFF compared to the symmetrical and aggressive test coverage models.

Another way to implement fault tolerance is to repair arrays at Test. Consider arrays defined as for FIG. 27, except that Test tolerates 2 bits but does not repair them. In this case many arrays will fail in Use because Test is transparent to arrays with up to 2 bits failing, but Use cannot tolerate any failing bits in the array. This leads to a large value of EUFF shown in FIG. 30a. Now suppose that Test repairs the 2 bits that it tolerates. In this case EUFF is much reduced, and FIG. 30b shows that it will be possible to find a Test set point, which meets the targets (shaded range).

Figure 30A:
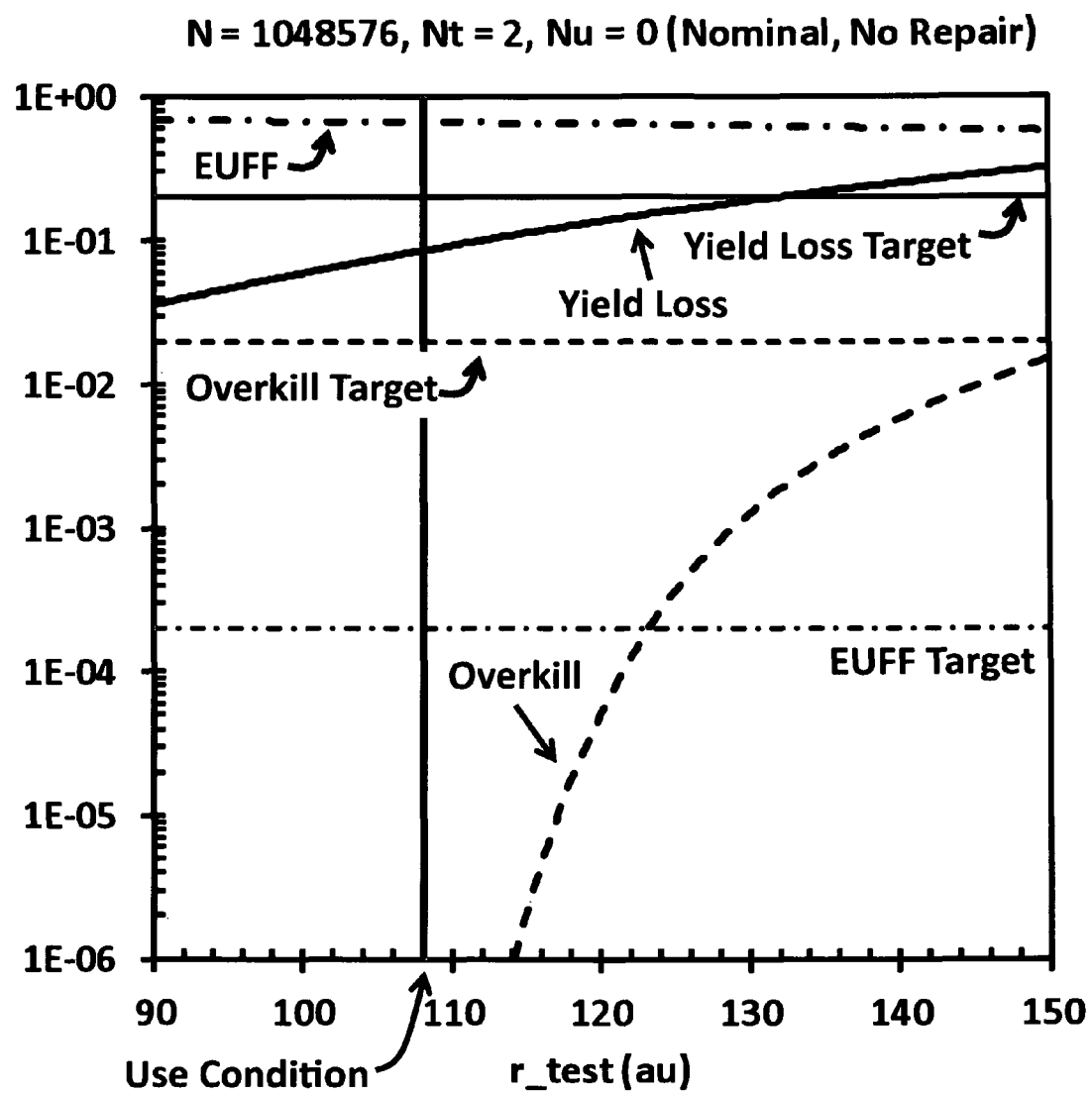
FIGS. 30a-30b compare a case for which Test tolerates, but does not repair, up to two failing bits with a case for which Test tolerates and repairs up to two failing bits, according to one embodiment of the invention.
Figure 30B:
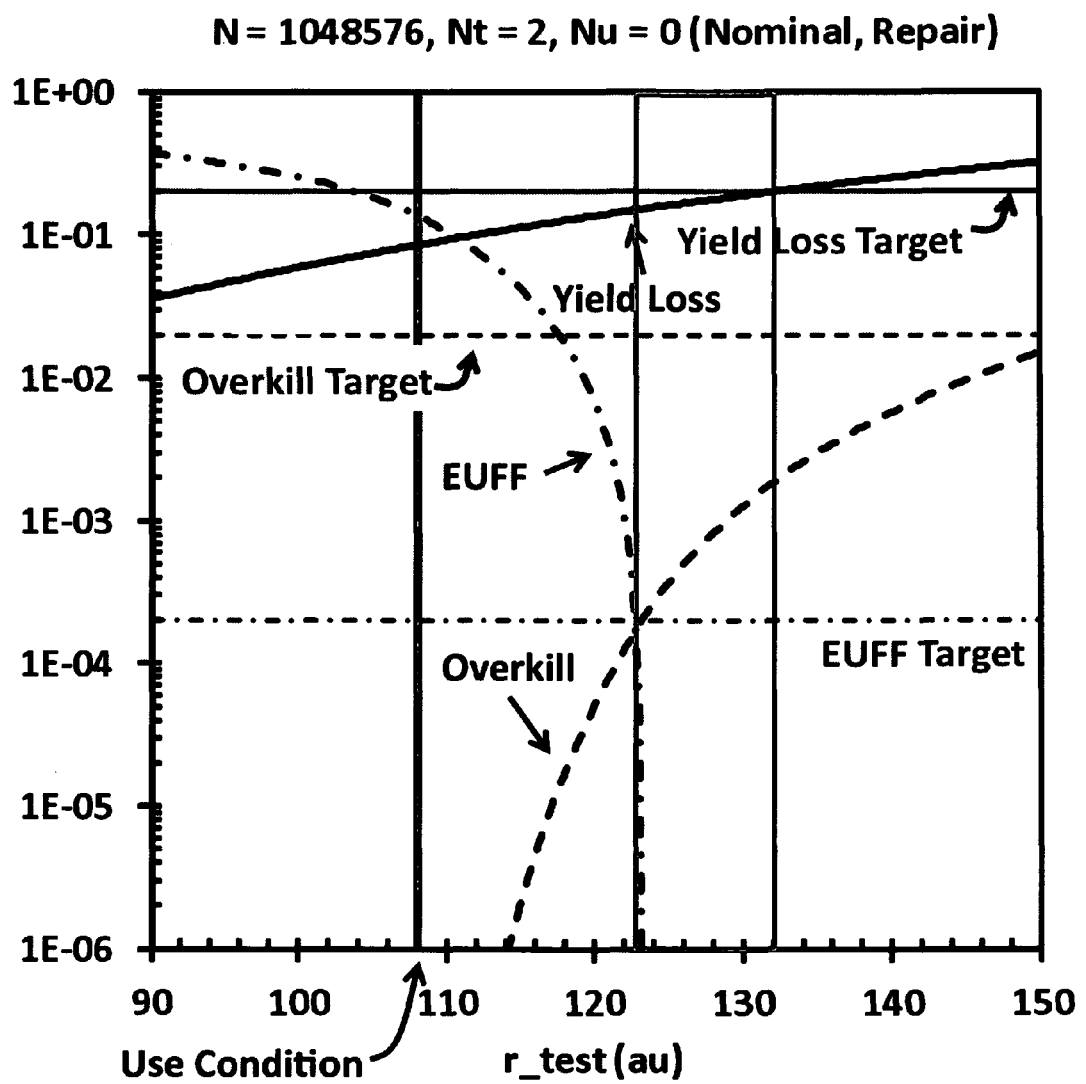
Figure 31:
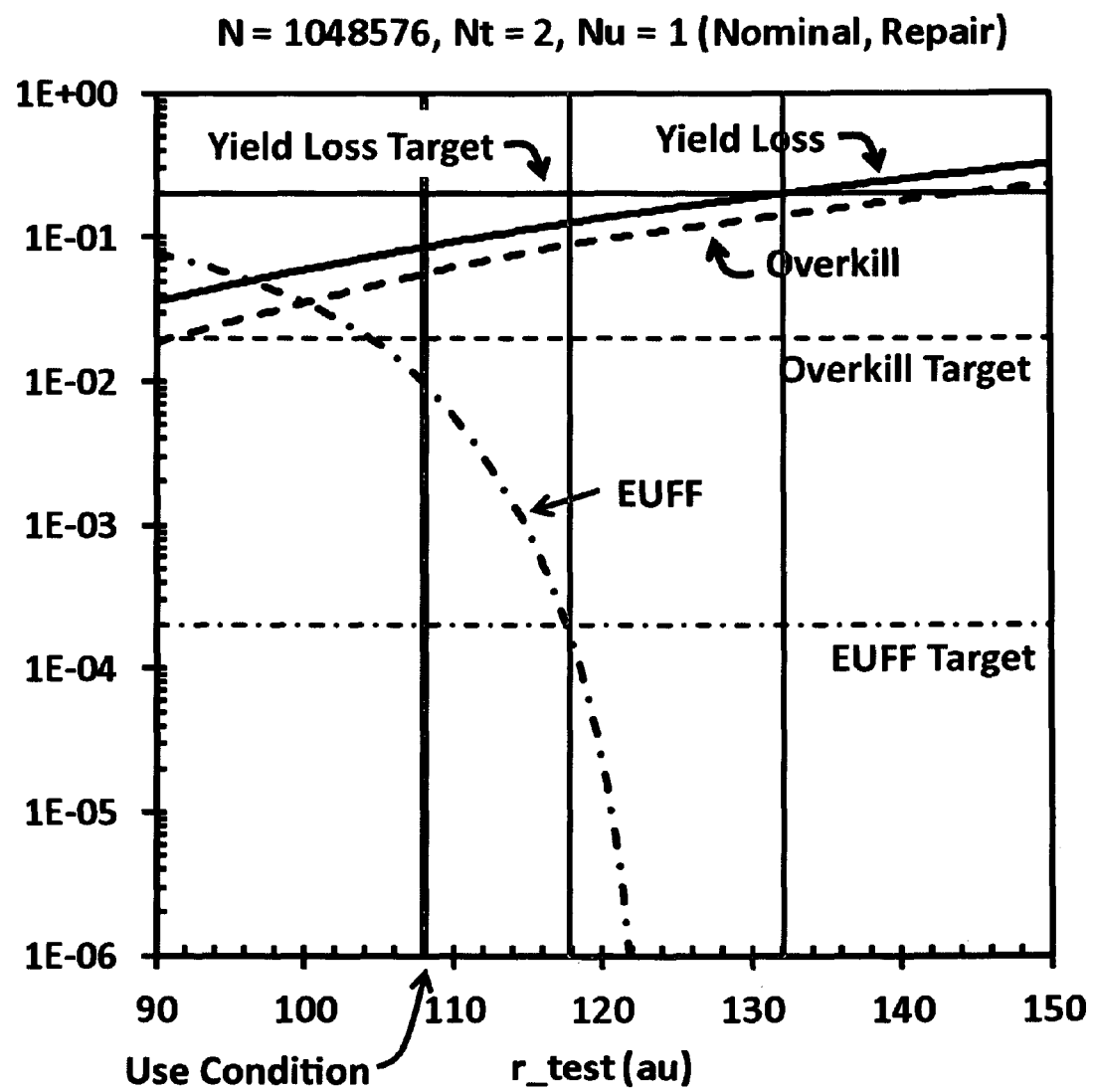
FIG. 31 is a graph showing that if Test tolerates and repairs up to two failing bits, and arrays in Use can tolerate one failing bit, compared to FIG. 30b, in which Use tolerates no failing bits, the EUFF is improved (reduced), and Overkill becomes the main component of Yield Loss, according to one embodiment of the invention.

Finally, consider the case of Repair at Test when Use can tolerate bad bits by comparing FIG. 30b and FIG. 31. The conditions in these figures are the same, including $n_t$=2, except $n_u$=0 in FIG. 30b and $n_u$=1 in FIG. 31. Increased tolerance of bad bits in Use significantly reduces EUFF in FIG. 31 compared to FIG. 30b. Tolerance of bad bits in Use also makes Overkill the dominant subset of Yield Loss in FIG. 31 because, as tolerance of failing bits in Use increases, Test will reject more arrays that would have been good in Use.

Here, it is chosen to determine the range of acceptable set points (shaded) in FIG. 31 only by Yield Loss and EUFF, which determine the cost and quality of the Test. The increased Overkill in FIG. 31 is not a "problem", but is an "opportunity" for some other test method beyond the scope of the manufacturing flow considered here. For example, yield loss rejects could be screened by a "Use-like" test to recover (some of) the arrays that are good-in use. Viability of this will be determined by the cost of the additional screening.

Figure 32A:
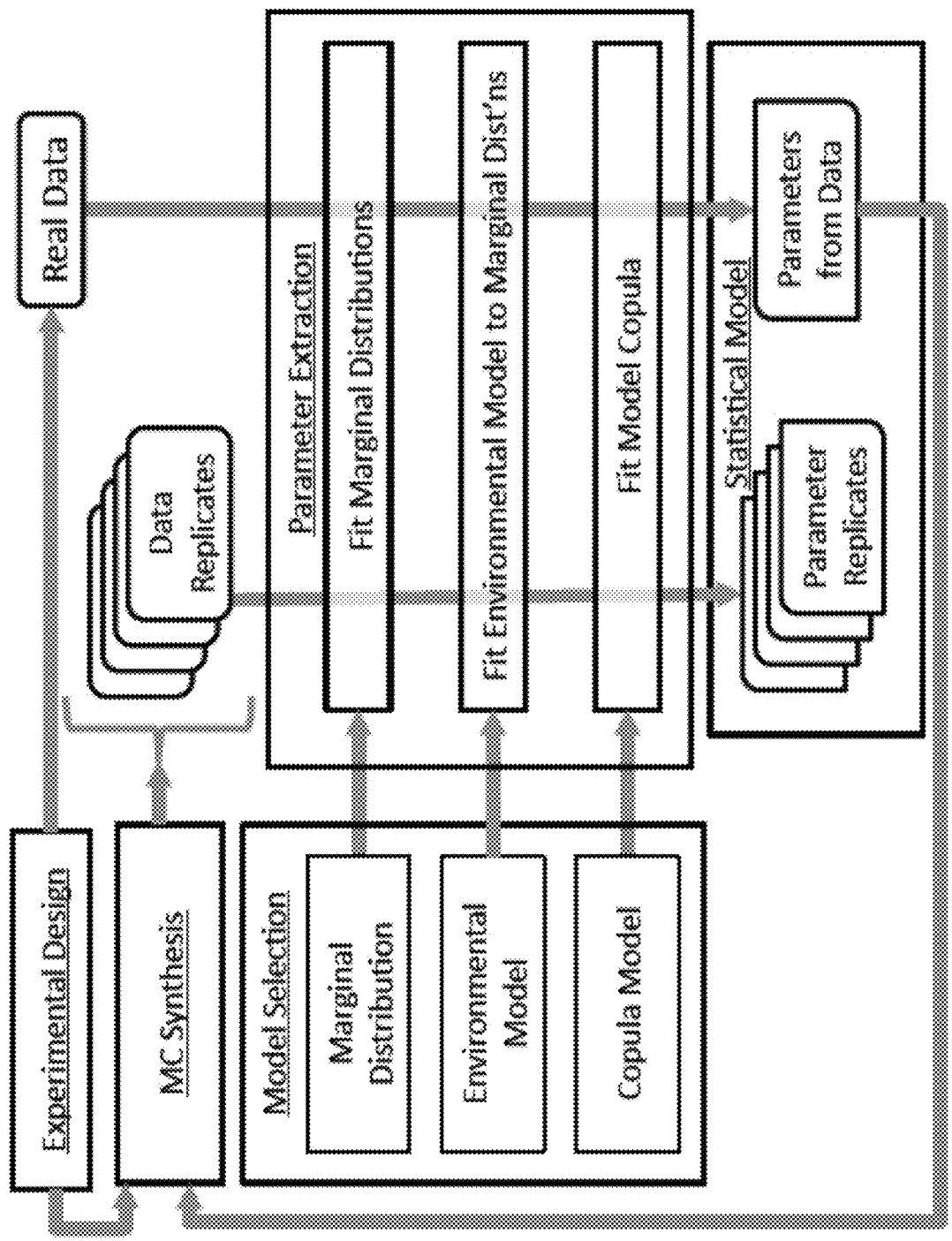
FIG. 32a shows a flow diagram of the Model Extraction part of the statistical methodology in which Monte-Carlo synthesis generates Data Replicates, according to one embodiment of the invention.
Figure 32B:
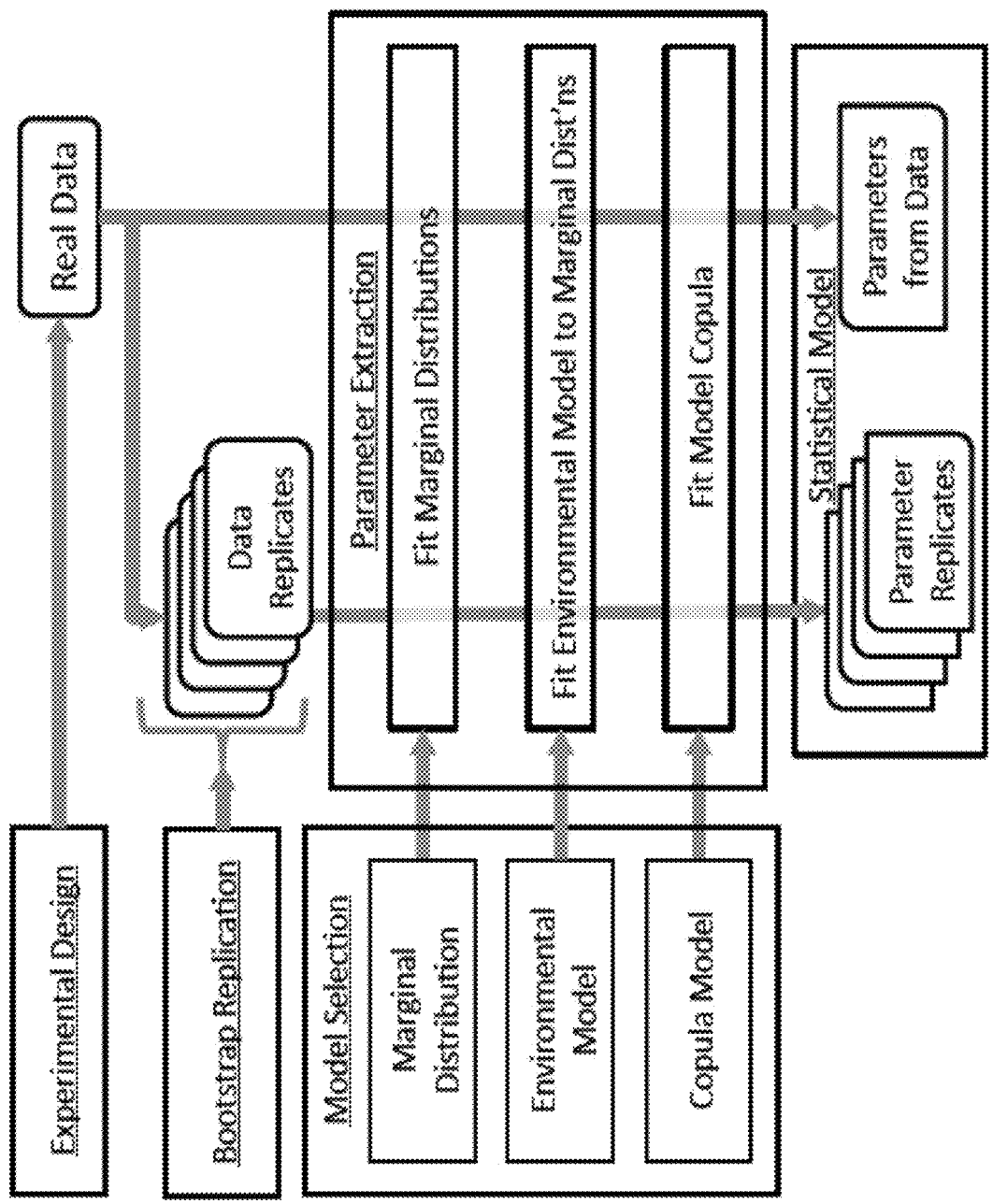
FIG. 32b shows a flow diagram of the Model Extraction part of the statistical methodology in which resampling of the data using the Bootstrap method generates Data Replicates, according to one embodiment of the invention.
Figure 33:
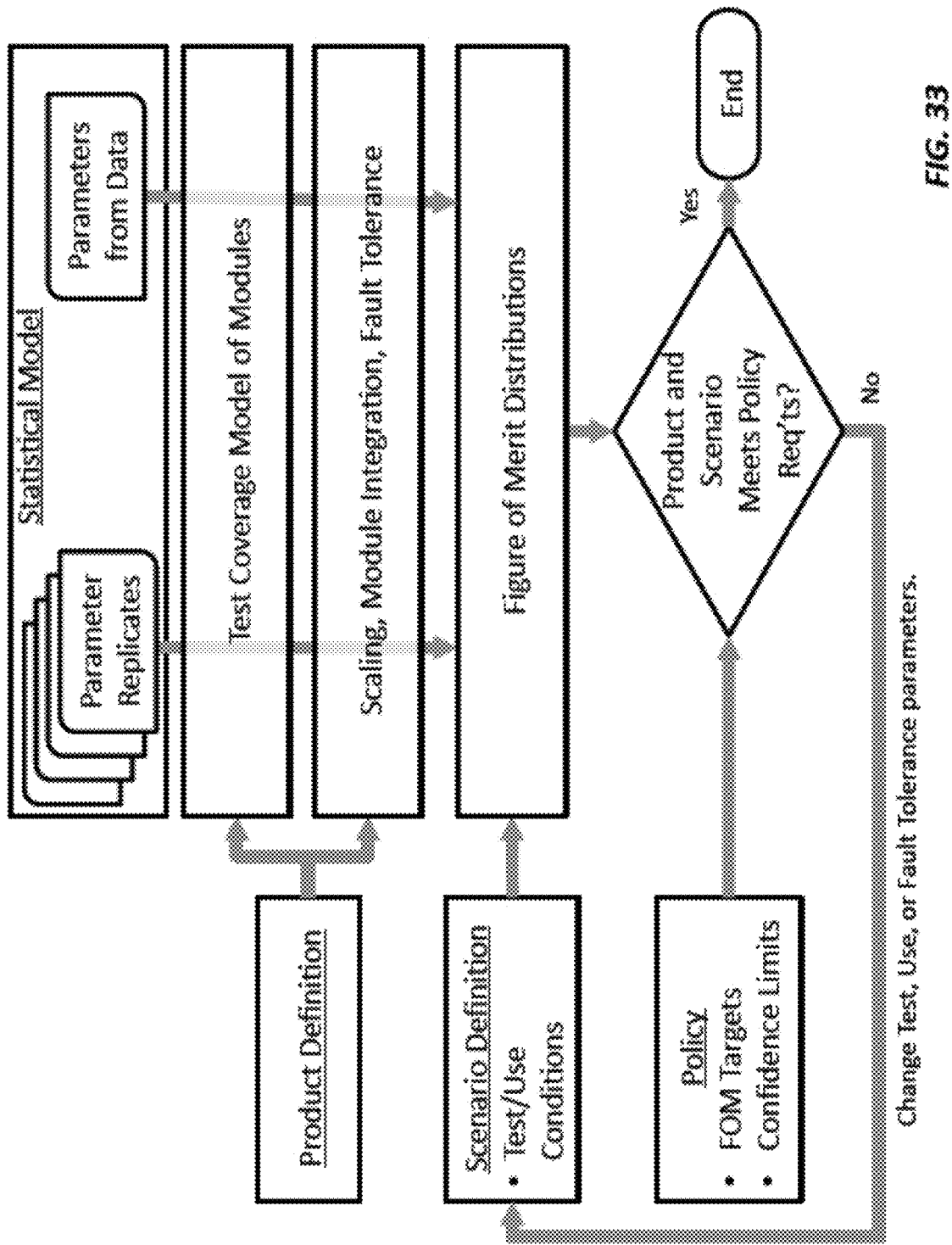
FIG. 33 shows a flow diagram of the Inference part of the statistical methodology, according to one embodiment of the invention.

Turning to a description of a two-part methodology, which integrates the techniques and methods described thus far; the first part is Model Extraction shown in FIG. 32a and FIG. 32b, and the second part is Inference shown in FIG. 33. FIGS. 32a and 32b show alternative approaches to characterizing sampling variation in the Model Extraction part of the methodology. While, at a high-level, the two-part methodology is prior art, the discussion shows how copula-based statistical models are integrated into the two-part methodology and improve key aspects of it. The purpose of the methodology is to determine the design, test manufacturing and datasheet (end use) specification of an electronic system or integrated circuit product, taking into account dependent attributes of the product. The end result of Model Extraction is a Statistical Model of the test vehicle fitted to the data. The Statistical Model is then used by the Inference part of the methodology to compute FOMs for product design, manufacturing, and datasheet specifications different from those of the test vehicle. FOMs of the product of interest are compared with targets, which reflect corporate manufacturing and quality policies to decide whether the specifications of the product of interest meet requirements.

The improvements in the methodology afforded by the copula-based statistical model have broader applicability than the DRAM example used to demonstrate them. For example, this methodology may be applied to different dependent attributes measured at Test, such as $I_{sb}$ (stand-by current) vs. $F_{max}$, (maximum operating frequency) in order to optimize test manufacturing screens based on measuring the more conveniently measured attribute ($I_{sb}$). The methodology also applies to integrated circuits, which integrate various types of elements, not just memory bits, and to electronic systems which integrate components such as integrated circuits and other modules.

Turning now to the Model Extraction aspect of the methodology shown in FIG. 32a, an Experimental Design is used to acquire test vehicle data ("Real Data"), which is then fitted to a selected model. An Experimental Design is a specification of particular conditions of the experiment such as the temperatures, voltages, retention time bins, sample sizes for each environmental condition and so on, according to one embodiment of the invention. Model Selection includes choosing the form of the marginal distributions (Weibull for the DRAM example, Eq. (1)), the environmental model (like Eq. (2) for the DRAM example), and the copula model (wedge copula for the DRAM example). Then "Real Data" is fitted to the selected statistical model that includes the selected marginal, environmental and copula models, to generate "Parameters from Data" like those in Table 4 of the DRAM example, according to one embodiment of the invention. An important benefit of the copula-based statistical model is that fitting of marginal distributions is completely decoupled from fitting of the copula, so that the marginal and copula model-fitting steps may be done in any sequence. To characterize the statistical uncertainty inherent in the Experimental Design and details of the Parameter Extraction methods (e.g. least-squares, sample tau, etc.), the copula-based model parameter set fitted to Real Data is used to synthesize multiple Data Replicates of the entire dataset acquired using the Experimental Design, as shown in FIG. 32a.

Parameters (e.g. ln $\alpha_0$, Q, a, b, c for the DRAM) are extracted from each Data Replicate to produce a Parameter Replicate. The variation across the Parameter Replicates characterizes the sampling variation of the experiment and the Parameter Extraction methods. A key enabler of the Monte-Carlo synthesis of Data Replicates to characterize statistical variation is the use of a geometrical copula. This is because adequate computational efficiency is only feasible for the highly data-censored test application if Monte-Carlo data synthesis can be confined to the region accessed by the experiment. This is possible for geometrical copulas, but generally not for Archimedian, Elliptical (Gaussian and t-copulas), Marshall-Olkin and most, if not all, other types of copula. It is also not feasible for the conventional multi-normal (non-copula) modeling approach. A key benefit of using Monte-Carlo synthesized Data Replicates is that a different Experimental Design from the one used to generate the test vehicle data ("Real Data") may be assumed in the synthesis, enabling optimization of the Experimental Design and Parameter Extraction methods for subsequent data acquisition and model-fitting. FIG. 32b shows how data resampling methods other than Monte-Carlo synthesis, for example the Bootstrap method, may also be used to derive Parameter Replicates to characterize sampling variation and Parameter Extraction methods. However, data resampling methods do not admit the possibility of varying the Experimental Design or Parameter Extraction methods as does the geometrical-copula-enabled Monte-Carlo synthesis method.

Further guidance for the Experimental Design and Model Selection elements of the Model Extraction part of the methodology of FIGS. 32a and 32b is provided next. This is important because the experimental design for test vehicle data acquisition and model extraction ultimately determine how aggressive test set points and datasheet specifications may be.

Guidance for the Experimental Design element of Model Extraction in FIGS. 32a and 32b is:
  Acquire data at a number of environmental conditions spanning the datasheet specification and test conditions of the product. Test conditions, environmental conditions and sample sizes should be chosen to produce some failures at all test conditions, and a significant number of failures (at least 100s) at the most-stressed corners.
  Acquire data using a test vehicle designed so that it is possible to measure attributes separately on modules from which the product chip will be constructed. In the DRAM example, bit-level data was acquired, so that models for hypothetical arrays of any size could be derived.
  Acquire "continue-on-fail" measured values of all attributes of interest on each measured module across the entire range of environmental and test conditions. Do not terminate measurements because the attribute values exceed some specification limit. Binned data, as in the DRAM experiment, can also be used but is less preferred.
  Sample sizes can be determined by using the copula-based statistical model with a "guessed" set of parameters often based on similar products and technologies. Larger sample sizes reduce the "guard bands" (discussed below) necessary to contain risks of sample variation in the experiment.
  Reduce data requirements for the experimental design by regarding some parameters as "known" and set them to conservative values. For example, if the underlying mechanism is regarded as known, then acceleration parameters, such as Q in the DRAM example, may be set to "literature" values. Another way to reduce the data requirements experimental design is to characterize only a small sample across the full span of environmental conditions, but characterize a much larger sample at the "center" environmental condition.

Guidance for the Model Selection element of Model Extraction in FIGS. 32a and 32b is:
  Marginal distributions should be chosen to have flexibility in scale and shape. Weibull distributions are often a good choice because the shape parameter can control the rate of increase of an attribute with stress.
  Environmental dependence of marginal model parameters, preferably just the scale parameter, is fitted to models guided by physics of expected mechanisms. For example, Arrhenius dependence of a on temperature is a good choice for thermal effects.
  Choose a copula that "looks like" the data. This can be determined by synthesizing empirical copula data and comparing it with the real empirical data. Because Test data is so heavily censored it is desirable to choose a copula that can efficiently synthesize data targeting the restricted range of the data.
  If possible, use copulas with an obvious geometrical interpretation. If necessary, construct one. Avoid uncritical application of copulas for which the behavior beyond the scope of the data may introduce artifacts. Geometrical copulas are recommended because of the ease of construction and interpretation.
  Choose a copula with parametric range that can span a range of subpopulation tau covering observed values of tau. For the DRAM example the Gaussian copula only marginally meets this requirement because the parameter, p, was pushed very close to its limit in order to fit the data.
  Minimize the number of copula model parameters. If possible, choose a copula with one parameter so that it can be determined by a measurement of Kendall's tau. If necessary to add parameters, do so by constructing linear combinations of easily interpretable fundamental (e.g. Frechet upper bound) and geometrical copulas.
  Tail dependence of the copula should align with expected intrinsic and defect behavior. For example, the Gaussian copula by itself (not in linear combination with M) has LT=0, and so is not a good candidate for the DRAM data.
  If possible, choose a copula for which the copula parameter(s) do not vary with environmental condition, or censoring. If an environmentally independent copula model can be found, as in the case of the DRAM example, then set points and datasheet specifications with given values of $r_{test}/\alpha_{test}$ and $r_{use}/\alpha_{use}$, respectively, give the same FOMs. This "set point equivalency" provides flexibility in integrating tests into a larger suite of tests and in setting datasheet requirements. For the DRAM example, the diagonal stripe copula violated this guideline because the best fit of the parameter d, depends on the environmental condition, but the wedge copula and the Gaussian copula met (less so) this guideline.
  Choose a copula for which a censored subpopulation corresponding to the data can be synthesized with complete efficiency. Geometrical copulas satisfy this requirement.

Turning to the Inference aspect of the methodology shown in FIG. 33, when the Model Extraction aspect of the methodology shown in FIGS. 32a and 32b is complete, the parameter sets extracted from the test vehicle data ("Parameters from Data") and Parameter Replicates derived by resampling or by Monte-Carlo synthesis may be used to do "what-if" studies to optimize the design, test manufacturing and datasheet (end use) specification of an integrated circuit product different from the test-vehicle.

Regarding Product Definition in the Inference aspect of the methodology shown in FIG. 33, the model fitted to the test vehicle module-level data (bit-level for the DRAM example) must be scaled to the full size of the product, and fault tolerance features and the test coverage model of the product must be specified. These aspects are set early in the product lifecycle when the product design is fixed.

Regarding Scenario Definition in the Inference aspect of the methodology of FIG. 33, a scenario defines Test and Use (datasheet) conditions (supply voltages, temperatures, refresh times, etc.) for the product. These aspects can be adjusted late in the product lifecycle when datasheets for the product and its variants are published to customers. Test conditions can be set at any time, and are frequently adjusted during manufacturing (that is, very late) to optimize manufacturing figures of merit.

Regarding Policy in the Inference aspect of the methodology of FIG. 33, figure of merit targets are set at the highest levels of corporate policy. Targets for producer-oriented manufacturing FOMs such as yield loss and overkill are determined by financial and marketing cost models as shown earlier in the description of the invention. Targets for customer-oriented quality FOMs such as end-use-fail-fraction (EUFF) and reliability indicators are determined by competitive and marketing considerations. Confidence limits are driven by the costs of the experimental design and data acquisition required to build more precise test vehicle models, versus the manufacturing costs due to yield loss and overkill associated with the Test and datasheet guard bands required for less precise test vehicle models.

Regarding the Confidence Limits aspect of Policy shown in FIG. 33, Test and Use settings must be "guard-banded" to control risks due to the statistical variation of the experimental design and parameter extraction methods used in the Model Extraction aspect (FIGS. 32a and 32b) of the methodology. This variation is characterized by the Parameter Replicates from synthesized or resampled data shown in FIGS. 32a and 32b.

Figure 34:
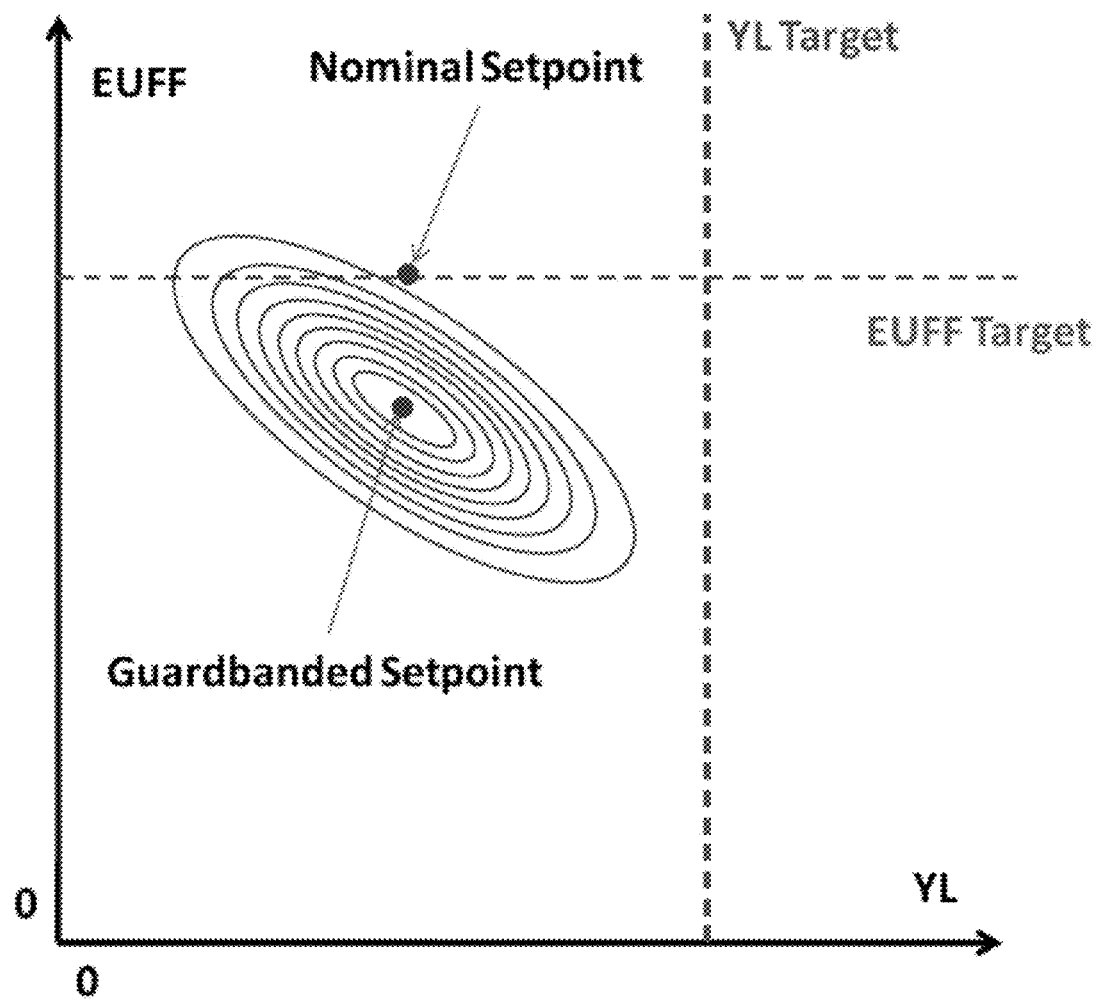
FIG. 34 shows a schematic graph of the method for setting guard bands to account for sampling variation due to the Experimental Design and Parameter Extraction parts of the Model Extraction method, according to one embodiment of the invention.

The following is an example showing how Test and Use set points are guard-banded according to one embodiment. In FIG. 28 the optimum set point would appear to be at the left edge of the shaded zone of acceptable set points, because the yield loss and overkill is minimized there while EUFF just meets the target. This set point, computed using "Parameters from Data" directly extracted from test vehicle data ("Real Data") in FIG. 32a or 32b, is called the "nominal" set point. It is apparent from FIG. 28 that the EUFF is rapidly varying at the nominal set point, so a small variation in underlying model parameters could lead to unacceptably large EUFF. This risk can be contained by using the Parameter Replicates extracted from synthesized or resampled test vehicle data to calculate an envelope of Figure of Merit Distributions around the FOM corresponding to the nominal set point, as shown in FIG. 33. This envelope is then used to shift the nominal set point so that the FOMs at this "guard-banded" set point give a probability overlap of the targets meeting policy-determined confidence limits. FIG. 34 is a schematic drawing showing this method, according to one embodiment. Overkill is not shown, for simplicity. The semi-analytic deterministic calculation of FOMs from model parameters and Product Definition and Scenario Definition made possible by the copula-based model of the product and test manufacturing process makes this method feasible because the calculation of FOMs for each Parameter Replicate is nearly instantaneous. Previously, for each Parameter Replicate, a Monte-Carlo (MC) synthesis of individual units of product passing through Test and Use was done and counts of various categories of Pass/Fail in Test/Use were accumulated to estimate FOMs. Monte-Carlo-estimation of FOMs for each of the Parameter Replicates is computationally extremely cumbersome, if not unfeasible because of the large MC sample sizes required to estimate FOMs to sufficient precision. It must be emphasized that the guard bands computed from synthesized or resampled Data Replicates account only for statistical sampling error in the experimental design and model-fitting methods. They do not account for errors in the selection of models.

Regarding estimation of model-selection sensitivities, the semi-analytic, deterministic, and modular nature of the copula-based statistical model facilitates the estimation since different model components may be changed without disturbing other parts of the model, and calculation of FOMs is deterministic and so is virtually instantaneous. The ability of the Excel tool for the DRAM example to try different copula models and test coverage models and instantaneously compute FOMs is an embodiment of this feature of the invention.

Turning to derivations of important mathematical results used in the preceding description of the invention, the first topic is Monte-Carlo synthesis from geometrical copulas. The strategy is to sample from the regions of uniform probability density in the pseudo-copula A used to start the construction of the copula, and map them to the copula using inverses of the marginal cdfs of the pseudo-copula. A key aspect of the invention is that data can be synthesized from a subspace of a geometrical copula with perfect efficiency, that is, without rejecting any sampled points. This is useful for integrated circuit test manufacturing applications since only the points near the origin of the copula are of interest, so needless sampling over the entire space of the copula can be avoided. This is shown next for regions near the origin of the stripe and wedge copulas, which are two embodiments of the invention. The same can be done for any region of any geometrical copula constructed by the same method.

The efficient method of Monte-Carlo sampling for a geometrical copula is based on the fact that any parallelogram containing an area of uniform probability density can be filled with uniformly distributed random points by weighting two basis vectors which span the parallelogram each with a random number sampled independently from the uniform distribution on [0, 1]. Every sampled point will lie within the parallelogram. Triangular areas of uniform probability density may similarly be covered with a uniform density of random points by considering a parallelogram constructed from the triangle and its reflection, and reflecting any sampled point falling in the "wrong" half of the parallelogram into the triangle of interest.

Figure 35A:
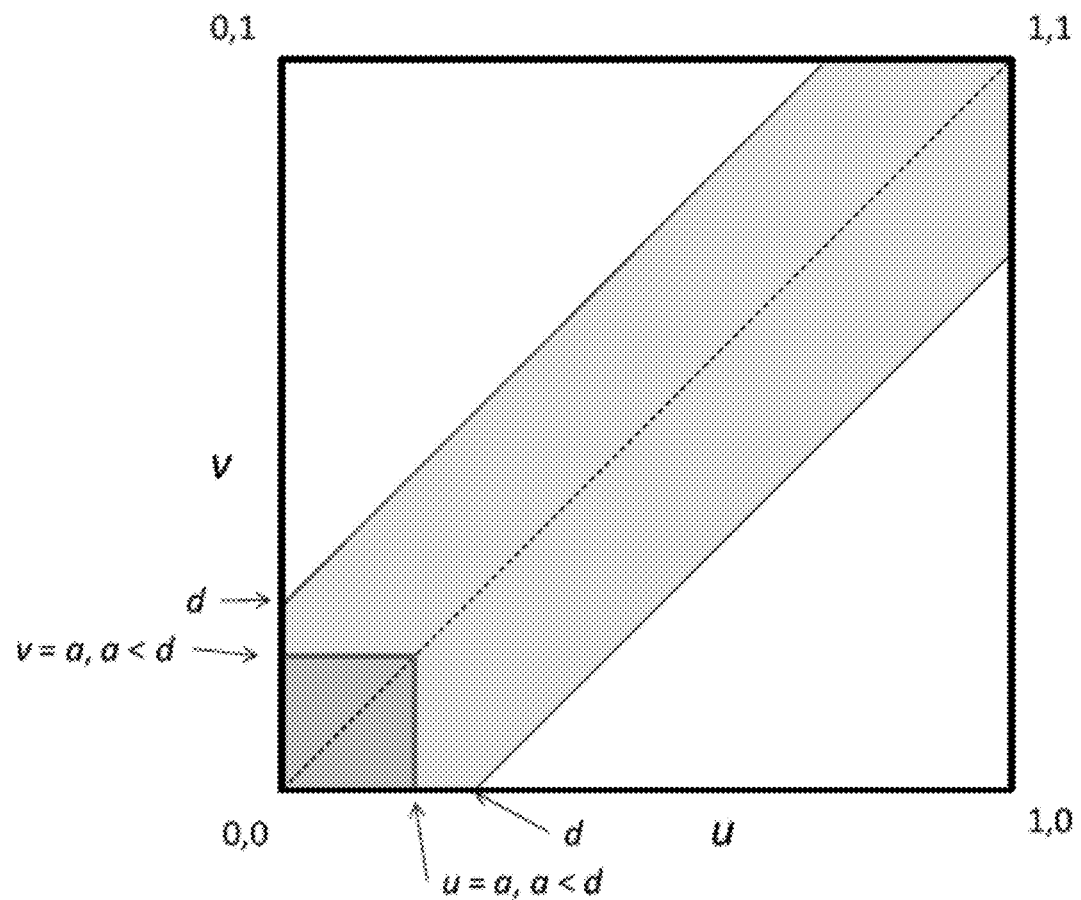
FIGS. 35a-35b show geometrical constructions on the stripe pseudo-copula to derive a Monte-Carlo sampling algorithm for a censored sub-population of the stripe copula, according to one embodiment of the invention.
Figure 35B:
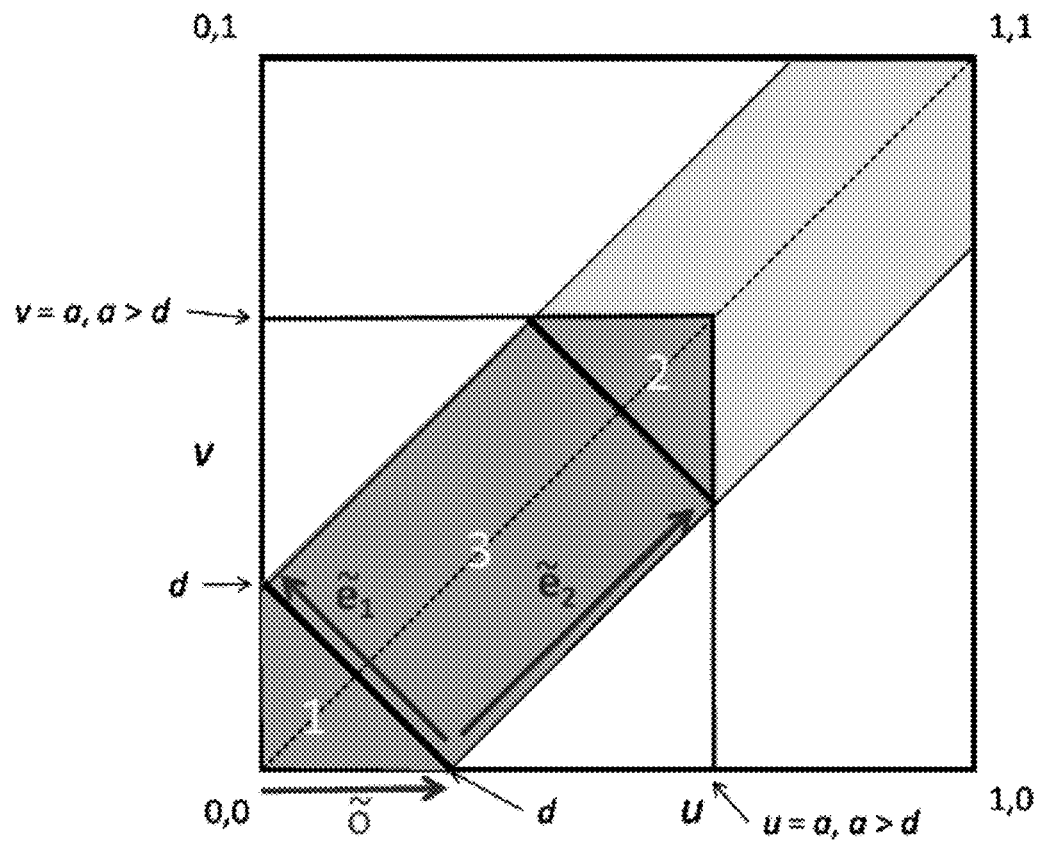

It will be recalled that construction of the stripe copula begins with a pseudo-copula, shown in FIG. 13, in which a diagonal stripe of uniform probability density is drawn across the diagonal. Derivation of the sampling algorithm begins by decomposing the uniform stripe of the stripe pseudo-copula bounded by a region $[0, a]^2$ into triangles and rectangles which must be covered by a random density of points. Two cases may be identified. In FIG. 35a, Case A, merely requires that a small square be filled with uniform random points. In FIG. 35b, Case B, divides the region to be filled into two halves of a square, regions 1 and 2, separated by a rectangle, 3. The procedure for Case B is as follows: A uniformly distributed random number, $u_1$, is generated to decide whether to place the point in 3, or in the divided square, 1 and 2. This decision is based on the area ratio of rectangle 3 versus the divided square, 1 and 2. If the point goes into 3, two uniformly distributed random numbers $u_2$ and $u_3$ are used to place a point in 3. This is done using the basis vectors, which span 3. On the other hand, if the point is to be placed in the divided square, 1 and 2, the point is placed in a d×d square, but if $u_2+u_3$ exceeds unity the point is displaced by (a, a) so that it falls into the triangle 2.

So, the detailed algorithm to generate samples from the region $[0,a]^2$ of the stripe pseudo-copula, and therefore region $[0,f^{-1}(a)]^2$ of the stripe copula, where $f^{-1}$ is given by Eqs. (31) and (32), is Case A. $0 \le a \le d$. Generate two random numbers from the uniform distribution on [0, 1], $u_1$, $u_2$ and place a point at $$u=au_1, v=au_2 \qquad (108)$$

Case B. $d \le a \le 1$.

Generate three random numbers from the uniform distribution on [0, 1], $u_1$, $u_2$ and $u_3$.

If $0 \le u_1 \le d/(2a-d)$ and if $u_2+u_3<1$ place a point at (FIG. 35b, region 1)

$$u=du_2, v=du_3 \qquad (109)$$

If $0 \le u_1 \le d/(2a-d)$ and if $u_2+u_3 \ge 1$ place a point at (FIG. 35b, region 2)

$$u=a+d(u_2-1), v=a+d(u_3-1) \qquad (110)$$

If $d/(2a-d) \le u_1 \le 1$ then place a point at (FIG. 35b, region 3)

$$u=d(1-u_2)+(a-d)u_3 \qquad$$

$$v=du_2+(a-d)u_3 \qquad (111)$$

The generated point of the stripe pseudo-copula is mapped to the stripe copula by $$x=f^{-1}(u) \; y=f^{-1}(v) \qquad (112)$$

where $f^{-1}$ is given by. Eqs. (31) and (32).

Use has been made of the fact that the sum of areas 1 and 2 in the FIG. 35b is a fraction $d/(2a-d)$ of the sum of areas 1, 2, and 3 in the figure. To derive Eq. (111) note that $e_1$ and $e_2$ span region 3 in case B, and the point [d, 0] is õ, $$\tilde{e}_1=(-\hat{i}+\hat{j})d$$

$$\tilde{e}_2=(\hat{i}+\hat{j})(a-d)$$

$$\tilde{o}=\hat{i}d \qquad (113)$$

where $\hat{i}$ and $\hat{j}$ are orthogonal unit vectors spanning $[0, 1]^2$. So for region 3, a point is placed at $$\vec{r}=\tilde{o}+\tilde{e}_1 u_2+\tilde{e}_2 u_3=(d-du_2+(a-d)u_3)\hat{i}+(u_2 d+(a-d)u_3)\hat{j} \qquad (114)$$

from which Eq. (111) follows.

Figure 36:
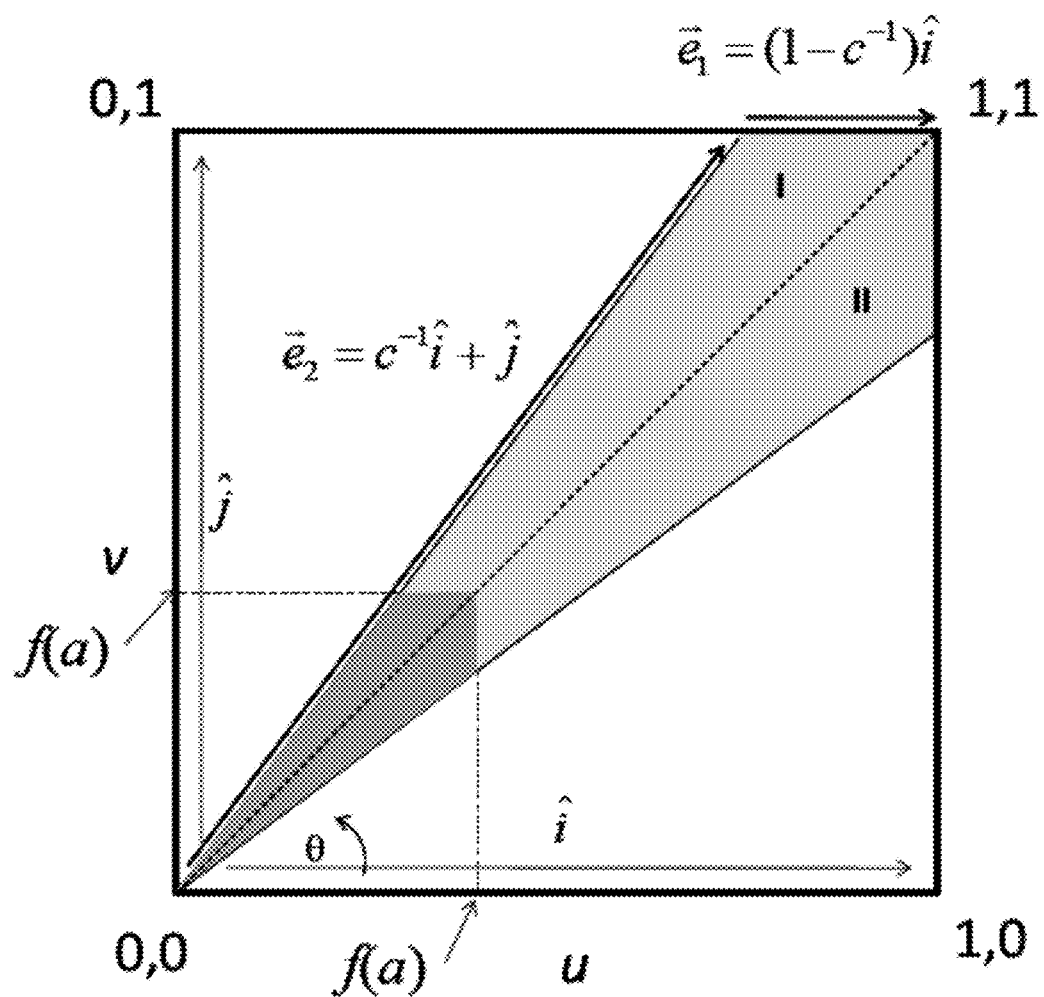
FIG. 36 shows basis vectors for sampling the area of uniform probability in the wedge pseudo-copula, $A(u, v)$, according to one embodiment of the invention.

Derivation of the sampling algorithm for the wedge copula starts from the wedge pseudo-copula shown in FIG. 15, also shown with additional notations in FIG. 36. Consider first the problem of filling the regions I and II in FIG. 36 with uniformly distributed random points. To place a random point in triangle I in FIG. 36 in (u, v) space, sample $u_1$ and $u_2$ independently from the uniform distribution on [0, 1], rejecting the sample if $u_1>u_2$.

$$\vec{r} = u_1 \vec{e}_1 + u_2 \vec{e}_2 \qquad (115)$$

$$= [u_1 + (u_2 - u_1)/c]\hat{i} + u_2 \hat{j}.$$

In Eq. (115) $\bar{e}_1$ and $\bar{e}_2$ are basis vectors spanning triangle I as shown in FIG. 36. Decomposition into the orthogonal unit vectors spanning the unit square in FIG. 36 gives the second equation. By symmetry, to place a random point in triangle II in FIG. 36, reject the sample if $u_2>u_1$, and place the point at $$\vec{r}=u_1\hat{i}+[u_2+(u_1-u_2)/c]\hat{j} \qquad (116)$$

This may be generalized to sample the subpopulation of the wedge copula $[0, a]^2$ which corresponds to the sub area $[0, f(a)]^2$ of the pseudo-copula shown in FIG. 36. To do this, the uniform random variables $u_1$ and $u_2$ described in the preceding discussion should be independently sampled from [0, f(a)], rather than $[0, 1]^2$.

So the algorithm to sample a region $[0, a]^2$ of the wedge copula is:

1. Sample two independent uniform numbers, $u_1$ and $u_2$ from a uniform distribution on [0, f(a)] (a=1 samples the entire copula).
2. If $u_2 \le u_1$ then place a point at $$x = f^{-1}\left(u_1 + \frac{u_2 - u_1}{c}\right) \qquad (117)$$

$$y = f^{-1}(u_2)$$

3. Else if $u_2<u_1$ then place a point at $$x = f^{-1}(u_1) \qquad (118)$$

$$y = f^{-1}\left(u_2 + \frac{u_1 - u_2}{c}\right)$$

where $f^{-1}$ is given by Eq. (43).

Regarding the subpopulation tau, an expression was given in Eq. (25) for tau of a subpopulation of a copula in the region $J^2=[0, u_a] \times [0, v_b]$. This is needed so that the parameter of a single-parameter copula can be obtained from the value of tau calculated from censored data. To derive Eq. (25), a formula for the copula of the subpopulation is substituted into the formula for tau, Eq. (23). The probability density function for the region $J^2$ is $$D'(u, v) = \frac{C(u, v)}{C(u_a, v_b)} \qquad (119)$$

This may be converted into a copula by using the marginal distribution functions $$u' = \frac{C(u, v_b)}{C(u_a, v_b)} = f(u) \qquad (120)$$

and similarly, $v'=C(u_a, v)/C(u_a, v_b)=g(v)$. Notice that these are not uniform, $f(u) \approx u$, and $g(v) \approx v$, because $u_a \approx 1$ and $v_b \approx 1$. The copula for the region $J^2$, in terms of the transformed variables, is $$D(u', v') = \frac{C(u, v)}{C(u_a, v_b)} = \frac{C(f^{-1}(u'), g^{-1}(v'))}{C(u_a, v_b)} [u', v'] \in [0, 1]^2 \qquad (121)$$

So, using Eq. (23), the subpopulation tau is $$\tau_{Subpopulation} = 4\int_0^1\int_0^1 D(u',v')\frac{\partial D(u',v')}{\partial u'\partial v'}du'dv' - 1 \qquad (122)$$

$$= 4\int_0^1\int_0^1 D(u',v')\frac{\partial D(u',v')}{\partial u\partial v}\frac{\partial u}{\partial u'}\frac{\partial v}{\partial v'}du'dv' - 1$$

$$= 4\int_0^{u_a}\int_0^{v_b} D(u',v')\frac{\partial D(u',v')}{\partial u\partial v}dudv - 1$$

$$= \frac{4}{C^2(u_a,v_b)}\int_0^{u_a}\int_0^{v_b} C(u,v)\frac{\partial C(u,v)}{\partial u\partial v}dudv - 1$$

which is the desired expression, Eq. (25).

Since geometrical copulas for which the subpopulation tau given by Eq. (122) is independent of the degree of censoring are particularly useful, it is convenient to have a sufficient condition for censor-independence of subpopulation tau by which copulas with this property may be identified. Suppose that a copula is expressed as $$C(x,y)=A[f(x),f(y)] \qquad (123)$$

where A is a pseudo-copula satisfying, for $a \leq 1$, $$A(a \times u, a \times v) = a^2 A(u,v) \qquad (124)$$

The subpopulation tau of C is $$\tau_{Subpopulation} = \frac{4}{C^2(\alpha,\alpha)}\int_0^\alpha du\int_0^\alpha dv C(u,v)\frac{\partial C(u,v)}{\partial u\partial v} - 1 \qquad (125)$$

$$= \frac{4}{A^2[f(\alpha),f(\alpha)]}\int_0^\alpha du\int_0^\alpha dv A[f(u),f(v)]$$

$$\frac{\partial A[f(u),f(v)]}{\partial u\partial v} - 1$$

$$= \frac{4}{f^4(\alpha)A(1,1)}\int_0^{f(\alpha)}dx\int_0^{f(\alpha)}dy\frac{\partial u\partial v}{\partial x\partial y}$$

$$A(x,y)\frac{\partial A(x,y)}{\partial u\partial v} - 1$$

$$= \frac{4}{f^4(\alpha)}\int_0^{f(\alpha)}dx\int_0^{f(\alpha)}dyA(x,y)\frac{\partial A(x,y)}{\partial x\partial y} - 1$$

Now set $x=f(a)\times x'$ and $x=f(a)\times y'$, so $$\tau_{Subpopulation} = \frac{4}{f^4(\alpha)}\int_0^1 f(\alpha)dx'\int_0^1 f(\alpha)dy' A[(f(\alpha)x',f(\alpha)y')] \qquad (126)$$

$$\frac{\partial A[f(\alpha)x',f(\alpha)y']}{\partial x'\partial y'}\frac{1}{f^2(\alpha)} - 1$$

$$= \frac{4}{f^4(\alpha)}\int_0^1 f(\alpha)dx'\int_0^1 f(\alpha)dy' f^2(\alpha)A(x',y')$$

$$\frac{f^2(\alpha)\partial A(x',y')}{\partial x'\partial y'}\frac{1}{f^2(\alpha)} - 1$$

$$= 4\int_0^1 dx'\int_0^1 dy' A(x',y')\frac{\partial A(x',y')}{\partial x'\partial y'} - 1$$

which is independent of the degree of censoring, QED. Moreover, the subpopulation tau for any degree of censoring is the same as the population tau.

In the particular case of the wedge copula, an expression for Kendall's tau for the entire population's copula may be computed analytically, as will be shown. Moreover, because the wedge copula satisfies the condition of censor-independence of the sub-population tau, this expression is also true for a subpopulation like $J^2$. For the wedge copula, $$\tau(c) = 4\int_0^1 dx\int_0^1 dy We(x,y;c)\frac{\partial^2 We(x,y;c)}{\partial x\partial y} - 1 = 4I - 1 \qquad (127)$$

Since $$We(x,y)=A(u,v)$$

$$u=f(x), v=f(y) \qquad (128)$$

Figure 37:
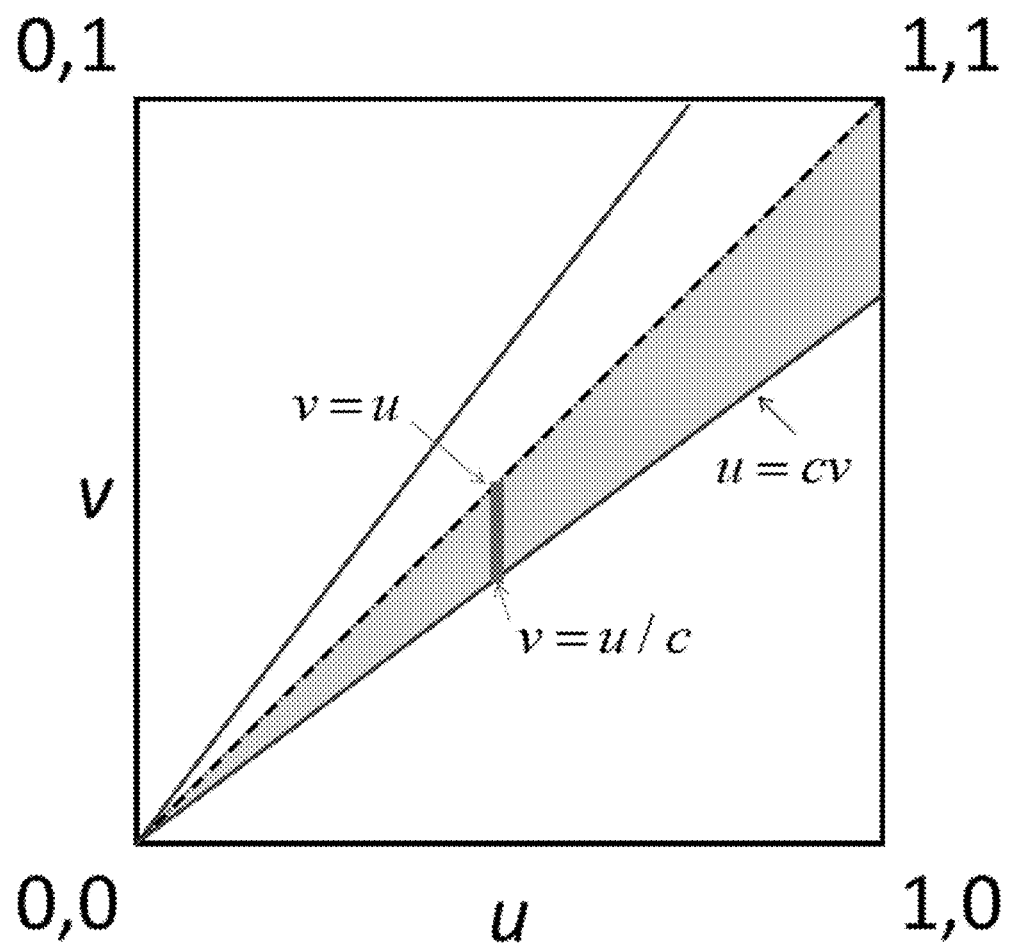
FIG. 37 shows the integration limits for an integral used to derive an expression for the subpopulation Kendall's tau of the wedge geometrical copula, according to one embodiment of the invention.

Eq. (127) becomes $$I = \int_0^1 dx\int_0^1 dy We(x,y)\frac{\partial^2 We(x,y)}{\partial x\partial y} \qquad (129)$$

$$= \int_0^1 du\frac{dx}{du}\int_0^1 dv\frac{dy}{dv}A(u,v)\frac{\partial^2 A(u,v)}{\partial u\partial v}\frac{du}{dx}\frac{dv}{dy}$$

$$= \int_0^1 du\int_0^1 dv A(u,v)\frac{\partial^2 A(u,v)}{\partial u\partial v},$$

so the evaluation of tau can be done entirely in terms of the pseudo copula A. Evaluation of the integral is facilitated by observing; 1) The second mixed derivative of A(u, v) is the pdf of A, which is a constant equal to c/(c−1) inside the wedge and zero elsewhere. 2) By symmetry across the diagonal, the desired integral is twice the integral of the lightly shaded zone in FIG. 37. 3) Since A(u, v) vanishes outside the wedge, the v-integration limits may be changed so that for each u, v ranges from u/c to u as shown by the small dark stripe in FIG. 37. Using these observations, $$I = 2\int_0^1 du\int_{u/c}^u dv A(u,v)\frac{c}{c-1}. \qquad (130)$$

Inside the wedge, where the argument of Eq. (130) is evaluated, using Eq. (41), the pseudo-copula may be written $$A(u,v) = \frac{c}{c-1}\left(uv - \frac{u^2}{2c} - \frac{v^2}{2c}\right). \qquad (131)$$

So, Eq. (130) becomes $$I = 2\int_0^1 du\int_{u/c}^u dv\left(\frac{c}{c-1}\right)^2\left(uv - \frac{1}{2c}(u^2+v^2)\right) = \qquad (132)$$

$$2\left(\frac{c}{c-1}\right)^2(I_a + I_b + I_c) \text{ where}$$

$$I_a = \int_0^1 du\int_{u/c}^u dv uv = \qquad (133)$$

$$\int_0^1 duu \times \frac{1}{2}v^2\Big|_{u/c}^u = \frac{1}{2}\left(1-\frac{1}{c^2}\right)\int_0^1 duu^3 = \frac{1}{8}\left(1-\frac{1}{c^2}\right)$$

-continued $$I_b = -\frac{1}{2c}\int_0^1 du \int_{u/c}^c dv u^2 = \qquad(134)$$
$$-\frac{1}{2c}\int_0^1 u^2 du \times v\Big|_{u/c}^u = -\frac{1}{2c}\left(1-\frac{1}{c}\right)\int_0^1 u^3 du = -\frac{1}{8c}\left(1-\frac{1}{c}\right)$$

$$I_c = -\frac{1}{2c}\int_0^1 du \int_{u/c}^u dv v^2 = -\frac{1}{2c}\int_0^1 du\left(\frac{1}{3}v^3\Big|_{u/c}^u\right) = \qquad(135)$$
$$-\frac{1}{6c}\left(1-\frac{1}{c^3}\right)\int_0^1 duu^3 = -\frac{1}{24c}\left(1-\frac{1}{c^3}\right)$$

Summing these, $$I_a + I_b + I_c = \frac{1}{8}\left(1-\frac{1}{c^2}\right) - \frac{1}{8c}\left(1-\frac{1}{c}\right) - \frac{1}{24c}\left(1-\frac{1}{c^3}\right) \qquad(136)$$
$$= \frac{1}{8c^4}\left(c^4 - c^2 - c^3 + c^2 - \frac{1}{3}c^3 + \frac{1}{3}\right)$$
$$= \frac{1}{24c^4}(3c^4 - 4c^3 + 1)$$
$$= \frac{(c-1)^2(3c^2 + 2c + 1)}{24c^4}$$

and using Eq. (132)

$$I = \frac{3c^2 + 2c + 1}{12c^2} \qquad(137)$$

Substitution of Eqs. (137) into Eq. (127) gives the convenient formula $$\tau_{Subpopulation} = \frac{2c+1}{3c^2}. \qquad(138)$$

which, when inverted, may be used to infer a value of c from a value of tau derived from a subpopulation.

Turning now to functions arising in fault-tolerant figures of merit, the functions R and K appearing in Eq. (89), Eq. (92), and Eq. (94), respectively, arise when terms like Eq. (86) are summed over sets of integers defined for probability functions arising in the No Repair at Test case.

The function R arises for the Passes Test or Good in Use probability functions of the No Repair at Test case. In either case a set of integers is defined as follows:

$$R=\{n_1,n_2,n_3:(2\le n_1+n_2\le n) \wedge (0\le n_3\le\infty) \wedge (n_1,n_2,n_3\in \mathbb{N}^0)\} \qquad(139)$$

The integers $n_i$ and $n_2$ in this set can be generated by $$n_1=k-l, n_2=l, \text{ where } 0\le l\le k, 0\le k\le n \qquad(140)$$

so the sum of terms such as Eq. (86) is $$\sum_R \frac{\lambda_1^{n_1}e^{-\lambda_1}}{n_1!}\frac{\lambda_2^{n_2}e^{-\lambda_2}}{n_2!}\frac{\lambda_3^{n_3}e^{-\lambda_3}}{n_3!} = \sum_{\substack{k=0,n \\ l=0,k}} \frac{\lambda_1^{k-l}e^{-\lambda_1}}{(k-l)!}\frac{\lambda_2^l e^{-\lambda_2}}{l!} \qquad(141)$$
$$\left(\sum_{n_3=0,\infty}\frac{\lambda_3^{n_3}e^{-\lambda_3}}{n_3!}=1\right)$$
$$= \exp[-(\lambda_1+\lambda_2)]\sum_{k=0,T}\frac{1}{k!}$$
$$\left(\sum_{l=0,k}\frac{k!}{(k-l)!l!}\lambda_1^{k-l}\lambda_2^l\right)$$
$$= \exp[-(\lambda_1+\lambda_2)]\sum_{k=0,n}\frac{(\lambda_1+\lambda_2)^k}{k!}$$
$$= R(\lambda_1+\lambda_2, n)$$

where $$R(x,n) \equiv \begin{cases} e^{-x}\sum_{k=0,n}\frac{x^k}{k!} & n\ge 0 \\ 0 & n<0 \end{cases} \qquad(142)$$

The function R vanishes when n is a negative integer since R is null in this case. Notice that $$R(x,0)=e^{-x}$$

$$R(x,\infty)=1 \qquad(143)$$

R is related to the cumulative Erlang and Gamma distributions and so is available in function libraries such as Excel, for example: R(x, n)=1−GAMMADIST(x, n+1, TRUE) (n≥0).

The function K in Eq. (94) arises for the Passes Test and Good in Use probability function of the No Repair at Test case. K is defined by the set of integers $$K=\{n_1,n_2,n_3:(0\le n_1+n_2\le m) \wedge (0\le n_1+n_3\le n) \wedge (n_1,n_2,n_3\in \mathbb{N}^0)\} \qquad(144)$$

This set of integers is generated by $$n_1=0,\min[m,n]$$
$$n_2=0,m-n_1$$
$$n_3=0,n-n_1 \qquad(145)$$

so $$K(\lambda_1,\lambda_2,m,\lambda_3,n) \equiv \sum_K \frac{\lambda_1^{n_1}e^{-\lambda_1}}{n_1!}\frac{\lambda_2^{n_2}e^{-\lambda_2}}{n_2!}\frac{\lambda_3^{n_3}e^{-\lambda_3}}{n_3!} \qquad(146)$$
$$= \sum_{n_1=0,\min[m,n]}\frac{\lambda_1^{n_1}e^{-\lambda_1}}{n_1!}\sum_{n_2=0,m-n_1}\frac{\lambda_2^{n_2}e^{-\lambda_2}}{n_2!}$$
$$\sum_{n_3=n-n_1}\frac{\lambda_3^{n_3}e^{-\lambda_3}}{n_3!}$$
$$= \sum_{i=0,\min[m,n]}\frac{\lambda_1^i e^{-\lambda_1}}{i!}R(\lambda_2, m-i)R(\lambda_3, n-i)$$

Notice that $$K(\lambda_1,\lambda_2,m,\lambda_3,n)=K(\lambda_1,\lambda_3,n,\lambda_2,m)$$

$$K(\lambda_1,\lambda_2,0,\lambda_3,n)=e^{-(\lambda_1+\lambda_2)}R(\lambda_3,n)$$

$$K(\lambda_1,\lambda_2,m,\lambda_3,0)=e^{-(\lambda_1+\lambda_3)}R(\lambda_2,m)$$

$$K(\lambda_1,\lambda_2,0,\lambda_3,0)=e^{-(\lambda_1+\lambda_2+\lambda_3)}$$

$$K(\lambda_1,\lambda_2,\infty,\lambda_3,n)=e^{-\lambda_2}R(\lambda_3,n)$$

$$K(\lambda_1,\lambda_2,m,\lambda_3,\infty)=e^{-\lambda_2}R(\lambda_2,m)$$

$$K(\lambda_1,\lambda_2,\infty,\lambda_3,\infty)=1$$

$$K(\lambda_1,\lambda_2,n,\lambda_3,m)=0 \ n<0 \text{ or } m<0 \qquad (147)$$

The function K is easy to evaluate by computing the sum over products of R in the last equation of Eq. (146) since m and n are small integers.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example:

The same system and method illustrated by application to the design and manufacture of integrated circuits made of subcircuits may be applied to the design and manufacture of electronic systems made of components.

Models using non-exchangeable copulas of more than two dimensions are covered by the methods of this invention.

Geometrical copulas of more than two dimensions may be constructed using the same principles as the two-dimensional geometrical copulas of the exemplary embodiments.

Dependency among attributes of different types, with different marginal distributions and with different marginal environmental dependence can be modeled using the methods of this invention. This includes, for example, correlations among $I_{sb}$, $F_{max}$, and product lifetime.

Modeled attributes of test vehicle and product may be in the same Test or Use step or different Test or Use steps. For example, a dependency of $I_{sb}$ and $F_{max}$ may be between $I_{sb}$ measured at Sort (wafer level test) and $F_{max}$ measured at Class (unit level Test), or may be between $I_{sb}$ and $F_{max}$ both measured at Class.

The system and method covers use of all environmental conditions which stress the unit while being tested or used. Temperature, voltage and frequency are exemplary embodiments of environmental conditions. Examples of other environmental conditions covered by the method include delay settings, humidity, levels of vibration, etc.

Products including multiple modules of several types rather than the single type of module (bit) of the DRAM exemplary embodiment are covered by the invention.

Models of multi-module and fault-tolerant products in which the probability of occurrence of a defective module is distributed according to the negative binomial distribution (a generalization of the Poisson distribution) are covered by the methods of the invention. Exemplary embodiments include variation of defect density across wafers, lots and factories.

The modules, of which DRAM bits are an exemplary embodiment, can be any element, which is characterized in a test vehicle and used in one or more copies in a product. Other exemplary embodiments include circuit blocks, and fuses in FPGA devices.

Computation of copula-dependent figures of merit other than the ones shown in the exemplary embodiments is covered by the methods of this invention.

The Bootstrap method was given in FIG. 32b as a way to generate Data Replicates that characterize sample variation. The Bootstrap method is an exemplary embodiment of other data resampling methods including Jackknife and Cross Validation, which may be applied to characterize sample variation.

The principle of representation of key probabilities of product Test/Use pass/fail categories by sums over constrained sets of integers of counts of modules (e.g. bits) in various Test/Use pass/fail categories applies to more complex array fault tolerant schemes than were shown as exemplary embodiments. Exemplary embodiments of more complex schemes are block-wise replacements, and schemes in which spare bits are only available within blocks but not globally.

A test vehicle may be an electronic system or integrated circuit not intended for customer application, specifically designed to facilitate data acquisition to build a statistical model. Or it may be a product different from the product of interest, which may be tested in a way that facilitates data acquisition to build a statistical model.

All such variations are considered to be within the scope and spirit of the present invention as defined by the following claims and their legal equivalents.

What is claimed:

1. A method implemented by an appropriately programmed computer for determining specifications of an electronic system or integrated circuit product which satisfy quality, reliability and cost requirements, comprising:

a. acquiring data from a test vehicle, wherein said test vehicle comprises at least one electronic component of an integrated circuit product, wherein said acquired data comprises at least one attribute value of said electronic component for a plurality of physical instances or a plurality of simulated instances of said test vehicle determined at one or more environmental conditions and one or more o eratin conditions wherein said plurality of physical instances or said plurality of simulated instances comprises a sample of a population of said instances;

b. fitting a copula-based statistical model using said appropriately programmed computer to said acquired data, wherein said copula-based statistical model comprises marginal distributions of said acquired data and a copula for each said at least one electronic component of said test vehicle, wherein said fitting comprises determination of a desired form of said marginal distributions of said acquired data and a desired form of said copula, wherein said desired form of said copula embodies a flexibility to represent a statistical tail dependency of said data, wherein said fitting comprises:

i. determination of an environmental condition dependency of parameters of said desired form of said mar mal distributions of said ac uired data;

ii. determination of an operating condition dependency of parameters of said desired form of said marginal distributions of said acquired data;

iii. determination of an environmental condition dependency of parameters of said desired form of said copula;

iv. determination of an operating condition dependency of parameters of said desired form of said copula, wherein said at least one environmental condition is selected from the group consisting of temperature, voltage, frequency; and c. using said fitted copula-based statistical model to compute probabilities of passing a test manufacturing operation (Test) and failing in end use (Use) for said product wherein said probabilities are used to compute figures of merit wherein said figures of merit are compared with target values of said figures of merit to determine whether the product satisfies product specifications, wherein said product specifications comprise a product design specification, a test manufacturing specification, and a product datasheet specification, wherein said product design specification comprises fault tolerance requirements, wherein test manufacturing specification comprises:

i. specification of said one or more environmental conditions at said Test;
ii. specification of said one or more operating conditions at said Test;
iii. specification of active fault repair capacity at said Test; and
iv. specification of a test coverage model, wherein said test coverage model gives a degree to which said Test is capable of detecting faults manifested in said Use; wherein said product datasheet specification comprises environmental condition requirements of said product in said Use and operating condition requirements of said product in said Use, wherein said target values of said figures of merit are derived from quality, reliability, and cost requirements of said product.

2. The method of claim 1, wherein said copula of said copula-based model comprises a geometrical copula.

3. The method of claim 2, wherein said geometric copula is constructed by defining geometrical regions of a probability mass on the unit square and transforming margins so they become uniform distributions.

4. The method of claim 1, wherein said copula-based statistical model is used to generate Monte-Carlo samples of instances of said product, wherein each instance comprises at least one attribute value, wherein each said instance of said product comprises a censored sample of a population of said product, wherein said attribute values are compared to said test specifications and said datasheet specifications to determine a pass or fail status, wherein said figures of merit are determined by counting instances of said pass and fail status.

5. The method of claim 4, wherein said censored Monte-Carlo samples are generated without rejection from said copula of each said electronic component.

6. The method of claim 4, wherein said copula is a geometrical copula.

7. The method of claim 1, wherein a joint probability of a product passing said Test and failing in said Use is computed by summing terms depending on joint probabilities of a pass/fail status of each said at least one electronic component of said product in said Test and in said Use, over regions of a space representing required fault tolerance capability of said product, wherein said regions encompass allowed counts of electronic components defective in one or both of said Test and said Use such that said product is good in said Use.

8. The method of claim 7, wherein said required fault tolerance capability comprises representation as said regions an action of active repair at said Test.

9. The method of claim 7, wherein said required fault tolerance capability comprises representation as said regions an action of fault tolerance mechanisms built into a design of said product.

10. The method of claim 1 further comprises determining statistical confidence limits of said figures of merit, wherein said determination comprises computing distributions of said figures of merit from sets of replicates of model parameters generated by said fitting of said copula-based statistical model to sets of synthetic instances of said test vehicle data, wherein said sets are generated from said copula-based statistical model fitted to said acquired data, wherein said sets correspond to at least one experimental design different from an experimental design that produced said acquired data.

11. The method of claim 1, wherein data acquired from at least one said test vehicle is fitted to one said copula-based statistical model for said components of at least one said product, wherein said at least one product differs in variations selected from the group consisting of a number of kinds of components, a number of components, a fault tolerance specification in said Use, an active repair specification in said Test, a test coverage model, environmental and operating conditions in said Test, and environmental and operating conditions in said Use.

12. The method of claim 1, wherein said use of said copula-based statistical model comprises calculation of a joint probability of passing said Test and failing said Use for each individual component by transforming said copula of said copula-based model obtained by fitting said test vehicle data for each said component into another said copula or a pseudo copula for each said individual component, wherein said transformation embodies said test coverage model.

13. The method of claim 1, wherein an analytical form of said copula-based statistical model is used by an appropriately programmed computer to enable deterministic (non-Monte-Carlo) calculation of said figures of merit to determine product specifications.

* * * * *